(12) United States Patent
Limberg

(10) Patent No.: US 8,149,939 B2
(45) Date of Patent: Apr. 3, 2012

(54) SYSTEM OF ROBUST DTV SIGNAL TRANSMISSIONS THAT LEGACY DTV RECEIVERS WILL DISREGARD

(75) Inventor: Allen LeRoy Limberg, Port Charlotte, FL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1193 days.

(21) Appl. No.: 11/704,794

(22) Filed: Feb. 9, 2007

(65) Prior Publication Data

US 2007/0140369 A1 Jun. 21, 2007

Related U.S. Application Data

(60) Continuation-in-part of application No. 10/955,212, filed on Sep. 30, 2004, which is a continuation-in-part of application No. 10/885,460, filed on Jul. 6, 2004, now abandoned, application No. 11/704,794, which is a division of application No. 10/955,212, and application No. 10/885,460.

(60) Provisional application No. 60/772,267, filed on Feb. 10, 2006, provisional application No. 60/507,797, filed on Oct. 1, 2003, provisional application No. 60/524,984, filed on Nov. 25, 2003, provisional application No. 60/531,124, filed on Dec. 19, 2003, provisional application No. 60/485,327, filed on Jul. 7, 2003.

(51) Int. Cl.
*H04L 23/02* (2006.01)

(52) U.S. Cl. ............. 375/265; 375/240.28; 375/232

(58) Field of Classification Search .......... 375/265, 375/240.26, E7.011; 370/498; 714/792
See application file for complete search history.

(56) References Cited

U.S. PATENT DOCUMENTS

| | | | | | |
|---|---|---|---|---|---|
| 5,448,299 | A | * | 9/1995 | Yang et al. | 348/475 |
| 5,600,672 | A | * | 2/1997 | Oshima et al. | 375/219 |
| 6,724,832 | B1 | * | 4/2004 | Hershberger | 375/301 |
| 6,810,084 | B1 | * | 10/2004 | Jun et al. | 375/240.28 |
| 6,973,137 | B2 | * | 12/2005 | Birru et al. | 375/265 |
| 7,634,006 | B2 | * | 12/2009 | Choi et al. | 375/240.1 |
| 2006/0039503 | A1 | * | 2/2006 | Choi et al. | 375/301 |

* cited by examiner

*Primary Examiner* — Eva Puente
*Assistant Examiner* — Helene Tayong
(74) *Attorney, Agent, or Firm* — Sughrue Mion, PLLC

(57) ABSTRACT

A DTV signal is transmitted that avoids legacy DTV receivers regarding data segments used in other than ordinary 8VSB transmissions being mistaken for (207, 187) R-S FEC codewords that appear to free of byte error or can be corrected to appear so. The DTV signal is analyzed prior to its transmission, for detecting those data segments used in other than ordinary 8VSB transmissions that legacy DTV receivers could mistake for correct (207, 187) R-S FEC codewords or correctable (207, 187) R-S FEC codewords. Twenty bytes of each segment of data that could be so mistaken are modified to prevent such mistake. Complementing certain bits in the final twenty bytes of each segment of data is preferred if data are transmitted at one-half or one-quarter ordinary 8VSB code rate. Segments of control data, each pertaining to a respective future group of said segments of data, are transmitted in a further aspect of the invention for indicating which data segments are modified. These segments of control data can further include information concerning the type of modulation used in each data segment.

20 Claims, 26 Drawing Sheets

| ADDRESS | X-SUB-ONE | ADDRESS | X-SUB-ONE |
|---|---|---|---|
| 000000 | 1 | 011000 | 0 |
| 000001 | 0 | 011001 | 1 |
| 000010 | 1 | 011010 | 0 |
| 000011 | 0 | 011011 | 1 |
| 000100 | 0 | 011100 | 1 |
| 000101 | 1 | 011101 | 0 |
| 000110 | 1 | 011110 | 0 |
| 000111 | 0 | 011111 | 1 |
| 001000 | 0 | 100000 | 1 |
| 001001 | 1 | 100001 | 0 |
| 001010 | 0 | 100010 | 1 |
| 001011 | 1 | 100011 | 0 |
| 001100 | 1 | 100100 | 0 |
| 001101 | 0 | 100101 | 1 |
| 001110 | 1 | 100110 | 0 |
| 001111 | 0 | 100111 | 1 |
| 010000 | 0 | 101000 | 1 |
| 010001 | 1 | 101001 | 0 |
| 010010 | 1 | 101010 | 0 |
| 010011 | 0 | 101011 | 1 |
| 010100 | 0 | 101100 | 1 |
| 010101 | 1 | 101101 | 0 |
| 010110 | 0 | 101110 | 1 |
| 010111 | 1 | 101111 | 0 |

| 1ST 1/2 OF DATA SEGMENT | 93.5 DATA BYTES FROM INITIAL HALF OF MPEG-2-COMPLIANT DATA PACKET | 10 R-S PARITY BYTES |
|---|---|---|
| 2ND 1/2 OF DATA SEGMENT | 93.5 DATA BYTES FROM FINAL HALF OF MPEG-2-COMPLIANT DATA PACKET | 10 R-S PARITY BYTES |

TIME ADVANCES TO THE RIGHT WITHIN EACH SUCCESSIVE 1/2 SEGMENT

Fig. 9

| 1ST 1/4 OF DATA SEGMENT | 46.75 DATA BYTES FROM FIRST QUARTER OF MPEG-2-COMPLIANT DATA PACKET | 5 R-S PARITY BYTES |
|---|---|---|
| 2ND 1/4 OF DATA SEGMENT | 46.75 DATA BYTES FROM SECOND QUARTER OF MPEG-2-COMPLIANT DATA PACKET | 5 R-S PARITY BYTES |
| 3RD 1/4 OF DATA SEGMENT | 46.75 DATA BYTES FROM THIRD QUARTER OF MPEG-2-COMPLIANT DATA PACKET | 5 R-S PARITY BYTES |
| 4TH 1/4 OF DATA SEGMENT | 46.75 DATA BYTES FROM FOURTH QUARTER OF MPEG-2-COMPLIANT DATA PACKET | 5 R-S PARITY BYTES |

TIME ADVANCES TO THE RIGHT WITHIN EACH SUCCESSIVE 1/4 SEGMENT

Fig. 10

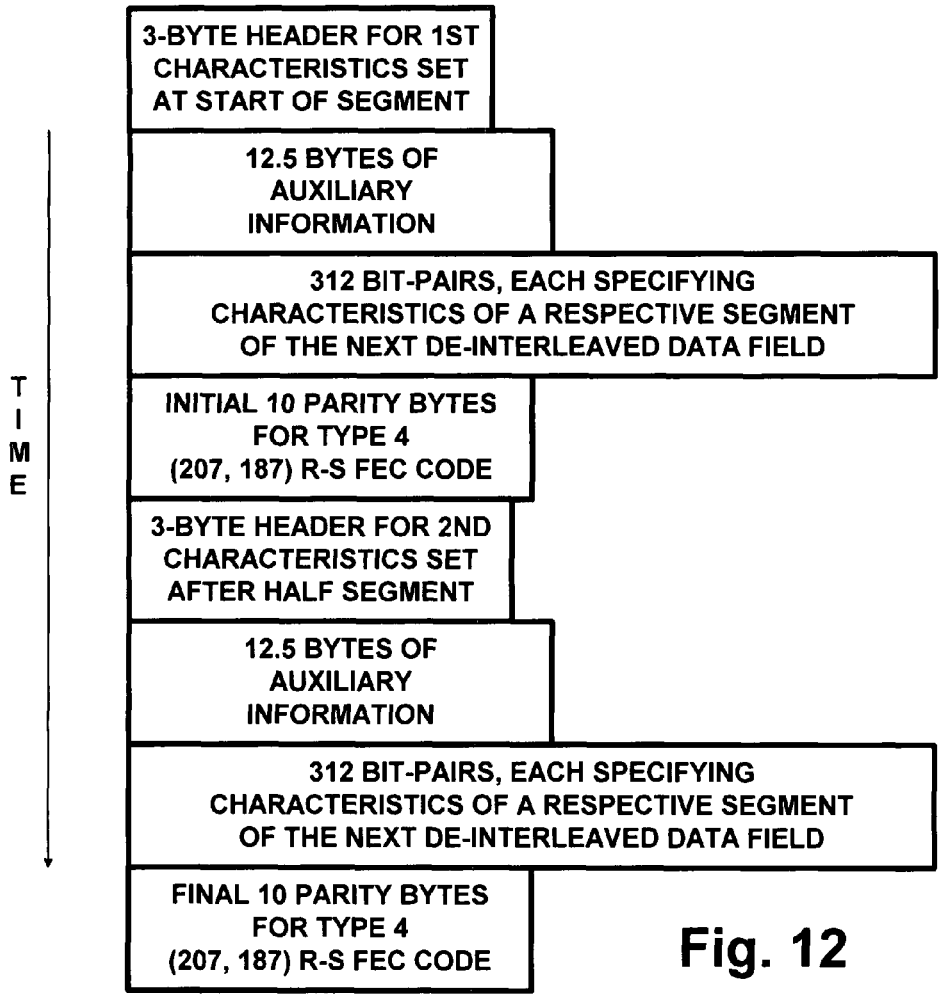
Fig. 12
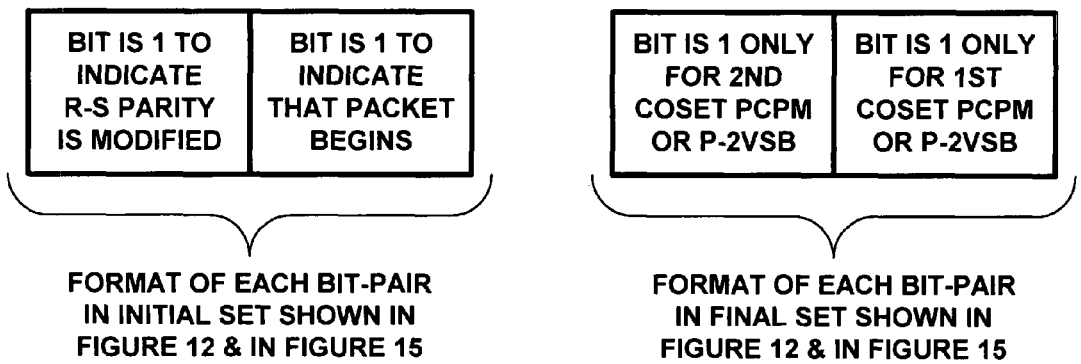
Fig. 13
Fig. 14

FORMAT OF EACH BIT-PAIR
IN FINAL SET SHOWN IN
FIGURE 12 & IN FIGURE 15

US 8,149,939 B2

SYSTEM OF ROBUST DTV SIGNAL TRANSMISSIONS THAT LEGACY DTV RECEIVERS WILL DISREGARD

This is a continuation-in-part of U.S. patent application Ser. No. 10/955,212 filed 30 Sep. 2004 as a continuation-in-part of U.S. patent application Ser. No. 10/885,460 filed 6 Jul. 2004 and now abandoned, and in regard to portions of its subject matter claims pursuant to 35 U.S.C. 119(e)(1) benefit of the filing date of U.S. provisional Pat. App Ser. No. 60/772,267 filed 10 Feb. 2006. Patent application Ser. No. 10/955,212 was filed under 35 U.S.C. 111(a) claiming pursuant to 35 U.S.C. 119(e)(1) benefit of the filing dates of U.S. provisional Pat. App. Ser. Nos. 60/507,797, 60/524,984 and 60/531,124 filed under 35 U.S.C. 111 (b) on 1 Oct. 2003, 25 Nov. 2003 and 19 Dec. 2003, respectively, in regard to portions of its subject matter. Application Ser. No. 10/885,460 was filed under 35 U.S.C. 111(a) claiming pursuant to 35 U.S.C. 119 (e)(1) benefit of the filing date of U.S. provisional Pat. App. Ser. No. 60/485,327 filed 7 Jul. 2003, pursuant to 35 U.S.C. 111(b).

The invention relates to the transmission of modified 8VSB digital television (DTV) signals so they are disregarded by so-called "legacy" DTV signal receivers that are already deployed in the field.

BACKGROUND OF THE INVENTION

Of particular interest to the invention disclosed herein is the transport stream as defined in Annex D of the "ATSC Digital Television Standard" published by the Advanced Television Systems Committee in 1995 as its document A/53. This standard defines the broadcasting of digital television (DTV) signals within the United States of America and is referred to in this specification simply as "A/53". Section 4 of Annex D titled "Transmission Characteristics for Terrestrial Broadcast" is incorporated herein by reference. The Transport Stream (TS) used in DTV broadcasting utilizes (207, 187) Reed-Solomon forward-error-correction (R-S FEC) coding of segments of randomized data, each consisting of one-hundred-eighty-seven bytes mapping the final one-hundred-eighty-seven bytes of an MPEG-2-compliant data packet that was randomized. The twenty bytes of R-S FEC coding for each data segment is appended to its end to stretch its length to two-hundred-and-seven bytes. The R-S FEC coding is followed by convolutional interleaving and then by 2/3 code rate trellis coding. The trellis-coded symbols are then mapped to an eight-level modulation signal used in the generation of a vestigial-sideband amplitude-modulated radio-frequency carrier signal referred to as an 8VSB signal.

After the "ATSC Digital Television Standard" was established in 1995 reception of terrestrial broadcast DTV signals proved to be problematic, particularly if indoor antennas were used. A variety of schemes have been proposed to time-division multiplex segments of more robust data with segments of ordinary 8VSB data. These schemes involve reduction of the 8VSB symbol alphabet, or further coding of the 8VSB signal, or a combination of both those approaches. These schemes seek to preserve the trellis coding scheme specified by A/53 throughout each data field, so as to avoid disrupting the reception of segments of ordinary 8VSB data by legacy DTV receivers. At the same time, these schemes have sought to cause those legacy receivers to disregard the segments of robust data. The approach taken in the prior art has been to confine the robust data to the payload portions of MPEG-2-compliant data packets, with the 13-bit packet-identifier (PID) portions of the packet headers being used to identify the payload portions as containing robust data. This approach is taken in and in the E-8VSB standard for robust DTV broadcast transmission recently adopted by the ATSC. The problem with this approach is that MPEG-2-compliant data packets recoded to halved code rate or to quartered code rate cannot be fitted into an integral number of data segments. Accordingly, undesirably elaborate measures must be taken for time-division multiplexing robust data transmissions with segments of ordinary 8VSB data.

U.S. patent application Ser. No. 10/885,460 titled "REED-SOLOMON CODING MODIFICATIONS FOR SIGNALING TRANSMISSION OF DIFFERENT TYPES OF DATA PACKETS" was filed 6 Jul. 2004 by A. L. R. Limberg and subsequently abandoned. That application teaches that different types of data transmitted via a DTV broadcast signal can be distinguished from each other by the types of R-S FEC coding they respectively use. That application describes 187-byte chunks of data associated with robust transmission being subjected to modified (207, 187) R-S FEC coding. These 187-byte chunks can be halves of 187-byte MPEG-2-compliant data packets recoded to halved code rate or can be quarters of 187-byte MPEG-2-compliant data packets recoded to quartered code rate. In either case the recoded MPEG-2-compliant data packets are easily fitted into an integral number of data segments.

U.S. patent application Ser. No. 10/885,460 further points out that a (207, 187) R-S FEC codeword as prescribed by the "ATSC Digital Television Standard" can be modified by complementing prescribed ones of its bits in eleven or more of its bytes, so as to introduce byte errors that exceed the byte-error-correction capabilities of the (207, 187) R-S FEC decoders in legacy DTV receivers. The modified (207, 187) R-S FEC codewords are decoded in new receivers by complementing the prescribed bits of each modified (207, 187) R-S FEC codeword to restore the original (207, 187) R-S FEC codeword, which is then decoded conventionally. By prescribing different bits to be complemented in each (207, 187) R-S FEC codeword, many different modified (207, 187) R-S FEC codewords can be generated, each distinguishable from all the others.

U.S. patent application Ser. No. 10/885,460 points out that the (207, 187) R-S FEC code prescribed by the "ATSC Digital Television Standard" is a shortened 255-byte R-S FEC code, the 48 extra "virtual" bytes of which are null bytes in the check equations. The parity bytes in the (207, 187) R-S FEC code used for the data field segments presume certain values for the null bytes, the presumption being that all bits in each null byte are ZEROes. If at the transmitter the R-S FEC coding of selected segments were done with different "virtual" bytes, the parity bytes would all be changed. Legacy DTV receivers presuming the 48 "virtual" bytes were null bytes when decoding the modified shortened R-S FEC code would find the segment to contain uncorrectable byte errors and would discard the MPEG-2-format packet recovered from that segment. In new receivers decoding of the (207, 187) shortened R-S FEC code can initially be done presuming the 48 "virtual" bytes are null bytes, to determine whether or not a data field segment is a correctable data segment. If it is not, the check equations can be extended to include different "virtual" bytes associated with a particular form of robust transmission, to determine whether or not a data field segment is a correctable segment associated with that particular form of robust transmission.

U.S. patent application Ser. No. 09/840,481 filed 23 Apr. 2001 by A. J. Vigil, Jr. and M. A. Belkerdid and now abandoned was published 30 Jan. 2003 with publication No. 2003-0021341. Their patent application described the introduction of data segments with prescribed training symbols into the data fields supplied for convolutional interleaving and subsequent 2/3 code rate trellis coding. These prescribed training symbols were introduced to aid the adaptation of the weighting coefficients in the kernels of digital filters used for channel equalization, presuming that autoregression methods would be used for adapting those weighting coefficients. Paragraph 0068 of publication No. 20030021341 points out that the segments composed of prescribed training symbols were not valid (207, 187) R-S FEC codewords nor were they correctable to be so by the R-S FEC codeword decoders in legacy DTV receivers. Consequently, legacy DTV receivers would in effect discard these segments composed of prescribed training symbols by not time-division multiplexing the initial 187 bytes of each of them into the respective transport streams reproduced by those receivers.

U.S. patent application Ser. No. 10/955,212 filed 30 Sep. 2004 by A. L. R. Limberg and titled "TIME-DEPENDENT TRELLIS CODING FOR MORE ROBUST DIGITAL TELEVISION SIGNALS" was published 7 Apr. 2005 with publication No. 2005-0074074. That application observes that many data segments containing robust data will not be mistaken by legacy receivers as being (207, 187) R-S FEC codes that appear to free of byte error or can be corrected to appear so. Accordingly, legacy DTV receivers should not forward those data segments to packet decoders. The problem remaining is that there is the possibility that some data segments containing robust data can be mistaken by legacy receivers as being (207, 187) R-S FEC codes that appear to free of byte error or can be corrected to appear so. Patent application Ser. No. 10/955,212 suggests that data segments containing robust data be evaluated to determine whether such mistake is likely and, if so, that their projected position in the data field be altered to make such mistake unlikely. Changing the position of the data segments containing robust data will change the randomization of the data. FIG. 10 of application Ser. No. 10/955,212 shows a routine to validate the insertion of data segments using a restricted symbol alphabet into the time-division-multiplex signal supplied for convolutional interleaving and trellis coding. The inventor sought an alternative procedure to avoid legacy DTV receivers mistaking data segments containing robust data for (207, 187) R-S FEC codewords that are correct or capable of correction, which alternative procedure would substantially reduce or completely eliminate the need to reposition those data segments.

U.S. patent application Ser. No. 10/955,212 discloses that the various different methods of R-S FEC coding described by U.S. patent application Ser. No. 10/885,460 for distinguishing between different types of signal can be adapted to provide such alternative procedures. U.S. patent application Ser. No. 10/955,212 extended the concept of causing legacy DTV receivers to discard certain 207-byte segments in effect. The 207-byte segments contained random data generated from the information content to be transmitted, rather than just prescribed symbols of which a DTV receiver could have a priori knowledge to improve adaptation of the weighting coefficients of digital filtering the receiver used for channel equalization.

U.S. Pat. No. 5,377,207 granted 27 Dec. 1994 to M. Perlmanand is titled "Mappings between codewords of two distinct (N, K) Reed-Solomon codes over GF (2.super.J)". Perlman points out that a Berlekamp alternative (N,K) R-S code is orthogonal to conventional-architecture (N, K) R-S code and that substantially the same hardware can be used for decoding either type of (N, K) R-S code. It is known theoretically that other "orthogonal" R-S codes that sustain error correction besides the type described by Berlekamp exist. They differ from conventional-architecture R-S code in that their Galois fields are generated by primitive field generator polynomials with zero coefficient placements different from those in the primitive field generator polynomial of the conventional-architecture R-S code. U.S. Pat. No. 5,490,154 granted to R. Mester on 6 Feb. 1996 and titled "Method of and circuit arrangement for decoding RS-coded data signals" indicates that Philips used substantially the same hardware for decoding either of the EBU D1 and ISO R-S codes employed in magnetic tape recording. With hindsight gained from U.S. patent application Ser. No. 10/885,460, it appears that previously known "orthogonal" R-S codes that sustain error correction can be used to distinguish different types of data transmitted via a DTV broadcast signal. With hindsight gained from U.S. patent application Ser. No. 10/955,212, it appears that previously known "orthogonal" R-S codes that sustain error correction can be used to encode data segments containing robust data to avoid legacy DTV receivers mistaking such segments for (207, 187) R-S FEC codewords that are correct or are capable of correction.

U.S. patent application Ser. No. 10/733,645 filed 12 Dec. 2003 for A. L. R. Limberg and titled "ROBUST SIGNAL TRANSMISSIONS IN DIGITAL TELEVISION BROADCASTING" was published 25 Nov. 2004 with publication No. 2004-0237024. U.S. patent application Ser. Nos. 10/733,645, 10/885,460 and 10/955,212 describe "transverse" Reed-Solomon forward-error-correction (or TRS FEC) coding being done on symbols within paths that cross the data segments in a data field yet before the bytes in those segments are subjected to convolutional interleaving. Such TRS FEC coding provides additional capability for correcting byte errors and can be used together with the inventions disclosed in this specification. In this specification R-S FEC coding that is done on the symbols within a data segment before its bytes are subjected to convolutional interleaving is referred to as "lateral" Reed-Solomon forward-error-correction (or LRS FEC) coding. The reader is advised that the numbering of the various types of LRS FEC coding described in this specification is independent of the numbering of types of LRS FEC coding in other documents. The parity bytes of the TRS FEC coding can be provided LRS FEC coding of a type distinguishable from the LRS FEC coding used for other information.

U.S. patent application Ser. No. 11/119,662 filed 2 May 2005 by A. L. R. Limberg and titled "DIGITAL TELEVISION SIGNALS USING LINEAR BLOCK CODING" describes the code rate of DTV data being halved using linear block codes. E.g., the linear block codes are used with restricted symbol alphabets to quarter the 2/3 code rate of ordinary trellis coded 8VSB DTV signal. U.S. patent application Ser. No. 11/119,662 prescribes modifying data segments containing robust data that could otherwise be mistaken for (207, 187) R-S FEC codewords by legacy DTV receivers. This is done by complementing all the bits in the final twenty bytes of the data segment if the robust data are transmitted using pseudo-2VSB modulation. Or, this is done by complementing the $Z_2$ or $X_2$ bits in the final twenty bytes of the data segment if the robust data are transmitted using prescribed-coset-pattern modulation (PCPM) or another coding scheme in which modification of $Z_1$ bits is avoided.

SUMMARY OF THE INVENTION

An aspect of the invention is a method for transmitting a DTV signal that avoids legacy DTV receivers regarding data segments used in other than ordinary 8VSB transmissions to be (207, 187) R-S FEC codewords that are free of byte error or that are correctable. The DTV signal is analyzed prior to its transmission, for detecting those data segments used in other than ordinary 8VSB transmissions that legacy DTV receivers could mistake for correct (207, 187) R-S FEC codewords or correctable (207, 187) R-S FEC codewords. Twenty bytes of each segment of data that could be so mistaken are modified to prevent such mistake. Preferably, future-field-description signals are incorporated into the DTV signal for indicating which data segments have been so modified. Preferred ones of these future-field-description signals also include indications of the type(s) of modulation employed in each data segment. A further aspect of the invention is the DTV signal generated by this method for transmitting a DTV signal. A still further aspect of the invention concerns DTV receivers for usefully receiving data segments used in other than ordinary 8VSB transmissions. DTV receivers embodying this still further aspect of the invention are capable of restoring those data segments modified to prevent legacy DTV receivers mistaking them for correct (207, 187) R-S FEC codewords or correctable (207, 187) R-S FEC codewords.

BRIEF DESCRIPTION OF THE DRAWING

FIG. 9 is a diagram showing the preferred placement of parity bytes in Reed-Solomon forward-error-correction codewords that span two segments of data transmitted at one-half of ordinary 8VSB code rate.

FIG. 10 is a diagram showing the preferred placement of parity bytes in Reed-Solomon forward-error-correction codewords that span four segments of data transmitted at one-quarter of ordinary 8VSB code rate.

FIG. 12 is a depiction of a halved-code-rate future-field-description signal that the FIG. 11 modification of DTV transmitter apparatus uses for supplying DTV receivers with advance information concerning the nature of robust transmissions.

FIGS. 13 and 14 are depictions of the formats of bit-pairs that the FIG. 11 and FIG. 12 future-field-description signals use for describing first and second sets of characteristics, respectively, of each of the 312 data segments in each future field of data.

In the schematic diagrams the connections shown in dashed line are used for conveying control signals. As will be understood by those skilled in the art, delays may be necessary in some connections, even though for sake of more easily understanding the figures as considered in general some of these delays are not explicitly shown.

DETAILED DESCRIPTION

Figure 1:
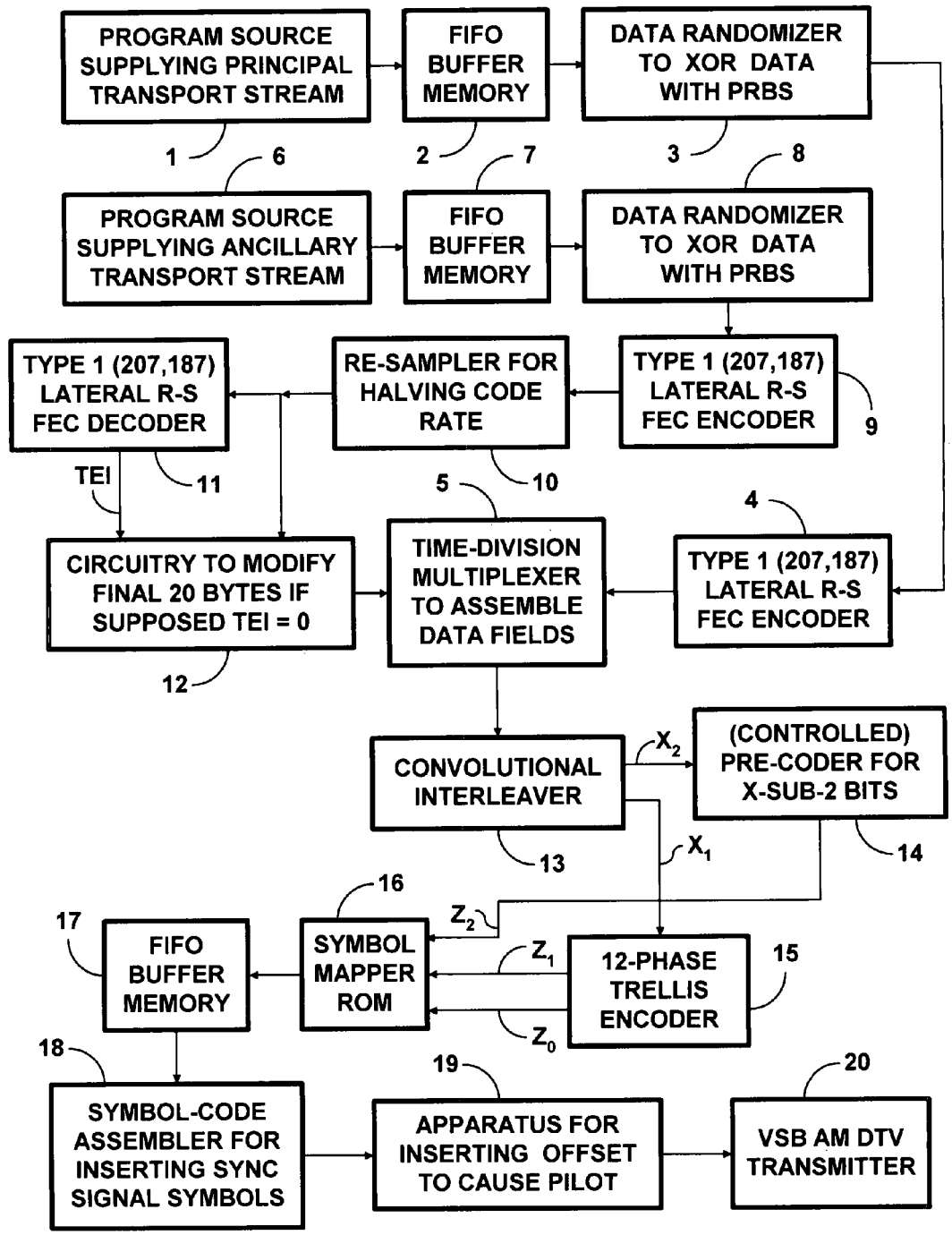
FIG. 1 is a generic schematic diagram of DTV transmitter apparatus that provides for the transmission of ordinary 8VSB signals in time-division multiplex with more robust signals of halved code rate, which DTV transmitter apparatus in accordance with the invention ensures that legacy DTV receivers will disregard those data segments used to convey the more robust signals.

FIG. 1 shows DTV transmitter apparatus for transmitting ordinary 8VSB signals in time-division multiplex with more robust signals of halved code rate. In FIG. 1 a program source 1 of a principal transport stream is connected to supply the successive 187-byte data packets in that transport stream for being written into a first-in/first-out buffer memory 2 for temporary storage therein. A data randomizer 3 is connected for receiving data packets read from the FIFO buffer memory 2 and randomizing the bits in those data packets by exclusive-ORing those bits with the bits of a $2^{16}$-bit maximal length pseudo-random binary sequence (PRBS). The PRBS, which is initialized at the beginning of each data field, is that specified in A/53, Annex D, §§ 4.2.2 titled "Data randomizer". The portion of the PRBS used in exclusive-ORing each data segment is that portion which is suitable for the location of that data segment in the non-interleaved data field that will be assembled for subsequent (207, 187) lateral R-S FEC coding, convolutional interleaving and trellis coding. A (207, 187) lateral Reed-Solomon forward-error-correction encoder 4 is connected for receiving from the data randomizer 3 the randomized 187-byte data packets of the principal transport stream. The (207, 187) LRS FEC encoder 4 converts these randomized 187-byte data packets to respective 207-byte segments of (207, 187) lateral Reed-Solomon forward-error-correction coding that appends the respective twenty parity bytes of the coding of each randomized 187-byte data packet after the conclusion thereof. The (207, 187) LRS FEC encoder 4 is of a first type, which is conventional in nature; and the practice specified in A/53, Annex D, §§ 4.2.3 titled "Reed-Solomon encoder" is followed. A time-division multiplexer 5 used to assemble data fields is connected for receiving at a first of its two input ports the 207-byte segments of (207, 187) LRS FEC coding generated by the (207, 187) LRS FEC encoder 4.

FIG. 1 shows a program source 6 of an ancillary transport stream connected for supplying the successive 187-byte data packets in that transport stream to be written into a first-in/first-out buffer memory 7 for temporary storage therein. A data randomizer 8 is connected for receiving data packets read from the FIFO buffer memory 7. The data randomizer 8 is operated for randomizing the bits in each of those data packets. This is done by exclusive-ORing them with the bits of the PRBS for the initial one of the pair of data segments in the non-interleaved data field that will contain the data packet after it is encoded to increase redundancy and reduce code rate. A (207, 187) lateral Reed-Solomon forward-error-correction encoder 9 is connected for receiving from the data randomizer 8 the randomized 187-byte data packets of the ancillary transport stream. The (207, 187) LRS FEC encoder 9 converts these randomized 187-byte data packets to respective 207-byte segments of (207, 187) LRS FEC coding of conventional first type.

However, preferably, the (207, 187) LRS FEC encoder 9 is of a construction that does not append the respective twenty parity bytes of the (207, 187) LRS FEC coding of each randomized 187-byte data packet after the conclusion thereof. In a preferred construction the (207, 187) LRS FEC encoder 9 breaks the twenty parity bytes into two 10-byte groups, one inserted after the initial half of the randomized 187-byte data packet, and the other inserted after the final half of the randomized 187-byte data packet. FIG. 9 depicts the form of each data segment generated by the preferred construction of the (207, 187) LRS FEC encoder 9. That encoder 9 inserts the initial ten parity bytes of the (207, 187) LRS FEC codeword after the initial 93.5 data bytes of the randomized 187-byte data packet. That encoder 9 inserts the final ten parity bytes of the codeword after the final 93.5 data bytes of the randomized 187-byte data packet.

A re-sampler 10 is connected for receiving these 207-byte segments from the (207, 187) LRS FEC encoder 9 and generates in response to each of these 207-byte segments a respective pair of 207-byte segments at halved code rate. A decoder 11 for (207, 187) lateral Reed-Solomon forward-error-correction codewords is connected for receiving the 207-byte segments that the re-sampler 10 supplies. The (207, 187) LRS FEC decoder 11 ascertains whether each segment that the re-sampler 10 supplies is a (207, 187) LRS FEC codeword as specified in A/53, Annex D, §§ 4.2.3. The LRS FEC decoder 11 attempts to correct the segment to be such a codeword if it is not already. The LRS FEC decoder 11 generates a transport error indicator (TEI) bit that is a ZERO if the segment is apparently a (207, 187) LRS FEC codeword that is correct or can be corrected by the decoders for such codewords in legacy DTV receivers. The LRS FEC decoder 11 generates a TEI bit that is a ONE if the segment is apparently incapable of correction. A second one of the two input ports of the time-division multiplexer 5 used to assemble data fields is connected for receiving 207-byte segments from circuitry 12, which circuitry 12 is connected for receiving 207-byte segments from the re-sampler 10. Each of these data segments is delayed to give the LRS FEC decoder 11 enough time to decide its TEI bit response to that segment, although FIG. 1 does not explicitly show the means affording that delay. When the TEI bit that the circuitry 12 receives as a control signal from the LRS FEC decoder 11 is ONE, the circuitry 12 reproduces a 207-byte segment supplied thereto by the re-sampler 10. When the TEI bit that the circuitry 12 receives as a control signal from the decoder 11 is ZERO, the circuitry 12 reproduces the initial 187 bytes of a 207-byte segment supplied thereto by the re-sampler 10. However, when that TEI bit is ZERO, the circuitry 12 modifies the final 20 bytes of the 207-byte segment that it supplies to the second input port of the time-division multiplexer 5. The modification of the final 20 bytes of the 207-byte segment is done so that the segment will not be mistaken for a (207, 187) LRS FEC codeword that is correct or can be corrected by the decoders for such codewords in legacy DTV receivers. If the (207, 187) LRS FEC encoder 9 is of the preferred construction that generates data segments with parity bytes located per FIGURE 9, the modified final 20 bytes of the 207-byte segment will be ten parity bytes recoded to halved code rate.

A convolutional interleaver 13 is connected for receiving the successive data segments of the non-interleaved data field assembled by the time-division multiplexer 5. The convolutional interleaver 13 responds to supply the successive data segments of an interleaved data field using interleaving as prescribed by A/53, Annex D, §§ 4.2.4 titled "Interleaving". A precoder 14 is connected for receiving the $X_2$ bits of the convolutional interleaver 13 response and generating $Z_2$ bits by adding modulo-2 the $X_2$ bits with those bits from twelve symbol epochs previous. A 12-phase trellis encoder 15 is connected for receiving the $X_1$ bits of the convolutional interleaver 12 response and supplying them as $Z_1$ bits. The trellis encoder 15 is connected for supplying $Z_0$ bits that it generates dependent on previously received $X_1$ bits. A symbol map read-only memory 16 is connected for receiving $Z_2$ bits from the precoder 14 as a portion of its addressing input signal and for receiving the $Z_1$ and $Z_0$ bits from the trellis encoder 15 as the remaining portion of its addressing input signal. The trellis encoder 15, the precoder 14 and the symbol map ROM 16 conform with the 8VSB trellis encoder, precoder and symbol mapper shown in FIG. 7 of A/53, Annex D. The precoder 14, the trellis encoder 15 and the symbol map ROM 16 are operated in conformance with A/53, Annex D, §§ 4.2.5 titled "Trellis coding".

Alternatively, the precoder 14 may be a controlled precoder that requires an enabling control signal to generate $Z_2$ bits by adding modulo-2 the $X_2$ bits with those bits from twelve symbol epochs previous. When the controlled precoder receives a disabling control instead, it generates $Z_2$ bits that simply reproduce the $X_2$ bits. The controlled precoder is always disabled when the convolutional interleaver 14 supplies it with bytes from pseudo-2VSB signals. Pseudo-2VSB signals are generated when the re-sampler 10 is of the type that generates $X_1$ bits by repeating immediately preceding $X_2$ bits, a procedure that constrains the 8VSB symbol alphabet to −7, −5, +5 and +7 normalized modulation levels. The precoder 14 has been used to accommodate simple comb filters being used in DTV receivers for suppression of NTSC interference. When NTSC broadcasting is officially ended, it is expected that the precoder 14 will be disabled and $Z_2$ bits will simply reproduce the $X_2$ bits.

The symbol map ROM 16 operates as a symbol mapper supplying 3-bit, 8-level symbols to a first-in/first-out buffer memory 17. The FIFO buffer memory 17 is operated to provide rate buffering and to open up intervals between 828-symbol groups in the symbol stream supplied to a symbol-code assembler 18, into which intervals the symbol-code assembler 18 inserts synchronizing signal symbols. Each of the successive data fields begins with a respective interval into which the symbol-code assembler 18 inserts symbol code descriptive of a data-segment-synchronization (DSS) sequence followed by symbol code descriptive of an initial data segment including an appropriate data-field-synchronization (DFS) sequence. Each data segment in the respective remainder of each data field is followed by a respective interval into which the symbol-code assembler 18 inserts symbol code descriptive of a respective DSS sequence. Apparatus 19 for inserting the offset to cause pilot is connected to receive assembled data fields from the symbol-code assembler 18. The apparatus 19 is simply a clocked digital adder that zero extends the number used as symbol code and adds a constant term thereto to generate a real-only modulating signal in digital form, supplied to a vestigial-sideband amplitude-modulation digital television transmitter 20 of conventional construction.

Figure 2:
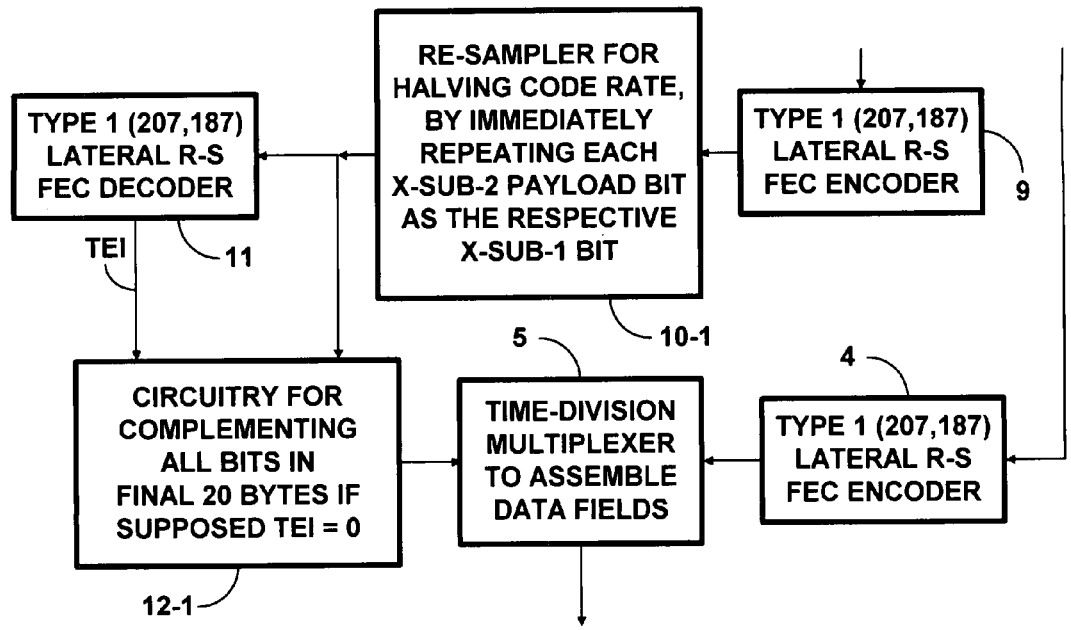
FIG. 2 is a schematic diagram showing in more detail a species of the FIG. 1 DTV transmitter apparatus that transmits pseudo-2VSB signals.

FIG. 2 shows in more detail the construction of a species of the FIG. 1 DTV transmitter apparatus that transmits segments of pseudo-2VSB signal in time-division multiplex with segments of ordinary 8VSB signal. FIG. 2 shows a re-sampler 10-1 that is a species of the re-sampler 10. The re-sampler 10-1 halves the code rate of its response by repeating each of the $X_2$ bits it receives from the (207, 187) LRS FEC encoder 9 as a respective $X_1$ bit inserted immediately thereafter. The re-sampler 10-1 is connected for supplying the data segments that it generates to the (207, 187) LRS FEC decoder 11 and to circuitry 12-1 that is a species of the FIG. 1 circuitry 12. Each of the data segments supplied to the circuitry 12-1 is delayed to give the LRS FEC decoder 11 enough time to decide its TEI bit response to that segment, although FIG. 2 does not explicitly show the means affording that delay. When the TEI bit that the circuitry 12-1 receives as a control signal from the LRS FEC decoder 11 is ZERO with regard to a data segment, the circuitry 12-1 one's complements all the bits in the final 20 bytes of the 207-byte segment that it supplies to the second input port of the time-division multiplexer 5. This will prevent legacy DTV receiver apparatus mistaking the segment for a (207, 187) LRS FEC codeword that is correct or that can be corrected by the (207, 187) LRS FEC decoder that apparatus includes. At the same time the $X_1$ bits in the 207-byte segment that the circuitry 12-1 supplies to the second input port of the time-division multiplexer 5 still repeat the respective $X_2$ bits immediately preceding them.

The precoder 14 is not used or is disabled when the convolutional interleaver 13 supplies bytes of signal to be transmitted as P-2VSB signal. So, the $X_2$ output bits supplied from the convolutional interleaver 13 are applied directly to the symbol mapper ROM 16 as the $Z_2$ input bits of a partial read address. The $X_1$ output bits supplied from the convolutional interleaver 13 and applied as $Y_1$ input bits to the 12-phase 2/3 trellis encoder 15 are relayed without changes to the symbol mapper ROM 16 as the $Z_1$ input bits of a partial read address. So, the $Z_1$ input bits of the ROM 16 partial read address are the same as the $Z_2$ input bits they are concurrent with. This constrains the 8VSB symbol alphabet read from the ROM 16 to the normalized modulation levels of −7, −5, +5 and +7 that characterize pseudo-2VSB (or P-2VSB) modulation.

Figure 3:
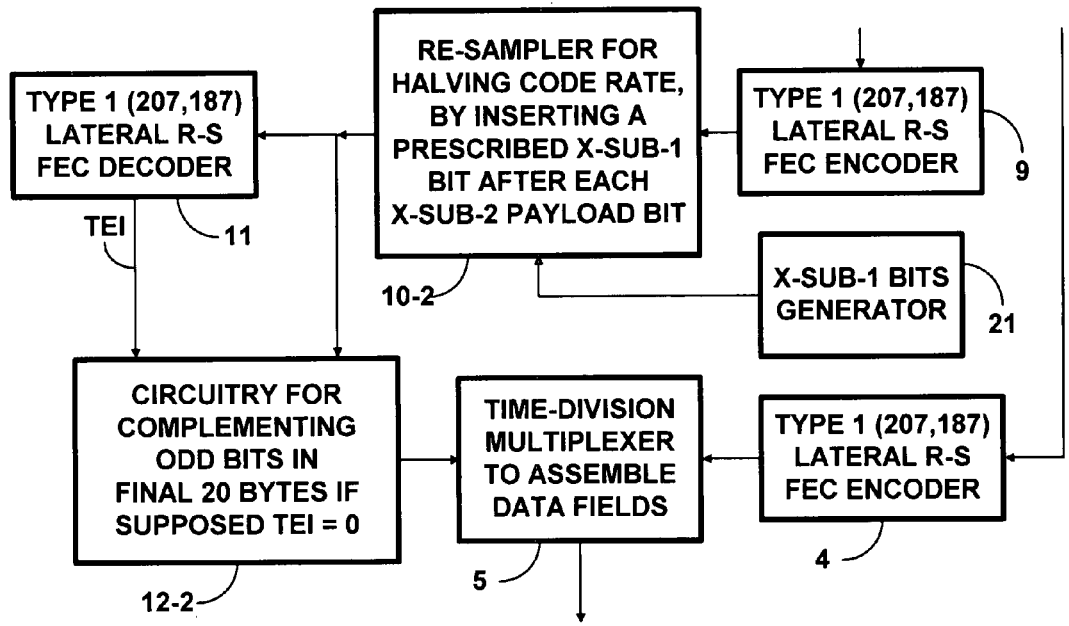
FIG. 3 is a schematic diagram showing in more detail a species of the FIG. 1 DTV transmitter apparatus that transmits prescribed-coset-pattern-modulation signal of a type previously shown and described in U.S. patent application Ser. No. 10/955,212.

FIG. 3 shows in more detail the construction of a species of the FIG. 1 DTV transmitter apparatus that transmits prescribed-coset-pattern-modulation (PCPM) signal of a type previously shown and described in U.S. patent application Ser. No. 10/955,212. FIG. 3 shows a re-sampler 10-2 that is a species of the re-sampler 10. The re-sampler 10-2 halves the code rate of its response by inserting a respective $X_1$ bit immediately after each of the $X_2$ bits it receives from the (207, 187) LRS FEC encoder 9. A generator 21 supplies the respective $X_1$ bits to the re-sampler 10-2 in accordance with a prescribed bit pattern. The re-sampler 10-2 is connected for supplying the data segments that it generates to the (207, 187) LRS FEC decoder 11 and to circuitry 12-2 that is a further species of the FIG. 1 circuitry 12. Each of the data segments supplied to the circuitry 12-2 is delayed to give the LRS FEC decoder 11 enough time to decide its TEI bit response to that segment, although FIG. 3 does not explicitly show the means affording that delay. When the TEI bit that the circuitry 12-2 receives as a control signal from the LRS FEC decoder 11 is ZERO with regard to a data segment, the circuitry 12-2 one's complements all the oddly occurring bits in the final 20 bytes of the 207-byte segment that it supplies to the second input port of the time-division multiplexer 5. This will prevent legacy DTV receiver apparatus mistaking the segment for a (207, 187) LRS FEC codeword that is correct or that can be corrected by the (207, 187) LRS FEC decoder that apparatus includes. At the same time the $X_1$ bits in the 207-byte segment that the circuitry 12-1 supplies to the second input port of the time-division multiplexer 5 still conform to the bit pattern supplied by the generator 21.

Figures 4, 5:
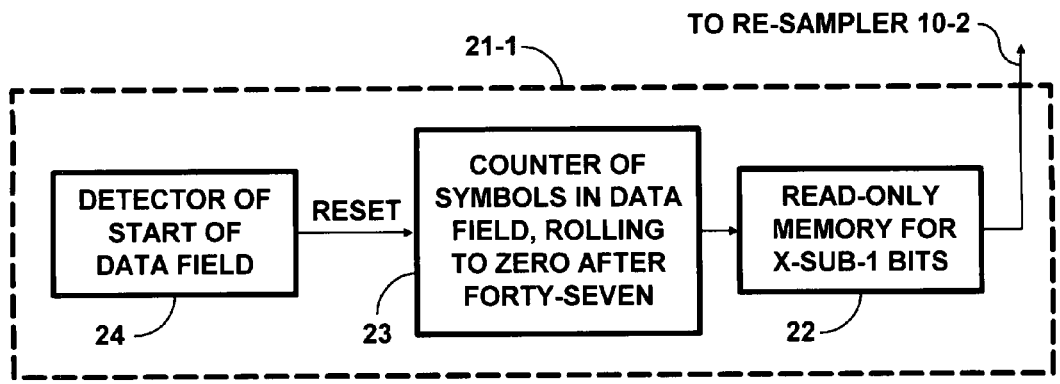
FIG. 4 is a schematic diagram showing a first particular construction of the $X_1$ bits generator for the FIG. 3 DTV transmitter apparatus, which first particular construction of the $X_1$ bits generator was previously shown and described in U.S. patent application Ser. No. 10/955,212.
FIG. 5 is a table showing a possible set of $X_1$ bits stored in read-only memory included in the $X_1$ bits generator of FIG. 4, which table was previously shown and described in U.S. patent application Ser. No. 10/955,212.

FIG. 4 shows a particular construction 21-1 of the $X_1$ bits generator 21 for use with the FIG. 3 re-sampler 10-2 in the FIG. 1 DTV transmitter. A read-only memory 22 responds to input addressing received from a symbol counter 23 to supply $X_1$ bits to the re-sampler 10-2 of FIG. 3. FIG. 5 is a table showing a possible set of $X_1$ bits stored in the ROM 22. The symbol counter 23 is of a type supplying consecutive counts zero through forty-seven and rolling back to zero count after forty-seven count. If the trellis encoder 15 receives $X_1$ bits that change value every second $X_1$ bit for each of the twelve trellis coding phases, the trellis encoder 15 generates all four types of $Z_1$, $Z_0$ pairs in substantially the same number over a long enough period of time. By staggering the way the $X_1$ repeats occur in the twelve trellis coding phases, the length of this period of time can be shortened some.

However, there is a preference that each grouping of the halved-code-rate signal in the convolutional interleaver 13 response contains 48 or a multiple of 48 successive symbols. This can be achieved most of the time by grouping the halved-code-rate signal in the time-division multiplexer 5 response so it occurs in bands of twelve contiguous data segments.

Since the $X_2$ bits are randomized, the $Z_2$ bits supplied from the precoder 14 are also randomized. The randomized nature of the $Z_2$ bits, all four types of $Z_1$, $Z_0$ pairs occurring in substantially the same number over a period of time, and the independence of the $Z_2$ and $Z_1$ bits cause the eight 8VSB symbols to occur substantially as often as each other in the robust modulation. Accordingly, the ratio of peak power to average power in the robust modulation generated in response to the particular construction 21-1 of the $X_1$ bits generator 21 is substantially the same as in normal 8VSB modulation.

FIG. 4 shows a detector 24 of the start of the data field connected to supply the symbol counter 23 with a reset pulse at the beginning of each data field, which reset pulse resets the count to 000 0000. A typical construction for the detector 24 includes a match filter for generating a pulse response to the PN511 sequence in the initial data segment of the data field DFS. The typical construction for the detector 24 further includes a clocked digital delay line for delaying that pulse response to provide the reset pulse to the symbol counter 23 to reset it to the 000 0000 count at the beginning of the actual data field, exclusive of synchronizing signals.

Figure 6:
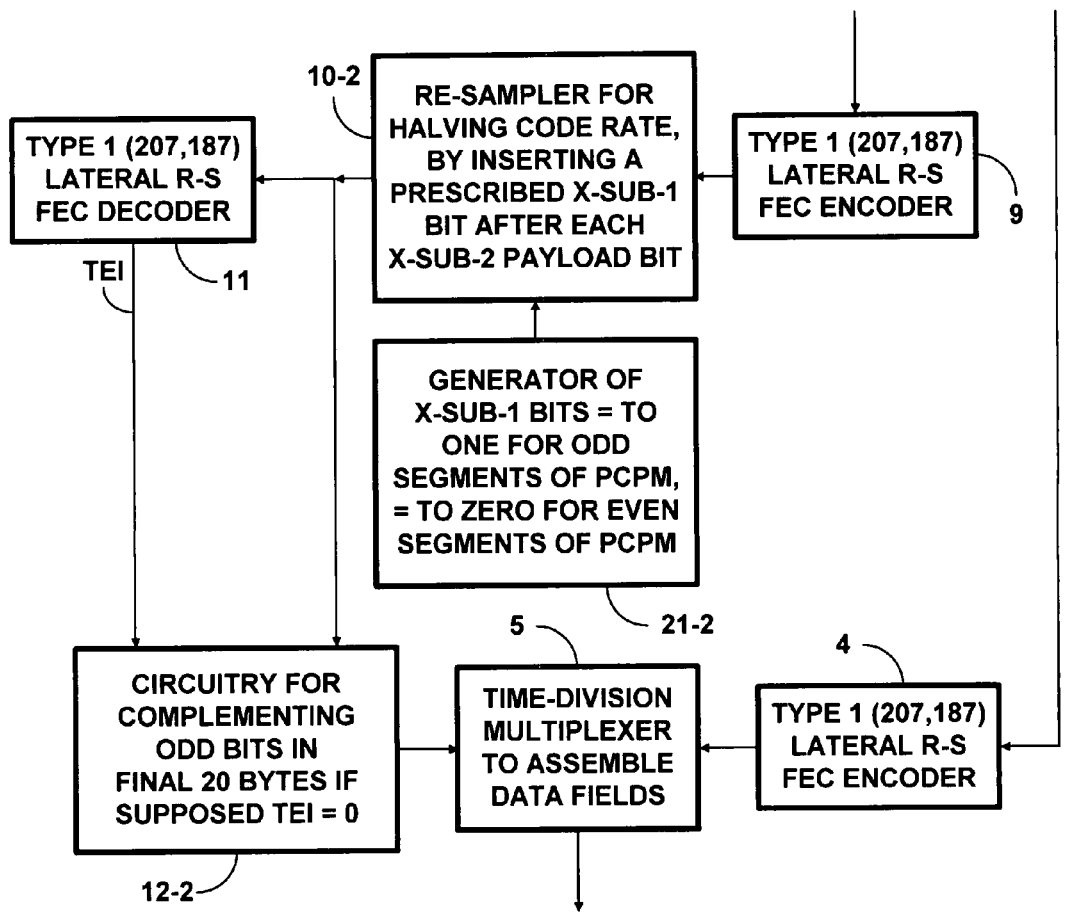
FIGS. 6 and 7 are each a schematic diagram showing in more detail a species of the FIG. 1 DTV transmitter apparatus that transmits prescribed-coset-pattern-modulation signals of a respective type other than that previously shown and described in U.S. patent application Ser. No. 10/955,212.
Figure 7:
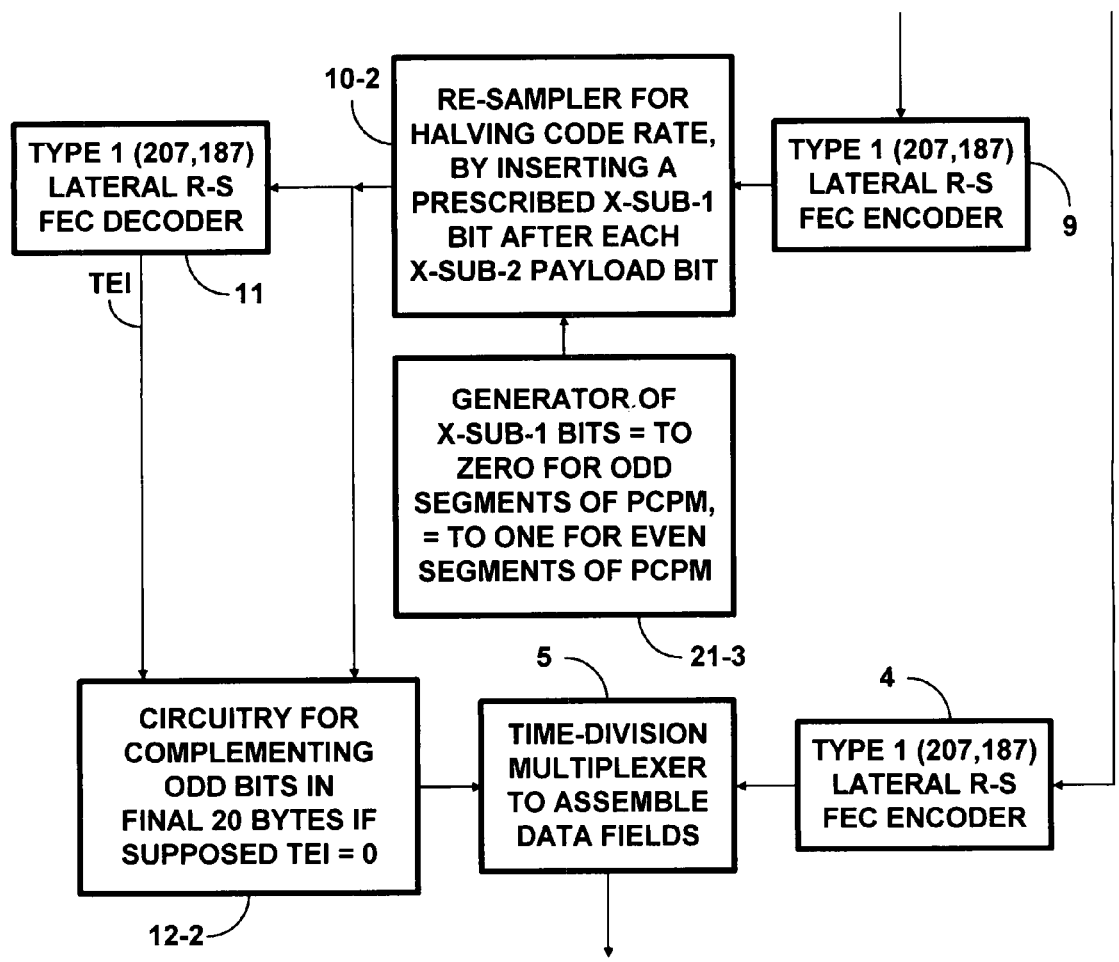

Each of the FIGS. 6 and 7 shows in more detail a species of the FIG. 1 DTV transmitter apparatus that transmits PCPM signals of a respective type other than that previously shown and described in U.S. patent application Ser. No. 10/955,212. The FIG. 6 species of the FIG. 1 DTV transmitter apparatus differs from that described with reference to FIGS. 3, 4 and 5 in that the re-sampler 10-2 is connected for receiving $X_1$ bits from an $X_1$ bits generator 21-2 that is a different species of the generic $X_1$ bits generator 21 shown in FIG. 3. The $X_1$ bits generator 21-2 inserts a ONE after each $X_2$ bit in the initial halves of data segments received from the (207, 187) LRS FEC encoder 9 and inserts a ZERO after each $X_2$ bit in the final halves of data segments. This halves the code rate of the re-sampler 10-2 response compared to the (207, 187) LRS FEC encoder 9 response. The $X_1$ bits generator 21-2 generates $X_1$ bits that are ONEs for "odd" data segments of PCPM and that are ZEROes for "even" data segments of PCPM. Presuming that code rate is one-half that of ordinary 8VSB, an "odd" data segment of PCPM is the earlier one of a pair of data segments, which earlier segment codes the initial half of an MPEG-2-compliant data packet. Then, an "even" data segment of PCPM is the later one of that pair of data segments, which later segment codes the final half of the MPEG-2-compliant data packet. If code rate is reduced to one-quarter that of ordinary 8VSB by coding of randomized data supplied to the R-S FEC encoder 9, the PCPM signal will be generated in groups of four data segments each. The first and third successive segments of each such group are considered to be "odd", and the second and fourth successive segments of each such group are considered to be "even".

The FIG. 7 species of the FIG. 1 DTV transmitter apparatus differs from other species thusfar described in detail in that the re-sampler 10-2 is connected for receiving $X_1$ bits from an $X_1$ bits generator 21-3 that is yet another different species of the generic $X_1$ bits generator 21 shown in FIG. 3. The $X_1$ bits generator 21-3 inserts a ZERO after each $X_2$ bit in the initial halves of data segments received from the (207, 187) LRS FEC encoder 9 and inserts a ONE after each $X_2$ bit in the final halves of data segments. This halves the code rate of the re-sampler 10-2 response compared to the (207, 187) LRS FEC encoder 9 response. The $X_1$ bits generator 21-3 generates $X_1$ bits that are ZEROes for "odd" data segments of PCPM and that are ONEs for "even" data segments of PCPM.

Figure 8:
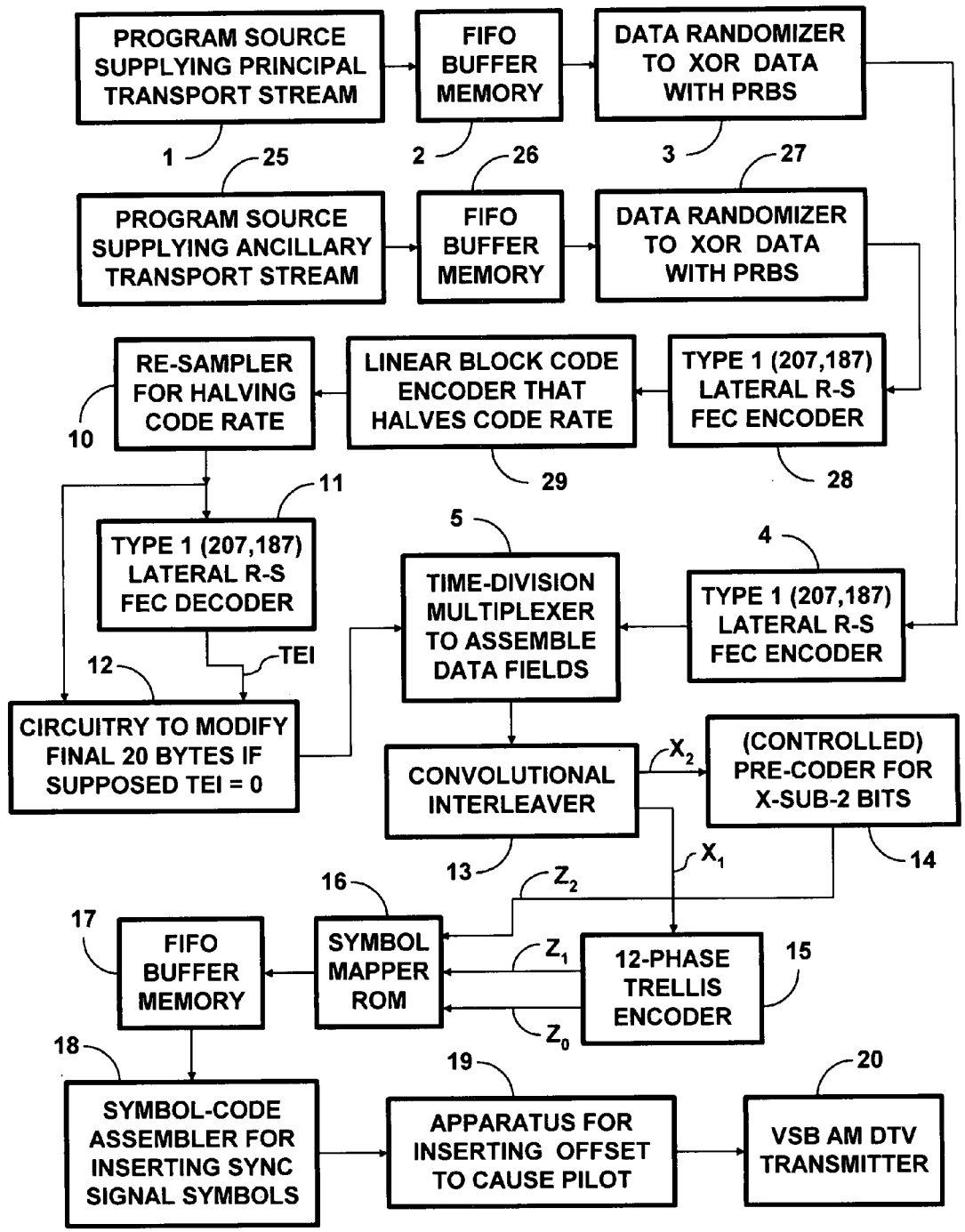
FIG. 8 is a generic schematic diagram of DTV transmitter apparatus that provides for the transmission of ordinary 8VSB signals in time-division multiplex with more robust signals of quartered code rate, which DTV transmitter apparatus embodies certain aspects of the invention.

FIG. 8 shows a modified FIG. 1 DTV transmitter apparatus that provides for the transmission of ordinary 8VSB signals in time-division multiplex with more robust signals of quartered code rate. FIG. 1 shows a program source 25 of an ancillary transport stream connected for supplying the successive 187-byte data packets in that transport stream to be written into a first-in/first-out buffer memory 26 for temporary storage therein. A data randomizer 27 is connected for receiving data packets read from the FIFO buffer memory 26. The data randomizer 27 is operated for randomizing the bits in those data packets by exclusive-ORing them with the bits of the PRBS for the first of the four data segments in the non-interleaved data field that will contain the data packet after it is encoded to increase redundancy and reduce code rate.

A (207, 187) lateral Reed-Solomon forward-error-correction encoder 28 of the first type is connected for receiving from the data randomizer 27 the randomized 187-byte data packets of the ancillary transport stream. The (207, 187) LRS FEC encoder 28 converts these randomized 187-byte data packets to respective 207-byte segments of (207, 187) LRS FEC coding of conventional first type. However, preferably the (207, 187) LRS FEC encoder 28 is of a construction that does not append the respective twenty parity bytes of the (207, 187) LRS FEC coding of each randomized 187-byte data packet after the conclusion thereof. In a preferred construction the (207, 187) LRS FEC encoder 9 breaks the twenty parity bytes into four 5-byte groups, inserted after respective quarters of the randomized 187-byte data packet. FIG. 10 depicts the form of each data segment generated by the preferred construction of the (207, 187) LRS FEC encoder 28. The (207, 187) LRS FEC encoder 28 is connected for supplying its response as input signal to a linear-block-code encoder 29. The LBC encoder 29 essentially halves code rate in its response. The re-sampler 10 is connected for receiving that response as its input signal and halving it again, resulting in the re-sampler 10 response being essentially one-quarter the code rate of ordinary 8 VSB signal. U.S. patent application Ser. No. 11/119,662 titled "DIGITAL TELEVISION SIGNALS USING LINEAR BLOCK CODING" filed 2 May 2005 by A. L. R. Limberg describes linear block coding that can be used by the LBC encoder 29 and that patent application is incorporated herein by reference.

Application Ser. No. 11/119,662 describes the use of (23, 12) binary Golay code, (24, 12) binary extended Golay code, (8, 4) linear block code, (16, 8) linear block code and (15, 8) linear block code to reduce code rate and increase robustness in DTV signals. The (8, 4), (16, 8) and (15, 8) linear block codes are better suited to locating byte errors on behalf of a subsequent (207, 187) LRS FEC decoder than the longer Golay codes are.

If the LBC encoder 29 employs an (8, 4) linear block code or a (16, 8) linear block code, the encoder 29 halves code rate exactly. FIG. 10 shows five bytes of LRS FEC parity at the conclusion of each quarter data segment generated by the preferred construction of the (207, 187) LRS FEC encoder 28. These five bytes are stretched to ten bytes of LRS FEC parity information at the conclusion of each half data segment generated by the LBC encoder 29 if the LBC encoder 29 employs an (8, 4) linear block code or a (16, 8) linear block code. The re-sampler 10 stretches the ten bytes of LRS FEC parity information to twenty bytes of LRS FEC parity information in each of the data segments it generates. Suppose that the (207, 187) LRS FEC decoder 11 determines that one of the 207-byte data segments that the re-sampler 10 generates has to be modified so that legacy DTV receivers will not mistake it for an (207, 187) LRS FEC codeword. Then, the circuitry 12 to modify the final twenty bytes of the segment will modify twenty bytes of re-sampled linear-block-coded LRS-FEC-code parity bytes information, but not the preceding 187 bytes of re-sampled linear-block-coded data packet information. The inversion of linear-block-coded LRS-FEC-code parity bytes information will result in LRS FEC codewords which LBC decoding will recover inverted LRS-FEC-code parity bytes from.

If a (15, 8) linear block code is used, an additional "spacer" byte is inserted before the five bytes of LRS FEC parity at the conclusion of each quarter data segment. The LBC encoder 29 will code the six bytes into 90 bits if (15, 8) linear block code is being used, and the re-sampler 10 will stretch the 90 bits to 180 bits. Suppose that the (207, 187) LRS FEC decoder 11 determines that one of the 207-byte data segments that the re-sampler 10 generates has to be modified so that legacy DTV receivers will not mistake it for an (207, 187) LRS FEC codeword. Then, the circuitry 12 to modify the final 20 bytes of the segment will modify 160 of the 180 bits containing LRS FEC parity byte information and "spacer" byte information, but no data packet information. All 150 of the bits that code the five (207, 187) LRS FEC parity bytes in (15, 8) linear block code will be inverted in order to make the modification if the re-sampler 10 generates P-2VSB signal. Only the odd-occurring ones of these bits will be inverted in order to make the modification if the re-sampler 10 generates PCPM signal. In either case the (15, 8) LBC codewords coding the five (207, 187) LRS FEC parity bytes in (15, 8) linear block code are completely inverted and when decoded will result in the complemented bits of the five (207, 187) LRS FEC parity bytes.

If a (23, 12) binary Golay code is used, an additional "spacer" byte is inserted before the five bytes of LRS FEC parity at the conclusion of each quarter data segment, so no (23, 12) binary Golay codeword will contain data packet information as well as (207, 187) LRS-FEC-code information. The LBC encoder 29 will code the six bytes into four (23, 12) binary Golay codewords or 92 bits, and the re-sampler 10 will stretch the 92 bits to 184 bits. Suppose that the decoder 11 for (207, 187) LRS FEC code determines that one of the 207-byte data segments that the re-sampler 10 generates has to be modified so that legacy DTV receivers will not mistake it for an (207, 187) LRS FEC codeword. Then, the circuitry 12 to modify the final 20 bytes of the segment would modify 160 of the 184 bits containing LRS FEC parity byte information and "spacer" byte information, but no data packet information. Modifying only a portion of a re-sampled LBC codeword is problematic, however, since a partially modified LBC codeword does not decode sensibly. Possibly the best solution to this problem is replacing the circuitry 12 with circuitry to modify only the final 92 bits of the data segment if it appears to be a valid (207, 187) LRS FEC codeword. This modification of only twelve final bytes in the data segment should still overwhelm the error-correction capability of (207, 187) LRS-FEC decoders in legacy DTV receivers.

If the LBC encoder 29 employs a (24, 12) binary extended Golay code, the LBC encoder 29 halves code rate exactly. The five bytes of LRS FEC parity at the conclusion of each quarter data segment generated by the preferred construction of the (207, 187) LRS FEC encoder 28 are not coded independently of the packet data, however. This complicates the recovery of data that is modified so that legacy DTV receivers will not mistake it for an (207, 187) LRS FEC codeword. The last six bytes at the conclusion of each quarter data segment generated by the preferred construction of the (207, 187) LRS FEC encoder 28 are stretched to twelve bytes by the LBC encoder 29. The re-sampler 10 will stretch these twelve bytes to twenty-four bytes. If the circuitry 12 were instructed to modify the final twenty bytes of the segment, data packet information would be modified in addition to LRS FEC parity information being modified. In addition to this problem, there is the further problem that only a portion of a re-sampled LBC codeword is modified. These problems are solved by replacing the circuitry 12 with circuitry to modify only the final 96, 120 or 144 bits of the data segment if it appears to be a valid (207, 187) LRS FEC codeword. These modifications of only twelve, fifteen or eighteen final bytes in the data segment should each overwhelm the error-correction capability of (207, 187) LRS-FEC decoders in legacy DTV receivers. Replacement of the circuitry 12 in the DTV transmitter apparatuses of FIGS. 1 (or 21) and 8 with circuitry to modify only the final twelve bytes in the data segment, irrespective of the linear block code to be used, embodies an aspect of the invention. The DTV receiver apparatuses to be described would have to be modified to accommodate this difference in the DTV transmitter apparatuses, but one skilled in the art of DTV receiver design can easily make this design change.

Figure 11:
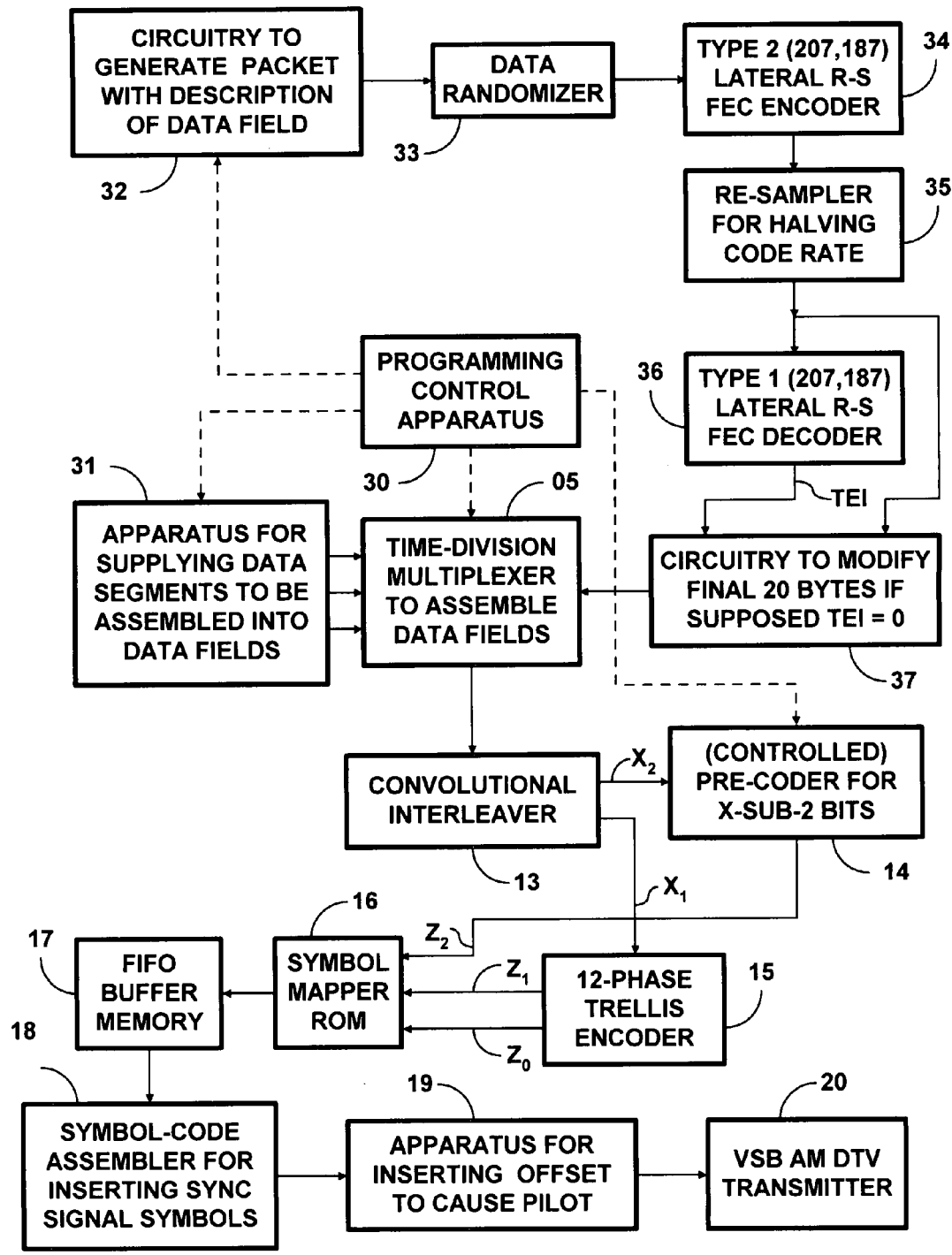
FIG. 11 is a schematic diagram of a modification made to DTV transmitter apparatus of the general type shown in the previous figures, which modification provides for supplying DTV receivers with advance information concerning the nature of robust transmissions.

FIG. 11 shows a modification that can be made to DTV transmitter apparatus as described supra, which modification provides for supplying DTV receivers with advance information concerning the nature of robust transmissions. Programming control apparatus 30 controls the operation of apparatus 31 for supplying data segments to be assembled into data fields, which apparatus 31 is, for example, of a type described in connection with FIG. 1 or FIG. 8. The programming control apparatus 30 also controls the assembly of data fields by a time-division multiplexer 05 that replaces the multiplexer 5 shown in FIGS. 1 and 8.

The programming control apparatus 30 supplies information concerning its programming procedures to circuitry 32 for generating a respective 187-byte description of each data field, which description includes a listing of the type of modulation employed in each successive data segment of that particular data field. A data randomizer 33 randomizes the data in each 187-byte description of a respective data field. A (207, 187) lateral Reed-Solomon forward-error-correction encoder 34 of a second type is connected for generating a respective 207-byte R-S FEC code responsive to each 187-byte description of a data field. A re-sampler 35 is connected for receiving these 207-byte segments from the (207, 187) lateral R-S FEC encoder 34 and generates in response to each of these 207-byte segments a respective pair of 207-byte segments at halved code rate. A decoder 36 for (207, 187) lateral Reed-Solomon forward-error-correction codewords is connected for receiving the 207-byte segments that the re-sampler 35 supplies. The LRS FEC decoder 36 ascertains whether each segment that the re-sampler 35 supplies is a (207, 187) LRS FEC codeword as specified in A/53, Annex D, §§ 4.2.3. The LRS FEC decoder 36 attempts to correct the segment to be such a codeword if it is not already. The LRS FEC decoder 36 generates a transport error indicator (TEI) bit that is a ZERO if the segment is apparently a (207, 187) LRS FEC codeword that is correct or can be corrected by the decoders for such codewords in legacy DTV receivers. The LRS FEC decoder 36 generates a TEI bit that is a ONE if the segment is apparently incapable of correction.

One of the input ports of the time-division multiplexer 05 used to assemble data fields is connected for receiving 207-byte segments from circuitry 37, which circuitry 37 is connected for receiving 207-byte segments from the re-sampler 35. When the TEI bit that the circuitry 37 receives as a control signal from the LRS FEC decoder 36 is ONE, the circuitry 37 reproduces a 207-byte segment supplied thereto by the re-sampler 35. When the TEI bit that the circuitry 37 receives as a control signal from the LRS FEC decoder 36 is ZERO, the circuitry 37 reproduces the initial 187 bytes of a 207-byte segment supplied thereto by the re-sampler 35. However, when that TEI bit is ZERO, the circuitry 37 modifies the final 20 bytes of the 207-byte segment that it supplies to the time-division multiplexer 05. This prevents the segment being mistaken for a (207, 187) LRS FEC codeword that is correct or can be corrected by the decoders for such codewords in legacy DTV receivers.

FIG. 11 shows the programming control apparatus 30 connected for supplying control signal to the controlled pre-coder 14. This control signal disables pre-coding at least when bytes of P-2VSB signal are to be transmitted. So long as NTSC analog television signals are being transmitted, the programming control apparatus 30 enables pre-coding by the controlled pre-coder 14 when bytes of ordinary 8VSB signal or bytes of PCPM signal are to be transmitted. After the cut-off date for transmitting NTSC analog television signals, it is expected that the pre-coding of $X_2$ payload bits will be discontinued.

FIG. 12 shows the response of a preferred construction of the (207, 187) LRS FEC encoder 34 for a randomized 187-byte description of a future data field supplied from the data randomizer 33, presuming this description is to be transmitted at one half the code rate of ordinary 8VSB. This 207-byte data segment response consists of two consecutive half segments of data. The initial one of these half segments of data begins with a link-level header that is three bytes long and signals that the remaining portion of the initial half segment will contain a set of first characteristics of the 312 data segments in a future data field. The final one of these half segments of data begins with a different header that is three bytes long and signals that the remaining portion of the final half segment will contain a set of second characteristics of the 312 data segments in a future data field. The headers of the initial and final half segments of data should be readily distinguishable from each other. The same packet identifier (PID) can be used for both headers, with the continuity count in the last four bits of each header being different in the two headers, for example. The link level header beginning the initial half segment is followed by 312 pairs of bits, each of these bit-pairs describing first characteristics of a respective segment of a future data field. The 78 bytes describing the first characteristics of 312 segments of a future data field are followed by twelve and a half bytes of auxiliary information. At least five and a half bytes of this auxiliary information are selected so as to prevent the initial half segment generating a correct or correctable (207, 187) LRS FEC codeword when re-sampled to halved code rate. The initial half segment of data concludes with the initial ten parity bytes of the (207, 187) LRS FEC coding of second type. The link level header beginning the final half segment is followed by 312 pairs of bits, each of these bit-pairs describing second characteristics of a respective segment of the future data field. The 78 bytes describing the second characteristics of 312 segments of a future data field are followed twelve and a half bytes of auxiliary information. At least five and a half bytes of this auxiliary information is selected so as to prevent the final half segment generating a correct or correctable (207, 187) LRS FEC codeword when re-sampled to halved code rate. The final half segment of data concludes with the final ten parity bytes for the (207, 187) LRS FEC coding of second type.

It should be possible to code useful data into at least fourteen of the twenty-five bytes of auxiliary information. One example of useful auxiliary information is which of successive future data fields will use the pattern of robust transmission specified in the four-bit half-bytes describing the modulation scheme used in a respective data segment. This facilitates redundant transmission of information concerning the patterns of robust transmission.

FIG. 13 shows a representative format for the 312 bit-pairs in the initial half of the FIG. 12 (or 15) data segment that describe first characteristics of respective data segments in a future data field. The initial bit of the bit-pair is a ONE if the described data segment was modified to avoid legacy DTV receivers mistaking it for a complete (207, 187) R-S FEC codeword. The initial bit of the bit-pair is otherwise a ZERO. The final bit of the bit-pair is a ZERO if the described data segment contains only a later portion of a (207, 187) R-S FEC codeword re-sampled to less than 2/3 code rate, which re-sampled codeword began in an earlier data segment. The final bit of the bit-pair is a ONE if the described data segment contains a complete (207, 187) R-S FEC codeword transmitted at 2/3 code rate or a beginning portion of a (207, 187) R-S FEC codeword re-sampled to less than 2/3 code rate.

FIG. 14 shows a representative format for the 312 bit-pairs in the final half of the FIG. 12 (or 15) data segment that describe second characteristics of respective data segments in a future data field. Each of these bit-pairs indicates the type of modulation used in the respective data segment that the bit-pair characterizes. E.g., 00 indicates the full 8VSB alphabet is used; 01 indicates the first-coset restricted-symbol-alphabet is used; 10 indicates the second-coset restricted symbol alphabet is used; 11 indicates the P-2VSB restricted symbol alphabet is used. The first-coset restricted-symbol-alphabet signal excludes the −7, −5, +1 and +3 symbol values of the full 8VSB alphabet. The second-coset restricted-symbol-alphabet signal excludes the −3, −1, +5 and +7 symbol values of the full 8VSB alphabet. P-2VSB signal confines the symbol alphabet to −7, −5, +5 and +7 symbol values.

Figure 15:
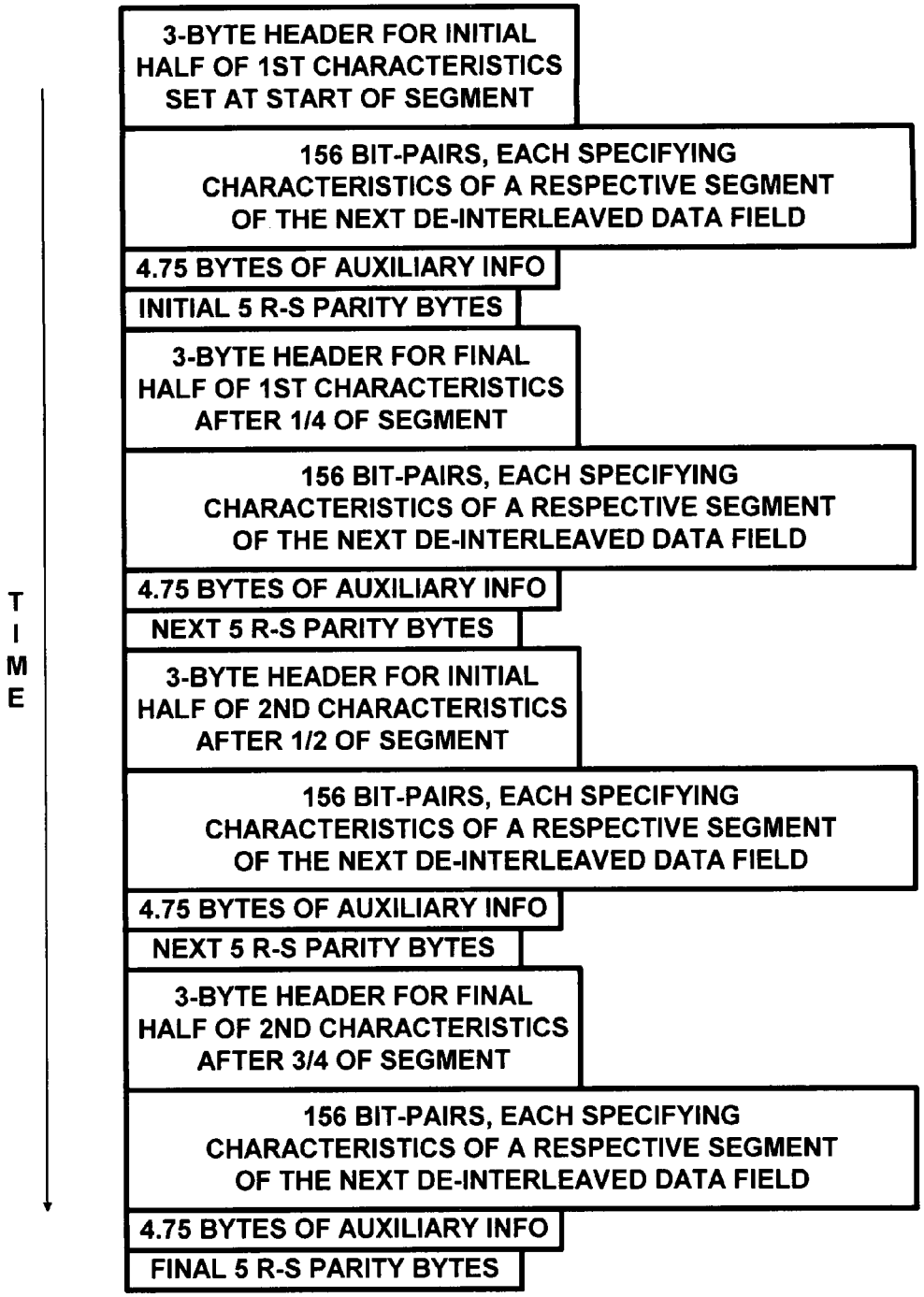
FIG. 15 is a depiction of a quartered-code-rate future-field-description signal that the FIG. 11 modification of DTV transmitter apparatus alternatively uses for supplying DTV receivers with advance information concerning the nature of robust transmissions.

FIG. 15 shows the response of the (207, 187) LRS FEC encoder 34 to a randomized 187-byte description of a future data field supplied from the data randomizer 33, presuming this description is to be transmitted at one quarter the code rate of ordinary 8VSB. This 207-byte data segment response consists of four consecutive quarter segments of data. The initial one of these quarter segments of data begins with a link-level header that is three bytes long, and the three successive ones of these quarter segments of data each begin with different link-level headers each of which is three bytes long. By way of explicit example, the four headers can use the same PID, but be distinguishable from each other based on the continuity count in the last four bits of each successive header. The PID used to identify descriptions of future data fields transmitted at one-quarter the code rate of ordinary 8VSB is preferably different from the PID used to identify descriptions of future data fields transmitted at one-half the code rate of ordinary 8VSB. Each header is followed by 156 bit-pairs, each describing a respective one of the segments of a future data field. The 39 bytes in each quarter segment of data describing 156 segments of a future data field are followed four and three-quarters bytes of auxiliary information. At least two and three-quarters bytes of this auxiliary information are selected so as to prevent the quarter segment generating a correct or correctable (207, 187) LRS FEC codeword when re-sampled to quartered code rate. The initial quarter segment of data concludes with the first five parity bytes of the second type (207, 187) LRS FEC coding. The second quarter segment of data concludes with the next five parity bytes of the second type (207, 187) LRS FEC coding. The third quarter segment of data concludes with the next five parity bytes of the second type (207, 187) LRS FEC coding. The final quarter segment of data concludes with the last five parity bytes of the second type (207, 187) LRS FEC coding.

FIGS. 12 and 15 split up the information concerning the first and second characteristics of respective data segments in a future data field so that it is possible to omit sending the information concerning the second characteristics of the data segments while still sending the information concerning their first characteristics. The type of modulation used in segments of robust data can be determined from analysis of the segments of robust data themselves. Splitting up the information concerning the first and second characteristics of respective data segments in a future data field this way also allows sending the information concerning the second characteristics of the data segments without sending the information concerning their first characteristics.

Figure 16A:
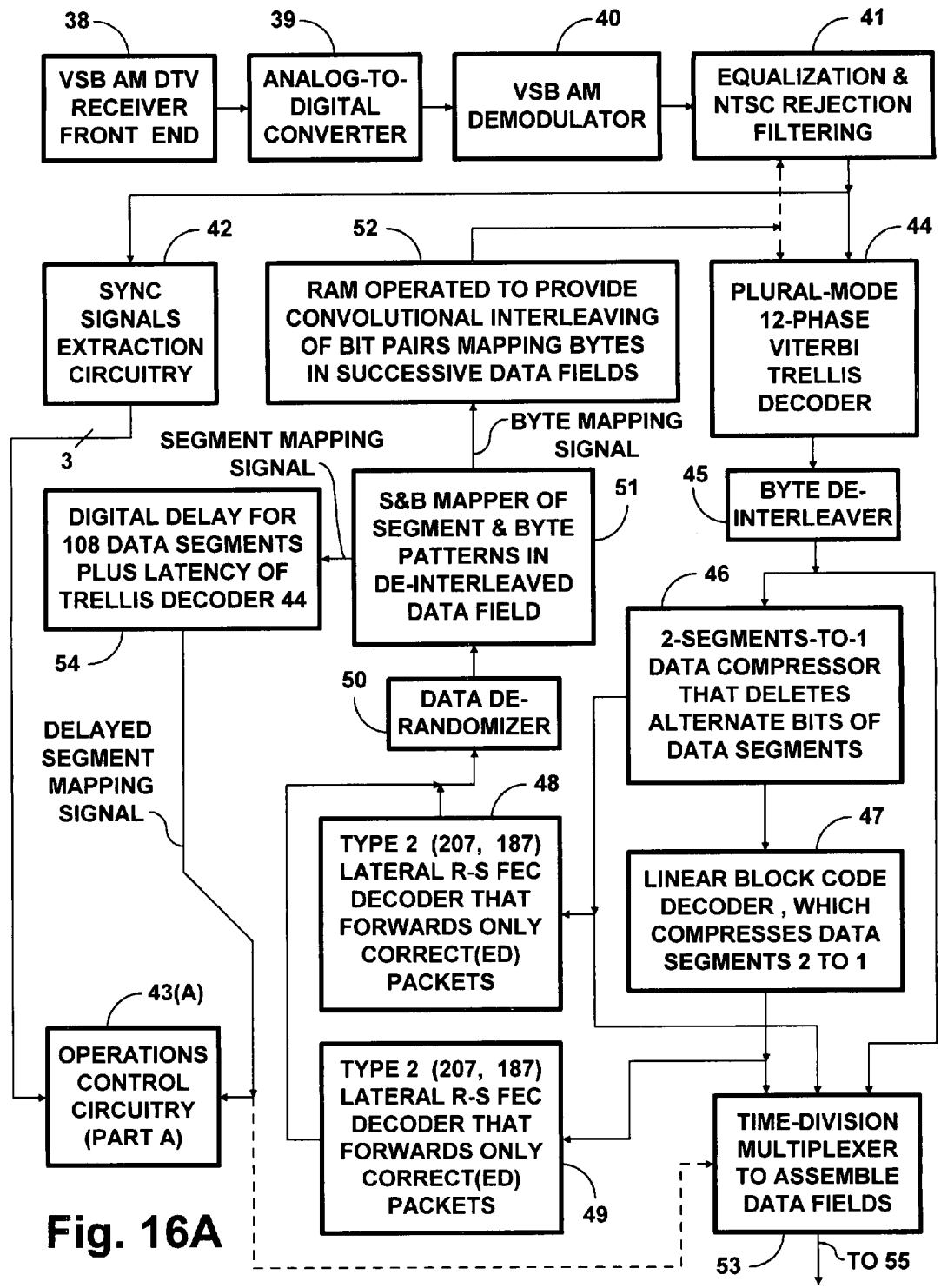
FIGS. 16A and 16B combine to form a FIG. 16 schematic diagram of DTV receiver apparatus embodying an aspect of the invention, which DTV receiver apparatus can receive DTV signals as transmitted by the DTV transmitter apparatuses of FIGS. 1 and 8.
Figure 16B:
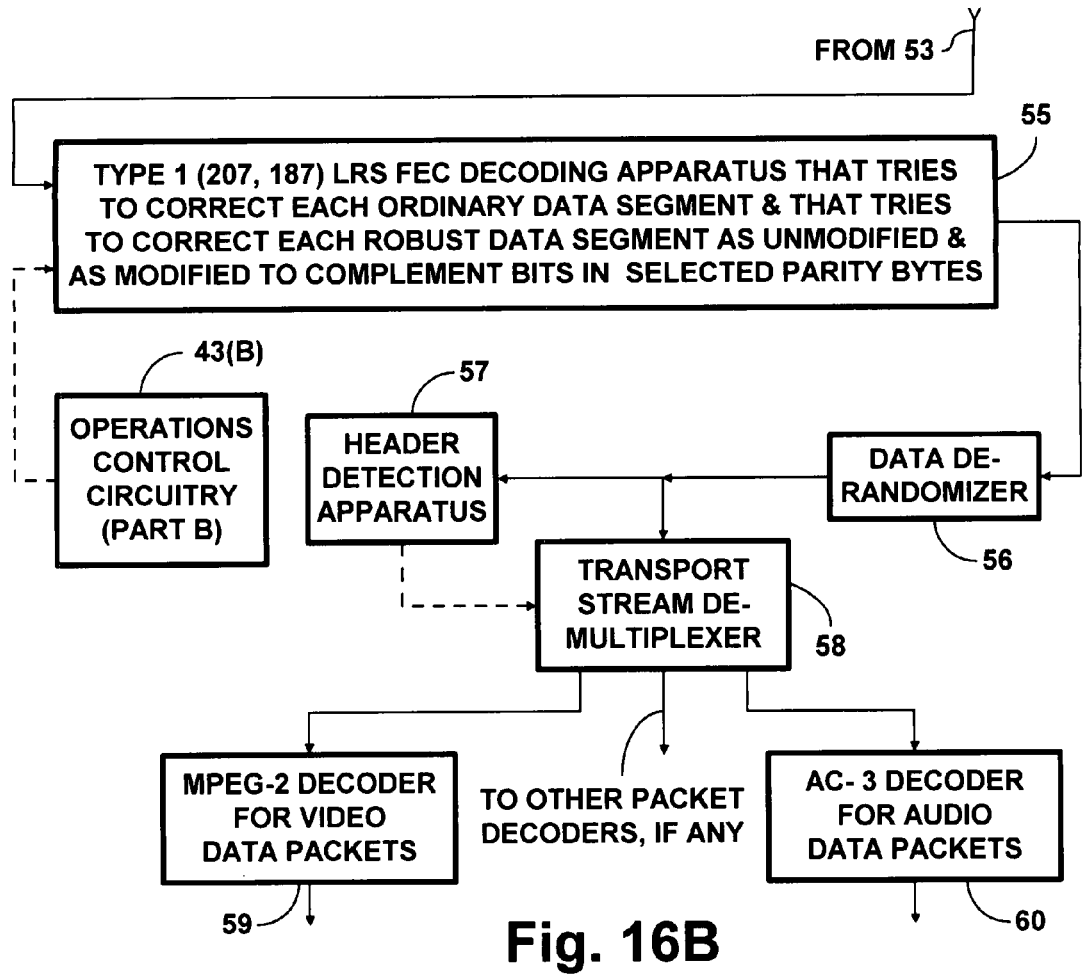

FIGS. 16A and 16B show initial and final portions, respectively, of FIG. 16 DTV receiver apparatus which utilizes the information concerning the patterns of robust transmission that is received from DTV transmitter apparatus modified per FIG. 11. The FIG. 16A receiver apparatus includes a vestigial-sideband amplitude-modulation (VSB AM) DTV receiver front-end 38 for selecting a radio-frequency DTV signal for reception, converting the selected RF DTV signal to an intermediate-frequency DTV signal, and for amplifying the IF DTV signal. An analog-to-digital converter 39 is connected for digitizing the amplified IF DTV signal supplied from the DTV receiver front-end 38. A demodulator 40 is connected for demodulating the digitized VSB AM IF DTV signal to generate a digitized baseband DTV signal, which is supplied to digital filtering 41 for equalization of channel response and for rejection of co-channel interfering NTSC signal. Synchronization-signals-extraction circuitry 42 is connected for receiving the digital filtering 41 response. Responsive to data-field-synchronization (DFS) signals, the sync-signals-extraction circuitry 42 detects the beginnings of data frames and fields. Responsive to data-segment-synchronization (DSS) signals, the sync-signals-extraction circuitry 42 detects the beginnings of data segments.

FIGS. 16A and 16B show parts 43(A) and 43(B), respectively, of operations control circuitry 43 for controlling operations within the FIG. 16 DTV receiver apparatus. Showing the operations control circuitry 43 in two parts is an artifice used in the drawings to avoid running numerous connections from elements shown in one of FIGS. 16A and 16B to elements shown in the other of these figures. FIG. 16A shows that part 43(A) of the operations control circuitry 43 is connected for receiving DFS signal, DSS signal and clocking signal at an even multiple of symbol rate via respective connections from the sync-signals-extraction circuitry 42 in FIG. 16A. These signals are provided with respective delays by means not explicitly shown, which delays compensate for latent delays accumulated in the FIG. 16A circuitry.

A plural-mode 12-phase trellis decoder 44 of Viterbi type is connected for receiving the digital filtering 41 response and performing symbol decoding procedures to recover bytes of data. These symbol coding procedures are carried out in the manner prescribed by a bit pair that the trellis decoder 44 receives as a mode selection signal. Reception of the bit pair 00 as its mode selection signal indicates to the plural-mode 12-phase trellis decoder 44 that the symbols it currently receives are from ordinary 8VSB transmission. Accordingly, the ranges of decision that the trellis decoder 44 uses in decoding the trellis coding are the conventional ones for receiving A/53 DTV broadcasts. The decision tree in the plural-mode 12-phase trellis decoder 44 is not pruned. Reception of the bit pair 01 as its mode selection signal indicates to the trellis decoder 44 that the symbols it currently receives are exclusively from the first coset. The trellis decoder 44 adjusts its ranges of decision accordingly. Also, the decision tree is pruned in the trellis decoder 44 so as to preclude −7, −5, +1 and +3 symbol decisions. Reception of the bit pair 10 as its mode selection signal indicates to the trellis decoder 44 that the symbols it currently receives are exclusively from the second coset. The trellis decoder 44 adjusts its ranges of decision accordingly. Also, the decision tree is pruned in the trellis decoder 44 so as to preclude −3, −1, +5 and +7 symbol decisions. Reception of the bit pair 11 as its mode selection signal indicates to the trellis decoder 44 that the symbols it currently receives are from pseudo-2VSB transmission, the ranges of decision are adjusted accordingly. Also, the decision tree is pruned in the trellis decoder 44 so as to preclude −3, −1, +1 and +3 symbol decisions.

The trellis decoder 44 is connected to supply eight-bit bytes of data to a byte de-interleaver 45 that complements the convolutional interleaver 12 in the FIG. 1 DTV transmitter apparatus. A 2-segments-to-1 data compressor 46 that deletes alternate bits of data segments is connected for receiving successive data segments from the byte de-interleaver 45. The data compressor 46 compresses successive overlapping pairs of data segments to respective single data segments and rearranges them so that the (207, 187) LRS FEC codewords conclude with their parity bytes. Only certain ones of these single data segments reproduce data segments generated by the R-S FEC encoders at the DTV transmitter. A linear-block-code (LBC) decoder 47 is connected for receiving, as its input signal, the output signal from the 2-segments-to-1 data compressor 46. The data compressor 46 output signal is supplied at a code rate one-half that of ordinary 8VSB signal. The LBC decoder 47 decodes the linear block coding sent from a DTV transmitter of the type shown in FIG. 8, for example, to supply MPEG-2-compliant packets at a code rate one-quarter that of ordinary 8VSB signal. The LBC decoder 47 rearranges the (207, 187) LRS FEC codewords resulting from LBC decoding so that they conclude with their LRS-FEC-code parity bytes.

The FIG. 16 DTV receiver is constructed based on a presumption that the DTV transmitter transmits descriptions of a future data field at either one-half or one-quarter the code rate of ordinary 8VSB signal. Accordingly, a decoder 48 for second type (207, 187) lateral Reed-Solomon forward-error-correction code is connected for receiving the single data segments that the 2-segments-to-1 data compressor 46 generates. Another decoder 49 for second type (207, 187) lateral Reed-Solomon forward-error-correction code is connected for receiving the single data segments that the linear-block-code decoder 47 generates. Each of the LRS-FEC-code decoders 48 and 49 forwards to a data de-randomizer 50 only those correct(ed) data packets it finds to be free of byte error or is able to correct the byte errors thereof. The data de-randomizer 50 is connected for supplying a de-randomized response to each correct(ed) data packet, which de-randomized response is applied to a symbol- and byte-mapper 51 as input signal thereto. The S&B mapper 51 operates to map the pattern of the segments in the de-interleaved data fields and to map the pattern of the bytes within each segment. In preferred construction the S&B mapper 51 includes circuitry to verify from the 13-bit PID in the header of a data packet forwarded thereto that the packet describes the characteristics of the data segments in a future data field.

The S&B mapper 51 includes two small random-access memories, each used as a cache memory for the temporary storage of bit-pairs extracted from de-randomized data packets that the data de-randomizer 50 supplies. The storage locations in each cache memory are addressed by the number of the segment in the data frame(s) to which the temporarily stored half-byte corresponds. One of the cache memories temporarily stores the bit-pairs that describe the first characteristics of respective segments of future data fields. The other of the cache memories temporarily stores the bit-pairs that describe the second characteristics of respective segments of future data fields. At a suitable time the S&B mapper 51 extends a bit pair from each of the bit-pairs temporarily stored in the latter cache memory by repeating it 206 times. This is done to map the 207 bytes of a segment of non-interleaved data field as a row of 207 bit-pairs for writing to a random-access memory 52. These bit-pairs specify whether data segments contain ordinary 8VSB signal, first coset signal, second coset signal or P-2VSB signal. For example, these bit-pairs are read from their cache memory to load the stages of a parallel-in/serial-out register within the S&B mapper 51, which PISO register is operated as a shift register for writing to the RAM 52.

The RAM 52 is read so as to provide convolutional interleaving, generating a pattern of bit-pairs that map signal characteristics of each byte in the interleaved data field of the baseband DTV signal that the digital filtering 41 supplies to the trellis decoder 44. Because of trellis coding, there are twelve bits in each byte of the interleaved baseband DTV signal supplied to the trellis decoder 44. These twelve-bit bytes give rise to respective eight-bit bytes in the trellis decoder 44 response. When the bit-pairs read from the RAM 52 indicate restricted-alphabet symbols are currently being supplied to the plural-mode trellis decoder 44, the decision tree in the trellis decoding is selectively pruned. This pruning excludes decisions that currently received symbols have normalized modulation levels excluded from the restricted alphabet of 8VSB symbols currently in use.

When the bit pair 00 is read from the RAM 52 to the plural-mode trellis decoder 44, this control signal indicates to the trellis decoder 44 that the symbols it currently receives are from an ordinary 8VSB transmission and conditions the trellis decoder 44 to use the ranges of decision that are the conventional ones for receiving A/53 DTV broadcasts. The decision tree in the plural-mode 12-phase trellis decoder 44 is not pruned. When the bit pair 01 is read from the RAM 52, this control signal indicates to the trellis decoder 44 that the symbols it currently receives are from a first coset transmission exclusively and conditions the trellis decoder 44 to adjust its ranges of decision accordingly. Also, the decision tree is pruned in the trellis decoder 44 so as to preclude −7, −5, +1 and +3 symbol decisions. When the bit pair 10 is read from the RAM 52, this control signal indicates to the trellis decoder 44 that the symbols it currently receives are from a second coset transmission exclusively and conditions the trellis decoder 44 to adjust its ranges of decision accordingly. Also, the decision tree is pruned in the trellis decoder 44 so as to preclude −3, −1, +5 and +7 symbol decisions. When the bit pair II is read from the RAM 52, this control signal indicates to the trellis decoder 44 that the symbols it currently receives are from a pseudo-2VSB transmission and conditions the trellis decoder 44 to adjust its ranges of decision accordingly. Also, the decision tree is pruned in the trellis decoder 44 so as to preclude −3, −1, +1 and +3 symbol decisions. Supposing that the digital filtering 41 for equalization of channel response and for rejection of co-channel interfering NTSC signal uses decision-feedback equalization, the bit pairs read from the RAM 52 can be used to adjust a "smart" data slicer used to make the feedback decisions.

A time-division multiplexer 53 is connected to assemble fields of de-interleaved data, which are applied as input signal to (207, 187) lateral Reed-Solomon forward-error-correction decoding apparatus 55 shown in FIG. 16B. A first input port of the multiplexer 53 is connected for receiving successive data segments from the block code decoder 47. A second input port of the multiplexer 53 is connected for receiving successive data segments directly from the 2-segments-to-1 data compressor 46, except for delay not explicitly shown in FIG. 16A. A third input port of the multiplexer 53 is connected for receiving successive data segments directly from the byte de-interleaver 45. The multiplexer 53 selectively reproduces one of the three data segments concurrently supplied to its first, second and third input ports, as controlled by control signal that digital delay circuitry 54 supplies in delayed response to segment mapping signal supplied from the S&B mapper 51. The digital delay circuitry 54 delays the segment mapping signal 108 data segment intervals plus the latency of the trellis decoder 44. Fifty-four of the 108 data segment intervals of delay compensate for the delay incurred in convolutional interleaving of bytes in the RAM 52. Another 54 of the 108 data segment intervals of delay compensate for the delay incurred in the de-interleaver 45. The remaining four of the 108 data segment intervals of delay compensate for latencies in the cascade connection of the 2-segments-to-1 data compressor 46 and the LBC decoder 47. Further on in this specification, the operation of the multiplexer 53 will be explained in detail with reference to FIG. 19.

The trellis decoder 44 can be designed to supply an extension to each byte it supplies, which extension comprises one or more additional bits indicative of the confidence level that the byte is correct. The de-interleaver 45, the 2-segments-to-1 data compressor 46, the LBC decoder 47 and the time-division multiplexer 53 are then designed to preserve those byte extensions in their responses, so those byte extensions are available to help locate byte errors in subsequent Reed-Solomon forward-error-correction decoding procedures. The linear block codes that the LBC decoder 47 decodes are able to locate or help locate byte errors in subsequent Reed-Solomon forward-error-correction decoding procedures. So, the byte extensions may locate errors or possible errors detected by the decoder 47.

The de-interleaver 45, the 2-segments-to-1 data compressor 46, the LBC decoder 47 and the time-division multiplexer 53 can be designed to process data on a serial-byte basis. Alternatively, the de-interleaver 45 can be designed to supply data in single-bitstream format. The 2-segments-to-1 data compressor 46, the LBC decoder 47 and the time-division multiplexer 53 are then designed to process data on a serial-bit basis. Data then have to be parsed into bytes in the R-S FEC decoders 48, 49 and 55. The design aspects considered in this paragraph are within the ordinary skill of digital circuit designers.

FIG. 16B shows a (207, 187) Reed-Solomon forward-error-correction decoding apparatus 55 of type one connected to receive the response from the time-division multiplexer 53 as input signal. Using procedures to be explained, which differ at times from those employed in prior-art (207, 187)

LRS FEC decoding, the apparatus 55 recovers 187-byte data packets from respective selected ones of 207-byte data segments it receives from the time-division multiplexer 53. A de-randomizer 56 is connected for providing de-randomized response to these 187-byte data packets. The de-randomizer 56 is connected for supplying this de-randomized response to header detection apparatus 57 and to a transport stream de-multiplexer 58 controlled by response from the header detection apparatus 57. The transport stream de-multiplexer 58 responds to the header detection apparatus 57 detecting selected PIDs in certain types of the de-randomized data packets from the data de-randomizer 58 for sorting those types of de-randomized data packets to appropriate packet decoders. For example, video data packets are sorted to an MPEG-2 decoder 59. By way of further example, audio data packets are sorted to an AC-3 decoder 60. The data de-randomizer 56 will convert to a ONE the toggled TEI bit in a data packet indicating that it still contains byte errors. The MPEG-2 decoder 59 responds to the TEI bit in a packet of de-randomized data being ONE by not using the packet and by instituting measures to mask the effects of the packet not being used. AC-3 decoders known in the art respond to the TEI bit in packet of de-randomized data being ONE by not using the packet and by instituting measures to mask the effects of the packet not being used.

The (207, 187) LRS FEC decoding apparatus 55 is connected for receiving control signals from the operations control circuitry 43 directing its operations differently depending on whether the data segment supplied from the time-division multiplexer 53 was transmitted at the 2/3 code rate of an ordinary 8VSB signal, at one-half that code rate, or effectively at one-quarter that code rate. If the data segment was transmitted at the 2/3 code rate of an ordinary 8VSB signal, the twenty priority bytes are located at the conclusion of segment, and the (207, 187) LRS FEC decoding apparatus 55 operates similarly to prior-art (207, 187) LRS FEC decoding apparatus. If the data segment was transmitted at one-half the 2/3 code rate of an ordinary 8VSB signal, the operation of the (207, 187) LRS FEC decoding apparatus 55 takes into account that the twenty parity bytes are presumably located as shown in FIG. 9. If the data segment was transmitted in effect at one-quarter the 2/3 code rate of an ordinary 8VSB signal, the operation of the (207, 187) LRS FEC decoding apparatus 55 takes into account that the twenty parity bytes are presumably located as shown in FIG. 10.

When the supposed (207, 187) R-S FEC codeword supplied from the time-division multiplexer 53 reproduces a data segment from the 2-segments-to-1 data compressor 46, the operations control circuitry 43 conditions the (207, 187) LRS FEC decoding apparatus 55 to operate in the following way. An initial decoding procedure is performed using the twenty parity bytes as received in the supposed (207, 187) R-S FEC codeword of first type supplied from the time-division multiplexer 53. If this initial decoding procedure finds the data segment that is supposedly a (207, 187) R-S FEC codeword of first type to contain no byte error, the (207, 187) LRS FEC decoding apparatus 55 reproduces in its output signal the 187-byte data packet contained within the data segment. If this initial decoding procedure finds the data segment that is supposedly a (207, 187) R-S FEC codeword to contain correctable byte error, the (207, 187) LRS FEC decoding apparatus 55 corrects those byte errors. The decoding apparatus 55 supplies, as its output signal, the 187-byte data packet contained within the corrected data segment.

If the supposed (207, 187) R-S FEC codeword was generated from segments of robust data that had to be modified in order to be disregarded by legacy DTV receivers, this initial decoding procedure will find the supposed (207, 187) R-S FEC codeword to contain uncorrectable byte error. Then, after complementing just the initial ten of the twenty parity bytes as received in the supposed (207, 187) R-S FEC codeword supplied from the time-division multiplexer 53, a further decoding procedure is performed. If this further decoding procedure finds the data segment that is modified just in this first way to contain no byte error, the (207, 187) LRS FEC decoding apparatus 55 reproduces in its output signal the 187-byte data packet contained within the data segment as modified just in this first way. If this further decoding procedure finds the data segment that is so modified in this first way to contain correctable byte error, the (207, 187) LRS FEC decoding apparatus 55 corrects those byte errors. The decoding apparatus 55 supplies, as its output signal, the 187-byte data packet contained within the corrected data segment as modified in this first way and then corrected.

This further decoding procedure may find the supposed (207, 187) R-S FEC codeword as so first modified to contain uncorrectable byte error. Then, after complementing just the final ten of the twenty parity bytes as received in the supposed (207, 187) R-S FEC codeword supplied from the time-division multiplexer 53, a still further decoding procedure is performed. If this still further decoding procedure finds the data segment that is modified just in this second way to contain no byte error, the (207, 187) LRS FEC decoding apparatus 55 reproduces in its output signal the 187-byte data packet contained within that modified data segment. If this still further decoding procedure finds the data segment that is modified in this second way to contain correctable byte error, the (207, 187) LRS FEC decoding apparatus 55 corrects those byte errors. The decoding apparatus 55 supplies, as its output signal, the 187-byte data contained within the data segment as modified in this second way and then corrected.

This still further decoding procedure may find the supposed (207, 187) R-S FEC codeword to contain uncorrectable byte error. Then, after complementing all twenty of the parity bytes as received in the supposed (207, 187) R-S FEC codeword supplied from the time-division multiplexer 53, a final decoding procedure is performed. If this final decoding procedure finds the data segment that is modified in both the first and second ways to contain no byte error, the (207, 187) LRS FEC decoding apparatus 55 reproduces in its output signal the 187-byte data packet at the beginning of the data segment. If this final decoding procedure finds the data segment that is modified in both the first and second ways to contain correctable byte error, the (207, 187) LRS FEC decoding apparatus 55 corrects those byte errors. The decoding apparatus 55 supplies, as its output signal, the 187-byte data packet contained within the corrected data segment previously modified in both the first and second ways. If this final decoding procedure finds the supposed (207, 187) R-S FEC codeword to contain uncorrectable byte error, it is presumed that the data segment was not a (207, 187) R-S FEC codeword of the first type. The (207, 187) LRS FEC decoding apparatus 55 will supply the 187-byte data packet contained within the data segment after toggling the initial TEI bit of the packet to indicate the uncorrected byte error therein.

When the supposed (207, 187) R-S FEC codeword supplied to the (207, 187) LRS FEC decoding apparatus 55 from the time-division multiplexer 53 reproduces a data segment from the LBC decoder 47, the operations control circuitry 43 also conditions the (207, 187) LRS FEC decoding apparatus 55 to perform a number of decoding procedures, modifying the parity bytes of the supposed (207, 187) R-S FEC codeword differently in each successive decoding procedure. There are sixteen permutations of the four groups of five parity bytes, rather than the four permutations of the two groups of ten parity bytes for data segments supplied directly from the 2-segments-to-1 data compressor 46. Presuming that the DTV transmitter apparatuses operate as described supra, it is generally preferable to try the permutations that involve fewer bits in the parity bytes being complemented before trying the permutations that involve more bits in the parity bytes being complemented. There is a large number of computations to be performed preferably within one data segment interval, and parallel decoders may be required in the (207, 187) LRS FEC decoding apparatus 55. If none of the successive decoding procedures finds the supposed (207, 187) R-S FEC codeword to contain uncorrectable byte error, it is presumed that the data segment was not a (207, 187) R-S FEC codeword of the first type. The (207, 187) LRS FEC decoding apparatus 55 will supply the 187-byte data packet contained within the data segment after toggling the initial TEI bit of the packet to indicate the uncorrected byte error therein.

Usually, modifying a data segment by modifying its final twenty bytes will not generate a correct or correctable (207, 187) R-S FEC codeword of the first type. The suggests modifying the DTV transmitter apparatus such that when one of the data segments containing part of a data packet is modified, a data segment containing another part be modified also. Then, after first attempting to decode a data segment without modifying it parity bytes, the (207, 187) LRS FEC decoding apparatus in the DTV receiver can attempt to decode a data segment with more modified parity bytes before attempting to decode the data segment with fewer modified parity bytes. This may shorten the trial-and-error decoding procedure most of the time.

The trial-and-error procedures the LRS FEC decoding apparatus 55 performs for finding correct data packets can be facilitated by having additional information available from other sources as to whether the segments of robust data had to be modified to prevent them being mistaken by legacy DTV receivers for correct(able) segments of ordinary 8VSB signal. This is particularly helpful if code rate is one quarter that of ordinary 8VSB signal. One source of such additional information is circuitry 61 shown in FIG. 20 and described further on in this specification. Another source of such additional information is the S&B mapper 51 being arranged to extract the first bit of each 4-bit half-byte as shown in FIG. 13 that is included in the FIG. 12 or FIG. 15 description of a future data field. This first bit of each such 4-bit half-byte indicates whether or not the parity bytes of a corresponding data segment were modified.

There are reasons why it is preferable to modify the parity bytes of the data segments, rather than actual data bytes, in order to prevent the data segments resulting from code rate reduction being mistaken by legacy DTV receivers for correct (able) segments of ordinary 8VSB signal. One reason is that the original data packets are not altered, so possibly some of the information in those packets can be utilized despite the byte errors contained therein. This may be useful in processing packets of data pertaining to audio signals, for example. Another reason is that the polynomial division processes involved in R-S FEC coding generate remainders that the parity bytes are supposed to describe. So, division of the polynomial corresponding to the unmodified 187-byte "data packet" by the generator polynomial will generate a remainder that may allow identification of which permutation of parity byte modification (if any) was used in data segments resulting from code rate reduction.

The S&B mapper 51 in the FIG. 16 DTV receiver apparatus has to be modified somewhat if PCPM uses a prescribed coset pattern of the sort described in connection with FIGS. 3, 4 and 5, rather than one of the prescribed coset patterns described in connection with FIGS. 6 and 7. Each cycle of forty-eight $X_1$ bits spans 12 bytes, so there are 17.25 of these cycles in the 207 bytes of each data segment coding half an MPEG-2-compliant data packet. Accordingly, there are four different patterns of $X_1$ bits possible in a data segment of this type of PCPM signal. The final bit pair in a half-byte per FIG. 13 can be 01 if the data segment is one of two consecutive patterns in an initial pair and can be 10 if the data segment is one of two consecutive patterns in a final pair. The second bit in a half-byte per FIG. 13, which specifies whether or not a packet continues, can then be used to indicate whether the pattern is the earlier or later of the two consecutive patterns selected by the bit pair. When the half-byte per FIG. 13 indicates a data segment contains PCPM, the modified S&B mapper 51 writes a row of storage locations in the RAM 52 with a stream of 207 bit pairs in accordance the selected pattern of $X_1$ bits. Each of these bit pairs is either 01 or 10. When the half-byte per FIG. 13 indicates a data segment contains ordinary 8VSB modulation, the modified S&B mapper 51 writes a row of storage locations in the RAM 52 with a stream of 207 bit pairs, each of which is 00. When the half-byte per FIG. 13 indicates a data segment contains P-2VSB modulation, the modified S&B mapper 51 writes a row of storage locations in the RAM 52 with a stream of 207 bit pairs, each of which is 11.

Figure 17:
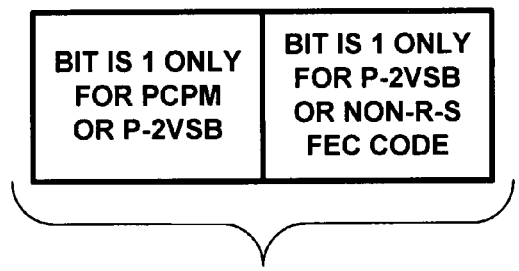
FIG. 17 is a depiction of an alternative format of the bit-pairs that the FIG. 12 and FIG. 15 future-field-description signals use for describing second sets of each of the 312 data segments in each future field of data.

FIG. 17 shows another format for the 312 bit-pairs in the final half of the FIG. 12 (or 15) data segment that describe second characteristics of respective data segments in a future data field, which other format is alternative to that shown in FIG. 14. In the FIG. 17 format, a 00 bit-pair still indicates the full 8VSB alphabet is used, and a 11 bit-pair still indicates the P-2VSB restricted symbol alphabet is used. The bit-pair 01 indicates that the forward-error-correction coding used in the data segment is not of Reed-Solomon type, and the type of modulation associated with the data segment may have be specified by other means. For example, it may be specified as part of the auxiliary information in the data segment shown in FIG. 12. The bit-pair 10 indicates PCPM is used in a respective one of the de-interleaved data segments, but does not indicate how the symbols in that data segment are selected from the first or the second coset of symbols within the full 8VSB alphabet. The nature of each of these symbols has to be specified by other means. If the type of PCPM that is transmitted is of the type earlier described with reference to FIGS. 2, 3 and 4, the nature of each symbol will be specified by the repeating sequence of $X_1$ bits shown in FIG. 4, for example. If the transmitted PCPM is of the type in which successive data segments alternate between using all ONE $X_1$ bits and using all ZERO $X_1$ bits, the modulo-two count of the data segments within a data field can be used to specify the nature of all the $X_1$ bits in a data segment. So long as PCPM is transmitted in pairs of contiguous data segments, the average power of the transmissions will essentially the same as for ordinary 8VSB. If one of these different species of PCPM modulations is chosen to be standard, there will obviously have to be some modifications made to the S&B mapper circuitry 51 (and 87). The 10 bit-pair indicating PCPM is used will have to be recoded into 01 and 10 bit pairs indicating whether the symbols in that data segment are selected from the first or the second coset of symbols within the full 8VSB alphabet. This can be done by exclusive-ORing each bit in the 10 bit-pair indicating PCPM is used with the ZERO or ONE indicating what the $X_1$ bit is supposed to be in a symbol.

The auxiliary information in the FIG. 12 data segment can include an indication as to whether the format for the 312 bit-pairs in the final half of the segment is as shown in FIG. 14 or as shown in FIG. 17. It probably is possible to include some such indication in the FIG. 15 data segment as well. Alternatively, the $17^{th}$, $18^{th}$, $19^{th}$ and $20^{th}$ bits of the headers in the data segments of FIGS. 12 and 15 can include an indication as to the format for the 312 bit-pairs in the final half of the segment.

Figure 18:
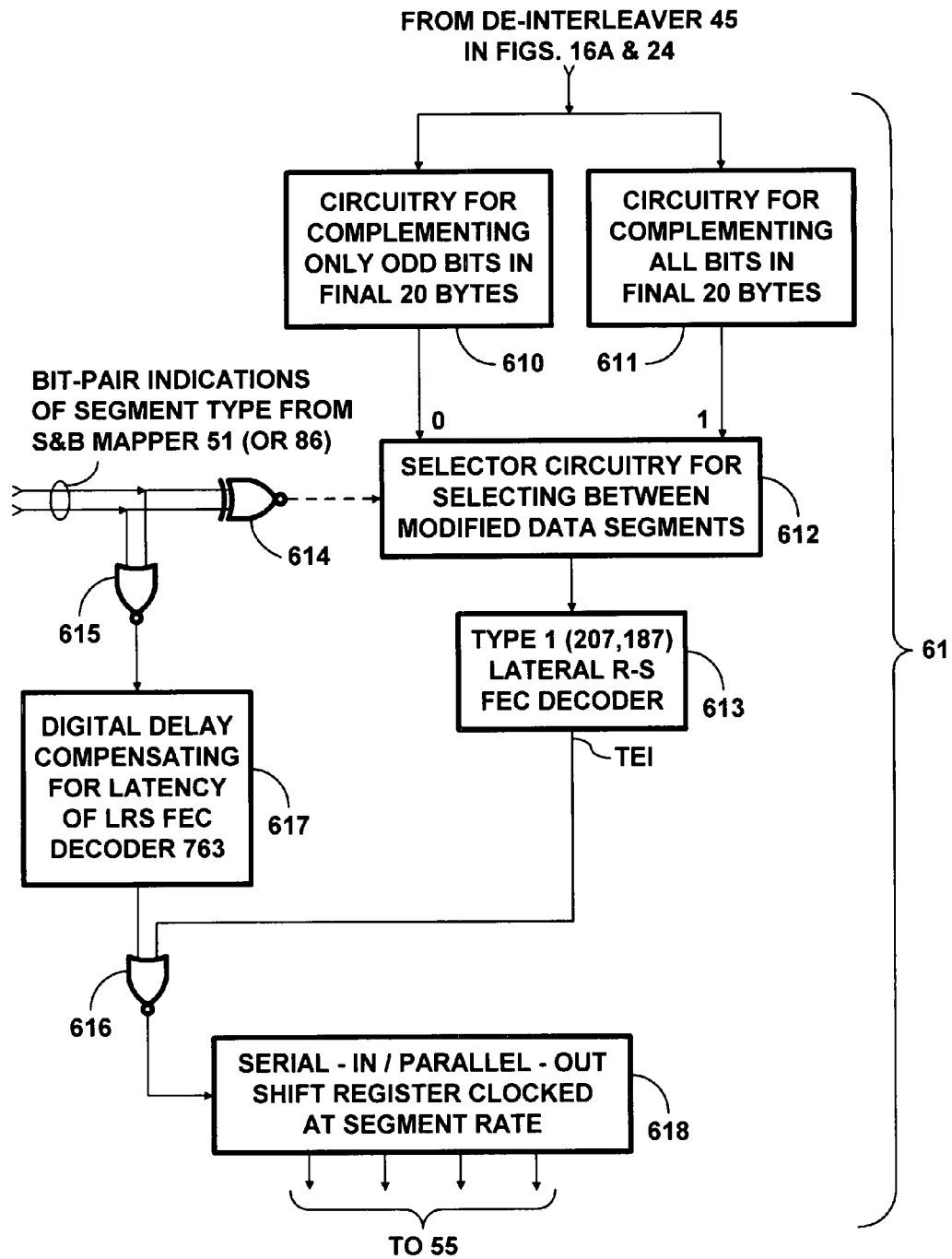
FIG. 18 is a schematic diagram showing in detail circuitry for determining whether segments of robust data had to be modified so that they would be ignored by legacy DTV receivers.

FIG. 18 shows a connection from the de-interleaver 45 for supplying the de-interleaved data segments therefrom as input signal to circuitry 61 for determining if a segment of robust data might have been modified, so as to be ignored by legacy DTV receivers. FIG. 18 shows the circuitry 61 connected to supply those determinations for four most recent data segments to the (207, 187) LRS FEC decoding apparatus 55. The elements of the circuitry 61 have respective identification numbers 610, 611, 612, 613, 614, 615, 616, 617, 618 and 619. The circuitry 61 includes circuitry 610 for complementing only the odd bits in the final twenty bytes of de-interleaved data segments supplied to the circuitry 610 from the de-interleaver 45. The circuitry 61 also includes circuitry 611 for complementing all the bits in the final twenty bytes of de-interleaved data segments supplied to the circuitry 611 from the de-interleaver 45. Selector circuitry 612 is connected for reproducing data segments from the circuitry 610 or from the circuitry 611 for application to a (207, 187) lateral Reed-Solomon forward-error-correction decoder 613. Which of the data segments currently supplied from the circuitry 610 and from the circuitry 611 is reproduced by the selector circuitry 612 is controlled by the response of a two-input exclusive-NOR gate 614 applied to the selector circuitry 612 as its control signal. Bit-pair indications of the type of modulation employed in the current data segment are supplied from the S&B mapper 51 to the XNOR gate 614 and a two-input NOR gate 615. The XNOR gate 614 is connected to apply its response to the selector circuitry 612 as control signal. The selector circuitry 612 is conditioned to reproduce the modified data segment from the circuitry 610 when PCPM is used and to reproduce the modified data segment from the circuitry 611 when P-2VSB or ordinary-8VSB modulation is used.

The (207, 187) LRS FEC decoder 613 is connected for supplying the de-randomized transport-error-indication bit from each data packet processed therethrough. This TEI bit is a ONE if the data segment containing the data packet that the TEI bit was extracted from would not have had to be modified in order that the data in the segment would have been ignored by legacy DTV receivers. If the TEI bit is a ZERO, the data segment well might have had to be modified in order that the data in the segment would have been ignored by legacy DTV receivers, but there is a small possibility this is not so.

FIG. 18 shows the first of two input ports of a two-input NOR gate 616 connected to receive the TEI bits from the (207, 187) LRS FEC decoder 613. The second input port of the NOR gate 616 is connected to receive the response of NOR gate 615, as delayed by digital delay circuitry 617 to compensate for the latent delay in the decoding procedures carried out by the (207, 187) LRS FEC decoder 613. The NOR gate 615 supplies a ONE when and only when the current data segment uses ordinary 8 VSB modulation. The NOR gate 616 response is supplied to the serial input port of a serial-in/parallel out shift register 618. The SIPO shift register 618 is clocked to shift contents one stage forward shortly after the TEI bit is available from the (207, 187) LRS FEC decoder 613. The final four stages of the SIPO shift register 618 supply four bits indicative of whether the last four data segments may have had to be modified in order that the data in the segment would have been ignored by legacy DTV receivers. If one of these bits is a ZERO, this is a positive indication that the corresponding data segment would not have had to be modified. If one of these bits is a ONE, this indicates that the corresponding data segment might have had to be modified.

The XNOR gate 614 supplies the selector circuitry 612 a ZERO responsive to a 01 bit-pair indicating the current data segment uses a first type of PCPM or to a 10 bit-pair indicating the current data segment uses a second type of PCPM. This ZERO conditions the selector circuitry 612 to reproduce as its own response the response of the circuitry 610 for complementing only the odd bits in the final twenty bytes of each de-interleaved data segment supplied to the circuitry 610 from the de-interleaver 45.

If the current data segment was modified so as to be ignored by legacy DTV receivers, ideally the circuitry 610 should restore the segment to its original randomized-data content. The (207, 187) LRS FEC decoder 613 will find that restored data segment as presented to the decoder 613 by the selector circuitry 612 either to be correct or correctable, presuming that noise did not corrupt more than ten bytes of the modified data segment. Accordingly, LRS FEC decoder 613 will supply a ZERO TEI bit to the NOR gate 616. The NOR gate 615 supplies the digital delay circuitry 617 a ZERO responsive to a 01 bit-pair indicating the current data segment uses the first type of PCPM or to a 10 bit-pair indicating the current data segment uses the second type of PCPM. This ZERO delayed by the digital delay circuitry 617 reaches the NOR gate 616 concurrently with the ZERO TEI bit from the LRS FEC decoder 613. The response of the NOR gate 616 will be a ONE to be clocked into the SIPO shift register 618.

If the current data segment was not modified at the DTV transmitter so as to be ignored by legacy DTV receivers, the circuitry 610 will modify the segment to change its original randomized-data content. Usually the change will result in a data segment that the LRS FEC decoder 613 finds to be neither a correct nor correctable (207, 187) R-S FEC codeword. Accordingly, LRS FEC decoder 613 will supply a ONE TEI bit to the NOR gate 616. The response of the NOR gate 616 will then be a ZERO to be clocked into the SIPO shift register 618. Occasionally, however, the LRS FEC decoder 613 finds the change in the original randomized-data content of an unmodified current data segment to be a correct or correctable (207, 187) R-S FEC codeword and so supplies a ZERO TEI bit to the NOR gate 616. The response of the NOR gate 616 will be a ONE to be clocked into the SIPO shift register 618, presuming the delayed response of the NOR gate 615 is not a ONE indicating that the current data segment uses ordinary 8VSB modulation.

The XOR gate 614 supplies the selector circuitry 612 a ZERO responsive to a 00 bit-pair indicating the current data segment uses ordinary 8VSB modulation or to a 11 bit-pair indicating the current data segment uses P-2VSB modulation. This ZERO conditions the selector circuitry 612 to reproduce as its own response the response of the circuitry 611 for complementing all the bits in the final twenty bytes of each de-interleaved data segment supplied to the circuitry 611 from the de-interleaver 45. The NOR gate 615 generates a ONE responsive to a 00 bit-pair indicating the current data segment uses ordinary 8VSB modulation. Responsive to the ONE response of the NOR gate 615 as delayed by the digital delay circuitry 617, the NOR gate 616 furnishes a ONE input signal to be clocked into the SIPO shift register 618 whenever the current data segment uses ordinary 8VSB modulation.

If the current data segment uses P-2VSB modulation and was modified so as to be ignored by legacy DTV receivers, ideally the circuitry 611 should restore the segment to its original randomized-data content. The (207, 187) LRS FEC decoder 613 will find that restored data segment that the selector circuitry 612 presents to the decoder 613 either to be correct or correctable, if noise did not corrupt more than ten bytes of the modified data segment. Accordingly, LRS FEC decoder 613 will supply a ZERO TEI bit to the NOR gate 616. The NOR gate 615 supplies the digital delay circuitry 617 a ZERO responsive to a 11 bit-pair indicating the current data segment uses P-2VSB modulation. This ZERO as delayed by the digital delay circuitry 617 reaches the NOR gate 616 concurrently with the ZERO TEI bit from the LRS FEC decoder 613. The response of the NOR gate 616 will be a ONE to be clocked into the SIPO shift register 618.

If the current data segment was not modified at the DTV transmitter so as to be ignored by legacy DTV receivers, the circuitry 611 will modify the segment to change its original randomized-data content. Usually the change will result in a data segment that the LRS FEC decoder 613 finds to be neither a correct nor correctable (207, 187) R-S FEC codeword. Accordingly, LRS FEC decoder 613 will supply a ONE TEI bit to the NOR gate 616. The NOR gate 616 response is a ZERO to be clocked into the SIPO shift register 618. Occasionally, however, the LRS FEC decoder 613 finds the change in the original randomized-data content of an unmodified current data segment to be a correct or correctable (207, 187) R-S FEC codeword and so supplies a ZERO TEI bit to the NOR gate 616. The response of the NOR gate 616 will be a ONE to be clocked into the SIPO shift register 618, presuming the delayed response of the NOR gate 615 is not a ONE indicating that the current data segment uses ordinary 8VSB modulation.

Figure 19:
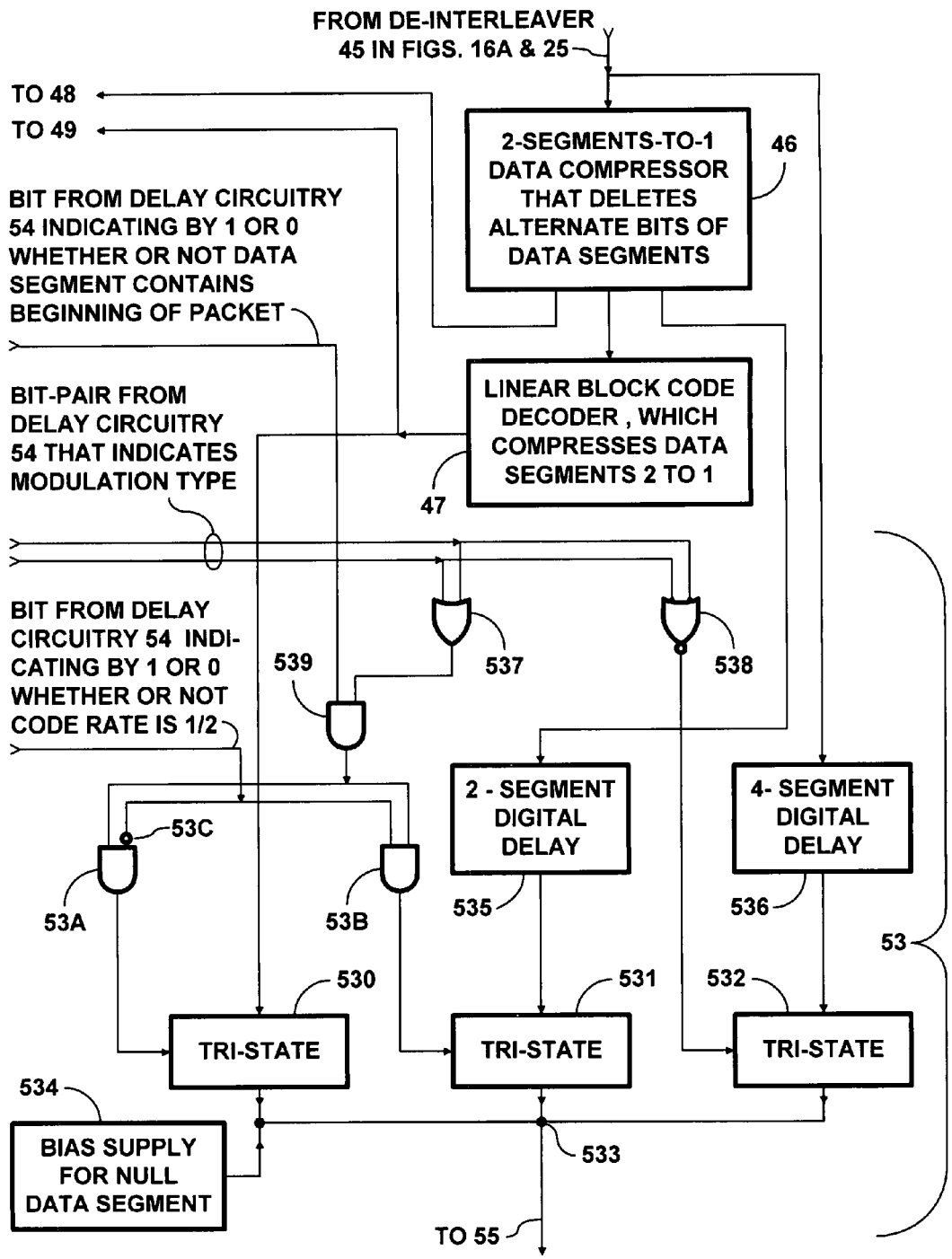
FIG. 19 is a schematic diagram showing in detail the construction of a time-division multiplexer shown in FIG. 16A, which construction is used when receiving DTV signals from the DTV transmitters of FIGS. 1 and 8.
Figure 25:
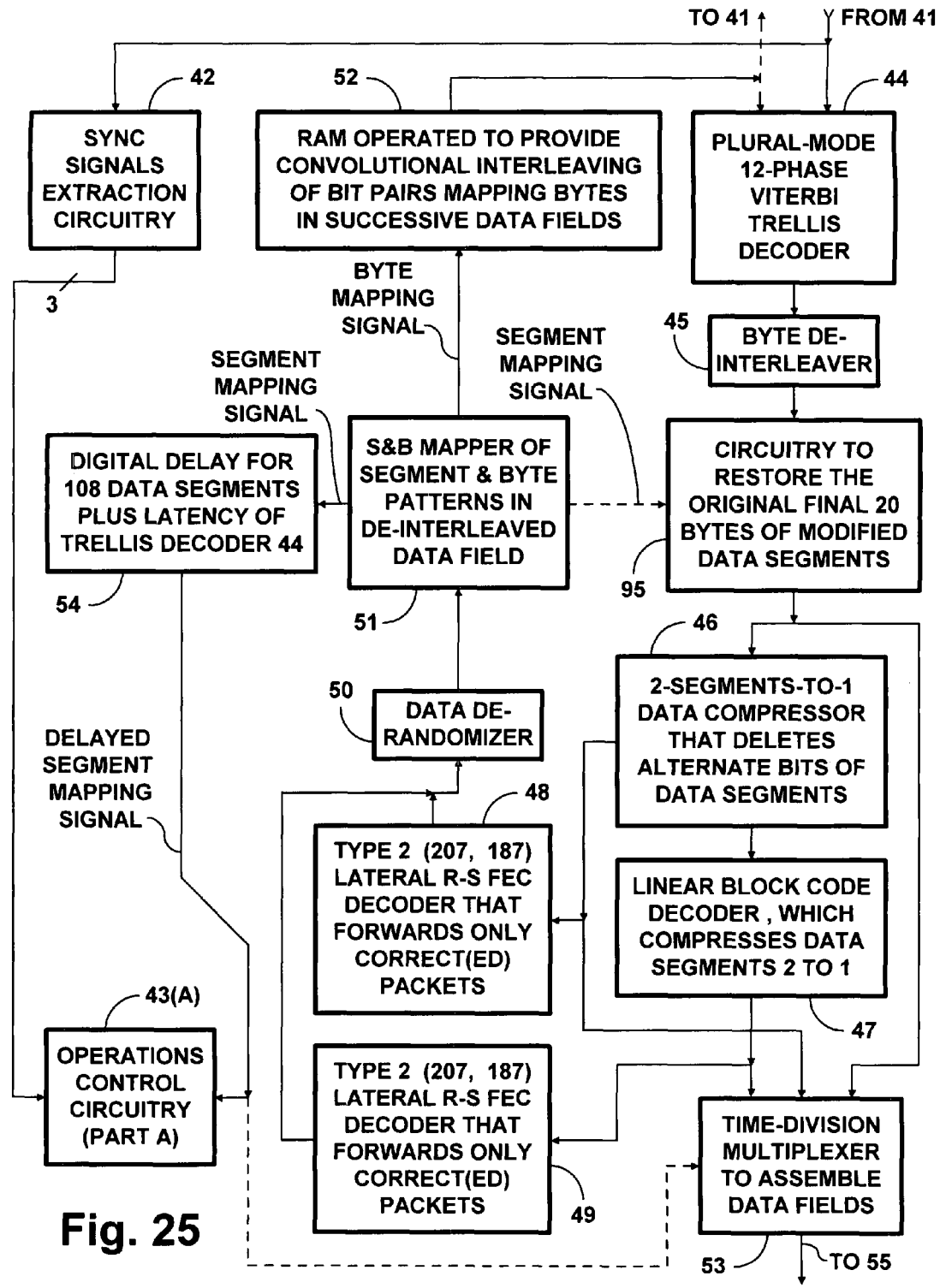
FIG. 25 is schematic diagram showing a modification to the FIG. 16A portion of the FIG. 16 DTV receiver apparatus, which modification restores to original form data segments modified at the DTV transmitter so they will be disregarded by legacy DTV receivers.
Figure 26:
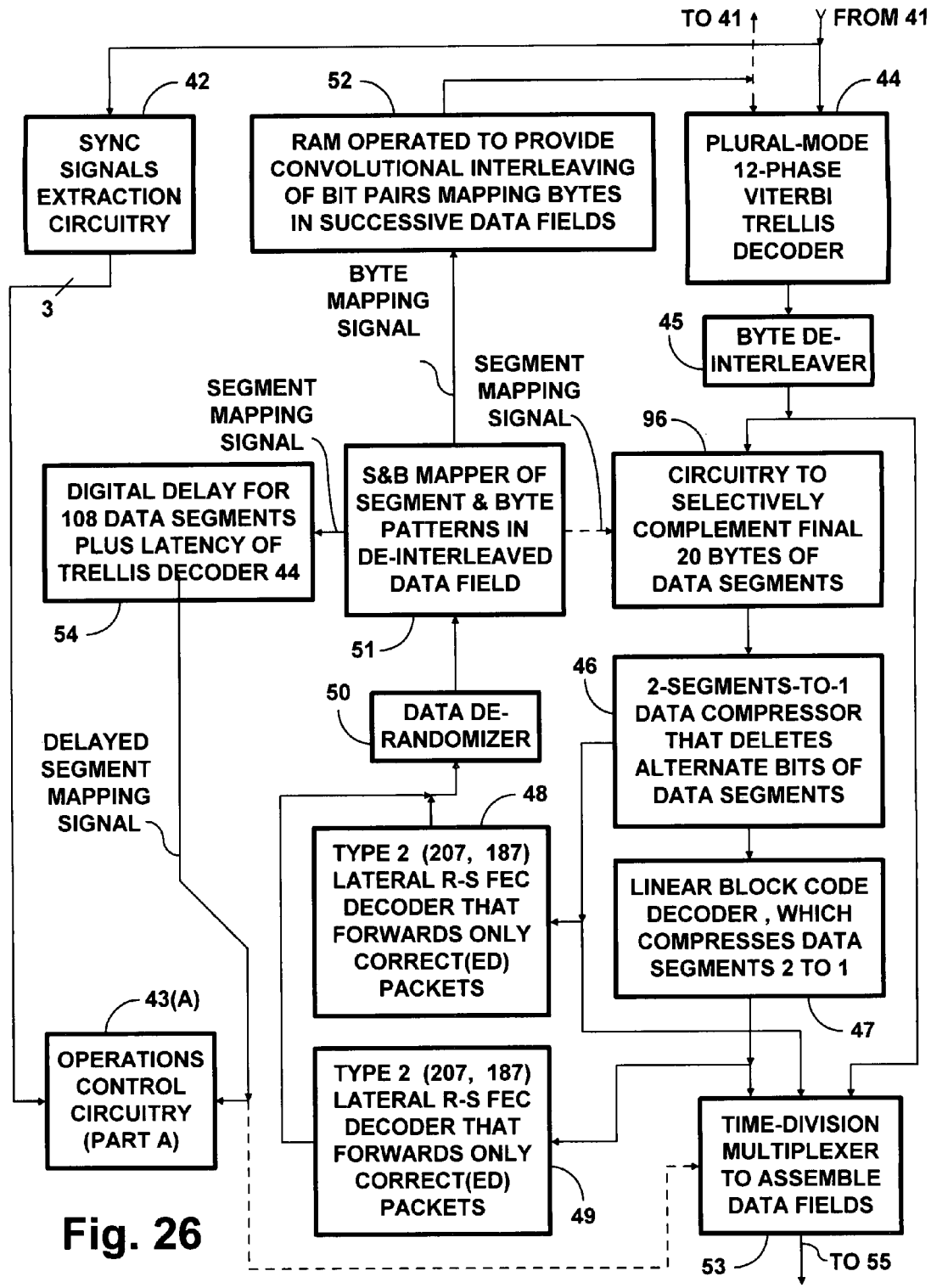
FIG. 26 is schematic diagram showing a modification to the FIG. 16A portion of the FIG. 16 DTV receiver apparatus, which modification is alternative to the FIG. 25 modification for restoring to original form data segments modified at the DTV transmitter so they will be disregarded by legacy DTV receivers.
Figure 27:
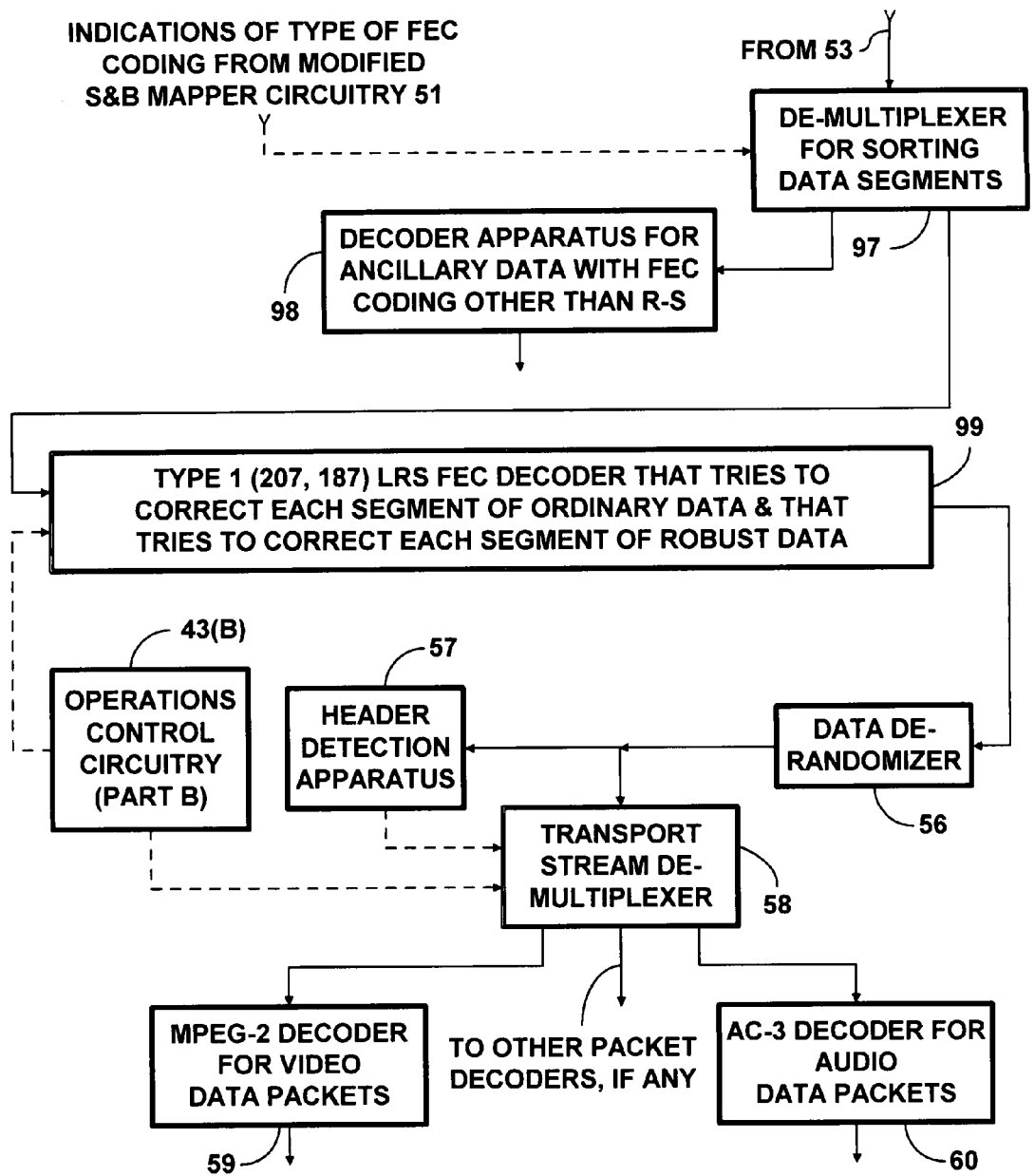
FIG. 27 is a schematic diagram of a modification of the FIG. 16B portion of the FIG. 16 DTV receiver apparatus made in accordance with a further aspect of the invention.

FIG. 19 shows in considerable detail one embodiment 053 of the time-division multiplexer 53 shown in FIGS. 16A, 25 and 26. This embodiment 053 is suited for use in a DTV receiver designed to receive DTV signals transmitted by the FIG. 1 DTV transmitter apparatus. Tri-states 530, 531 and 532 are connected to supply their responses to a shared node 533. A bias supply 534 supplies a continually repeating null data segment to the node 533. The source impedance of the bias supply 534 is low compared to the source impedance sometimes exhibited by the tri-states 530, 531 and 532, but high compared to the source impedance exhibited by one of the tri-states 530, 531 and 532 at other times. FIGS. 16A, 25 and 26 implicitly show that shared node 533 being connected for supplying input signals to the (207, 187) LRS FEC decoding apparatus 55 shown in FIG. 16B. FIG. 27 shows that shared node being connected to supply input signal to a de-multiplexer 91. The LBC decoder 47 is connected for supplying segments of randomized data to the tri-state 530 as input signal. Presumably, the de-interleaver 45 has to supply four segments of randomized data to the LBC decoder 47 before the LBC decoder 47 can in the next data segment interval deliver a complete single segment of randomized data to the tri-state 530 as input signal. Presumably, the de-interleaver 45 has to supply two segments of randomized data to the 2-segments-to-1 data compressor 46 before the data compressor 46 can in the next data segment interval deliver a complete single segment of randomized data. After an additional delay of two data segment intervals, digital delay circuitry 535 reproduces segments of randomized data from the 2-segments-to-1 data compressor 46 for application to the tri-state 531 as input signal. After a delay of four data segment intervals, digital delay circuitry 536 reproduces the de-interleaved segments of randomized data from the de-interleaver 45 for application to the tri-state 532 as input signal.

A two-input OR gate 537 and a two-input NOR gate 538 are each connected for receiving the pair of bits that the S&B mapper 51 supplies for indicating the type of modulation in a segment of randomized data supplied from the de-interleaver 45 four data segment intervals previously. The NOR gate 538 response is applied to the tri-state 532 as a control signal for controlling the source impedance from which the tri-state 532 supplies its output signal. The OR gate 537 is connected to apply its response as one of the input signals of a two-input AND gate 539. The other input signal of the AND gate 539 is the single bit that the S&B mapper 51 supplies for indicating whether or not the beginning portion of a data packet was contained in a segment of randomized data supplied from the de-interleaver 45 four data segment intervals previously. The AND gate 539 is connected to apply its response as one of the input signals to each of two-input AND gates 53A and 53B. The other input signal of the AND gate 53B is the single bit that the S&B mapper 51 supplies for indicating whether the code rate is or is not one quarter that of ordinary 8VSB. A NOT gate 53C inverts that single bit to supply the other input signal of the AND gate 53A. The response of the AND gate 53A is applied to the tri-state 530 as a control signal for controlling the source impedance from which the tri-state 530 supplies its output signal. The response of the AND gate 53B is applied to the tri-state 531 as a control signal for controlling the source impedance from which the tri-state 531 supplies its output signal.

When the time-division multiplexer 53 receives a 00 bit pair, indicating that the segment of randomized data supplied four data segment intervals previously from the de-interleaver 45 employed ordinary 8VSB modulation, the responses of the OR gate 537 and the NOR gate 538 are ZERO and ONE respectively. The ZERO response of the OR gate 537 applied as input signal to the AND gate 539 causes its response to be ZERO. The ZERO response of the AND gate 539 supplied to AND gates 53A and 53B causes each of their responses to be a respective ZERO. The ZERO response of the AND gate 53A conditions the tri-state 530 to reproduce from high source impedance the data segment supplied from the LBC decoder 47. The ZERO response of the AND gate 53B conditions the tri-state 531 to reproduce from high source impedance the data segment supplied from the digital delay circuitry 537. The ONE response of the NOR gate 538 conditions the tri-state 532 to reproduce from low source impedance the data segment that employs ordinary 8VSB modulation when it appears after being delayed four data segment intervals by the digital delay circuitry 536. The tri-state 532 is the only one of the tri-states 530, 531 and 532 conditioned to supply its output signal from low source impedance. The tri-state 532 is thus able to assert on the node 533 its output signal reproducing the data segment that employs ordinary 8VSB modulation, as supplied from the digital delay circuitry 536. The only times that the tri-state 532 is conditioned to exhibit low source impedance at its output is when the time-division multiplexer 53 receives a 00 bit pair as input signals to the OR gate 537 and the NOR gate 538.

When the time-division multiplexer 53 receives a 01, 10 or 11 bit pair, the responses of the OR gate 537 and the NOR gate 538 are ONE and ZERO respectively. A 01, 10 or 11 bit pair indicates that the segment of randomized data supplied four data segment intervals previously from the de-interleaver 45 employed modulation with reduced code rate. The ZERO response of the NOR gate 538 conditions the tri-state 532 to reproduce from high source impedance the data segment supplied from the digital delay circuitry 536. The ONE response of the OR gate 537 applied as input signal to the AND gate 539 causes it to reproduce its other input signal.

The AND gate 539 response is a ZERO when the other of its input signals is a ZERO, indicating that the segment of randomized data supplied four data segment intervals previously from the de-interleaver 45 did not contain the beginning portion of a data packet. The ZERO response from the AND gate 539 applied as input signal to the AND gates 53A and 53B causes each of their responses to be a ZERO. The ZERO response of the AND gate 53A conditions the tri-state 530 to reproduce from high source impedance the data segment that the LBC decoder 47 supplies to the tri-state 530 as input signal thereto. The ZERO response of the AND gate 53B conditions the tri-state 531 to reproduce from high source impedance the data segment that the 2-segments-to-1 data compressor 46 generated two data segments earlier, as reproduced in the delayed response of the digital delay circuitry 535. None of the tri-states 530, 531 and 532 being conditioned to supply output signal from low source impedance to the node 533, the bias supply 534 asserts one null data segment or more on the node 533. However, when the other of the input signals to AND gate 539 is a ONE, indicating that the segment of randomized data supplied four data segment intervals previously from the de-interleaver 45 contained the beginning portion of a data packet, the AND gate 539 response is a ONE. This ONE response from the AND gate 539 applied as input signal to the AND gates 53A and 53B causes each of them to reproduce the other of its input signals.

So, if the other input signal supplied to the AND gate 53B is a ONE indicating that the code rate is one-half that of ordinary 8VSB, this ONE causes the responses of the AND gate 53B and the NOT gate 53C to be ONE and ZERO respectively. The ZERO response of the NOT gate 53C supplied as the other input signal of the AND gate 53A causes its response to be ZERO. The ZERO response of the AND gate 53A conditions the tri-state 530 to reproduce from high source impedance the data segment that the LBC decoder 47 supplies to the tri-state 530 as input signal thereto. The ONE response of the AND gate 53B conditions the tri-state 531 to reproduce from low source impedance the data segment that the 2-segments-to-1 data compressor 46 generated two data segments earlier, as reproduced in the delayed response of the digital delay circuitry 535. Since each of the tri-states 530 and 532 is conditioned to exhibit high source impedance to the node 533, the tri-state 531 is able to assert its output signal on the node 533.

When the AND gate 539 supplies a ONE response as one of the input signals to each of the AND gates 53A and 53B, the other input signal supplied to the AND gate 53B is sometimes a ZERO, indicating that the code rate is not one-half that of ordinary 8VSB. This ZERO causes the responses of the AND gate 53B and the NOT gate 53C to be ZERO and ONE respectively. The ZERO response of the AND gate 53B conditions the tri-state 531 to reproduce from high source impedance the data segment that the 2-segments-to-1 data compressor 46 generated two data segments earlier, as reproduced in the delayed response of the digital delay circuitry 535. The ONE response of the NOT gate 53C supplied as the other input signal of the AND gate 53A causes its response to be ONE. The ONE response of the AND gate 53A conditions the tri-state 530 to reproduce from low source impedance the data segment that the LBC decoder 47 supplies to the tri-state 530 as input signal thereto. Since each of the tri-states 531 and 532 is conditioned to exhibit high source impedance to the node 533, the tri-state 530 is able to assert its output signal on the node 533.

Figure 20:
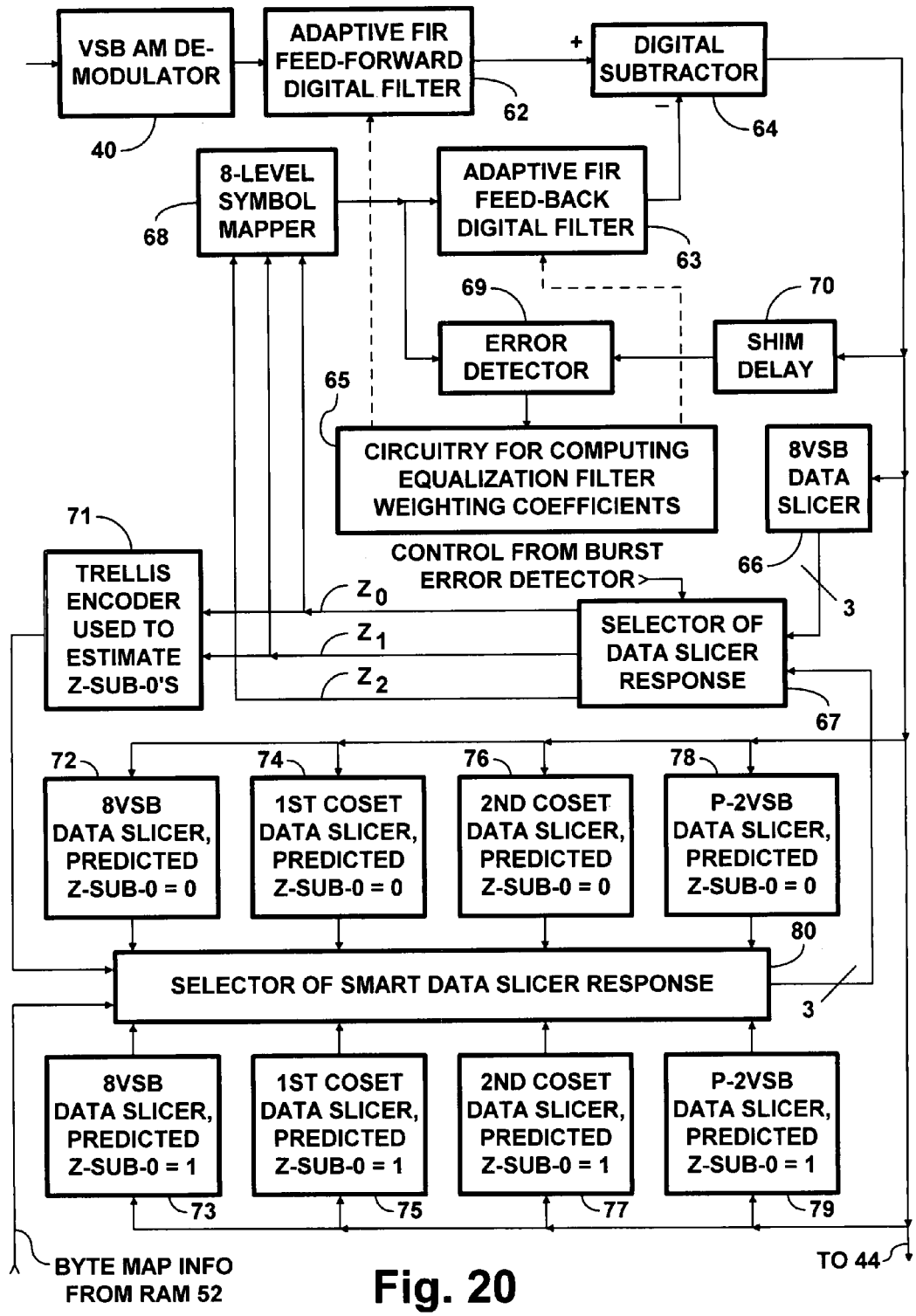
FIG. 20 is a schematic diagram showing in detail how "smart" data slicing is implemented in preferred decision channel-equalization filtering in the FIG. 16A portion of the FIG. 16 DTV receiver apparatus.

FIG. 20 illustrates one way of constructing decision-feedback equalization (DFE) filtering for inclusion in the digital filtering 41 of the FIG. 16 DTV receiver. The DFE filtering comprises a feed-forward filter 62, a feedback filter 63 and a digital subtractor 64 connected for receiving the responses of filters 62 and 63 as its minuend and its subtrahend input signals, respectively. Both of the filters 62 and 63 are adaptive finite-impulse-response (FIR) digital filters kernels that are adjustable responsive to circuitry 65 for computing equalization filter weighting coefficients. The feed-forward filter 62 is connected for receiving as its input signal a digitized baseband DTV signal recovered by the VSB AM demodulator 40. The output signal from the subtractor 64 provides the response of the DFE filtering, which response is forwarded to the Viterbi trellis decoder 44 as its input signal. This response is supplied to a "simple" 8VSB data slicer 66 of conventional design, which recovers the respective $Z_0$, $Z_1$ and $Z_2$ bits encoded in each successive 8VSB symbol and supplies them to a selector 67 of data slicer response. The selector 67 supplies an 8-level symbol mapper 68 with $Z_0$, $Z_1$ and $Z_2$ bits reproducing those supplied to the selector 67 either from the "simple" 8VSB data slicer 66 or from a "smart" data slicer still to be described. The 8-level symbol mapper 68 is of the type shown in FIG. 7 of Annex D of ATSC Document A/53, the ATSC DIGITAL TELEVISION STANDARD. The response of the 8-level symbol mapper 68 is the decision feedback signal applied to the feedback filter 63 as its input signal. This signal is an estimate of the actual symbol sent by the DTV transmitter. An error detector 69 is connected for comparing this estimate to the symbol actually received as supplied in the DFE filtering response from the subtractor 64 as delayed by shim delay 70. The error detector 69 is connected to supply the differences of the received symbols from the estimates of the symbols actually transmitted to the circuitry 65 for computing equalization filter weighting coefficients. The circuitry 65 uses these differences as the basis for computing, in accordance with known technique or techniques, adjustments of the weighting coefficients in the kernels of the adaptive digital filters 62 and 63.

A 12-phase trellis encoder 71 is connected for responding to the $Z_1$ bits supplied from the selector 67 to predict the $Z_0$ bits the selector 67 should next receive, which predictions are used in novel "smart" data slicing procedures. The DFE filtering response supplied as output signal from the subtractor 64 is applied as input signal to data slicers 66, 72, 73, 74, 75, 76, 77, 78 and 79. A selector 80 selects the response of one of the data slicers 66, 72, 73, 74, 75, 76, 77, 78 and 79 to be applied as smart data slicer response to the selector 67 of data slicer response applied to the 8-level symbol mapper 68. Selection by the selector 80 is controlled in part by bit pairs read from the RAM 52 indicating the type of amplitude modulation used in the current byte. Selection by the selector 80 is controlled in further part by the $Z_0$ bits that trellis decoder 71 predicts for the symbols in the current byte.

Suppose the current byte is indicated to use 8VSB modulation. Then, if the $Z_0$ bit predicted for a current symbol is a ZERO, the selector 80 selects the response of the data slicer 72 to be smart data slicer response. The data slicer 72 is designed for quantizing the symbol to −7, −3, +1 or +5 normalized modulation level. However, if the $Z_0$ bit predicted for a current symbol is a ONE, the selector 80 selects the response of the data slicer 73 to be smart data slicer response. The data slicer 73 is designed for quantizing the symbol to −5, −1, +3 or +7 normalized modulation level.

Suppose the current byte is indicated to use PCPM modulation restricted to the first coset of 8VSB symbols. Then, if the $Z_0$ bit predicted for a current symbol is a ZERO, the selector 80 selects the response of the data slicer 74 to be smart data slicer response. The data slicer 74 is designed for quantizing the symbol to either −3 or +5 normalized modulation level. However, if the $Z_0$ bit predicted for a current symbol is a ONE, the selector 80 selects the response of the data slicer 75 to be smart data slicer response. The data slicer 75 is designed for quantizing the symbol to either −1 or +7 normalized modulation level.

Suppose the current byte is indicated to use PCPM modulation restricted to the second coset of 8VSB symbols. Then, if the $Z_0$ bit predicted for a current symbol is a ZERO, the selector 80 selects the response of the data slicer 76 to be smart data slicer response. The data slicer 76 is designed for quantizing the symbol to either −7 or +1 normalized modulation. However, if the $Z_0$ bit predicted for a current symbol is a ONE, the selector 80 selects the response of the data slicer 77 to be smart data slicer response. The data slicer 77 is designed for quantizing the symbol to either −5 or +3 normalized modulation level.

Suppose the current byte is indicated to use P-2VSB modulation. Then, if the $Z_0$ bit predicted for a current symbol is a ZERO, the selector 80 selects the response of the data slicer 78 to be smart data slicer response. The data slicer 78 is designed for quantizing the symbol to −7 or +5 normalized modulation level. However, if the $Z_0$ bit predicted for a current symbol is a ONE, the selector 80 selects the response of the data slicer 79 to be smart data slicer response. The data slicer 79 is designed for quantizing the symbol to either −5 or +7 normalized modulation level.

The selector 67 of data slicer response is connected for receiving a control signal from a burst error detector not explicitly shown in the drawing. The smart data slicer response supplied to the selector 67 as one of its input signal is prone to running error after protracted bursts of noise in the received DTV signal. So, the burst error detector conditions the selector 67 to reproduce the response of the simple 8VSB data slicer 66 for a few symbol epochs following a burst error being detected. When power is applied to the DTV receiver after a time that power has been withheld from the DTV receiver, the control signal supplied from the burst error detector conditions the selector 67 to reproduce for a few symbol epochs the response of the simple 8VSB data slicer 66.

Figure 21:
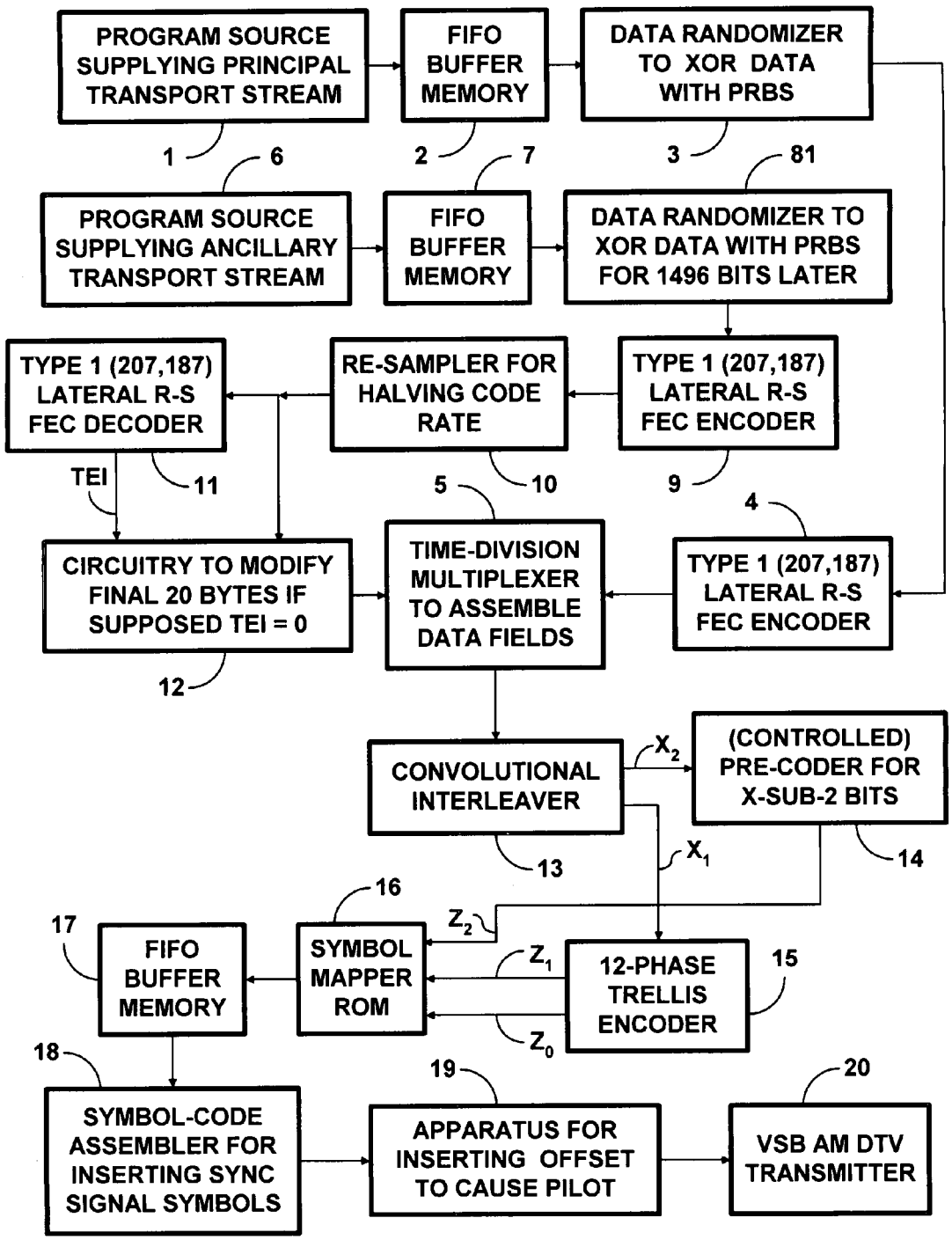
FIG. 21 is a schematic diagram of modified FIG. 1 DTV transmitter apparatus, which embodies the invention in certain of its aspects.

FIG. 21 shows modified FIG. 1 DTV transmitter apparatus in which a data randomizer 81 replaces the data randomizer 8. The data randomizer 81 exclusive-ORs the bits of each data packet read from the FIFO memory 7 with the bits of the PRBS for the final one of the pair of data segments that will contain the data packet after it is encoded to increase redundancy and reduce code rate. The data randomizer 8 exclusive-ORs the bits of each data packet read from the FIFO memory 7 with the bits of the PRBS for the initial one of the pair of data segments in the non-interleaved data field.

Figure 22:
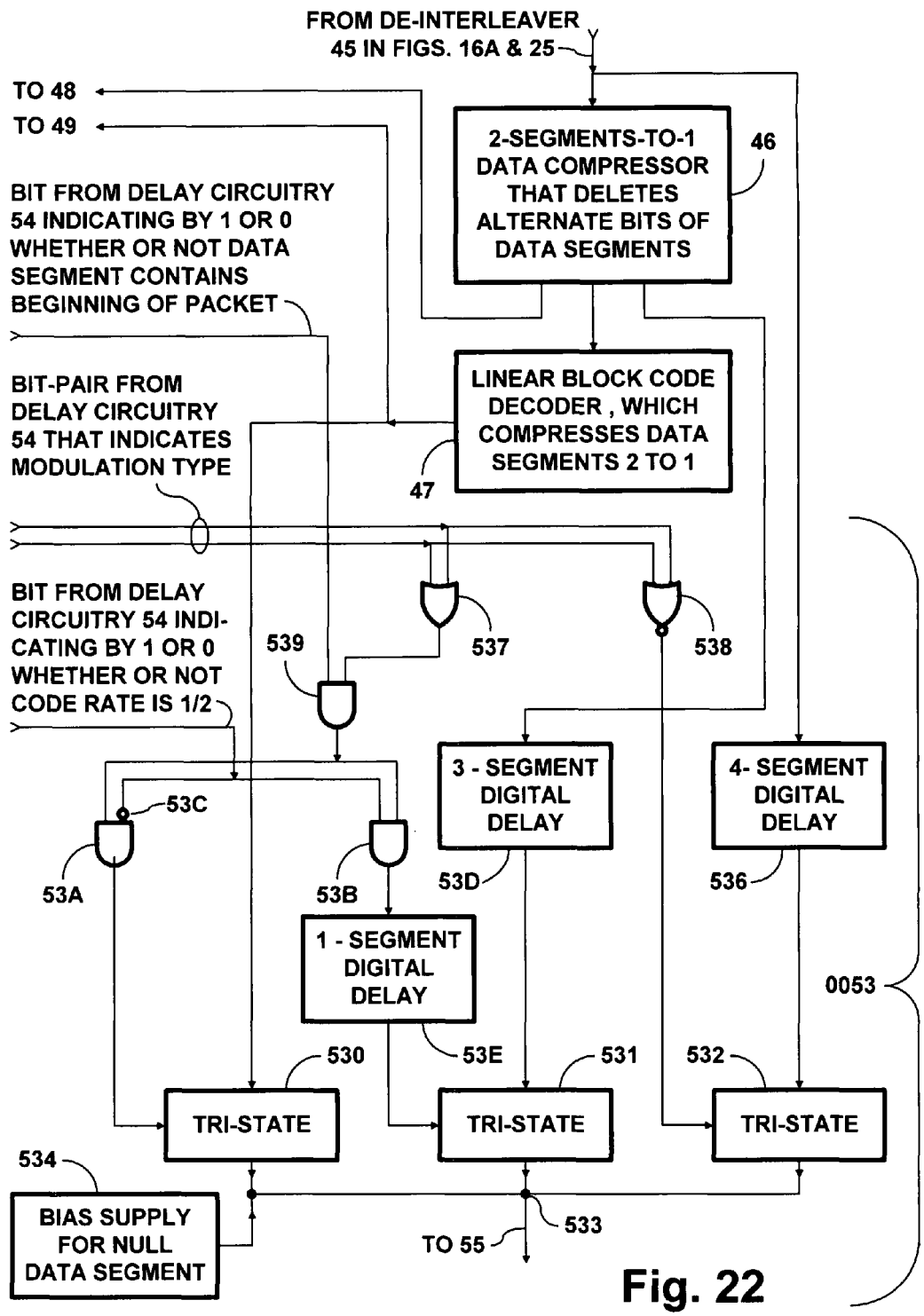
FIG. 22 is a schematic diagram showing in detail the construction of a time-division multiplexer shown in FIG. 16A, which construction is used when receiving DTV signals from the DTV transmitters of FIGS. 1 and 21.

FIG. 22 shows in considerable detail another embodiment 0053 of the time-division multiplexer 53 shown in FIGS. 16A, 25 and 26. This embodiment 0053 is suited for use in a DTV receiver designed to receive DTV signals transmitted by the FIG. 21 DTV transmitter apparatus. This embodiment 0053 differs structurally from the embodiment 053 of the time-division multiplexer 53 in the following respects. The 2-segment digital delay circuitry 535 is replaced by 3-segment digital delay circuitry 53D, and the response of the AND gate 53B is delayed one data segment interval by 1-segment digital delay circuitry 53E before being applied as control signal to the tri-state 531. These changes condition the tri-state 531 to assert (207, 187) LRS FEC codewords originating from the 2-segments-to-1 data compressor 46 on the node 533 one data segment interval later than they would be in the embodiment 053 of the time-division multiplexer 53.

The operation of the tri-state 531 is different in the embodiments 053 and 0053 of the time-division multiplexer 53 when either of the tri-states 530 and 531 is conditioned to exhibit low source impedance. At such time the operation of the tri-state 531 is not conditioned on the segment map information that the time-division multiplexer 53 receives indicating the nature of the segment of randomized data that the de-interleaver 45 supplied four data segment intervals ago. Rather, the operation of the tri-state 531 is conditioned on the segment map information that the time-division multiplexer 53 received one data segment interval ago, indicating the nature of the segment of randomized data that the de-interleaver 45 supplied five data segment intervals ago.

If the data segment that the de-interleaver 45 supplied five data segment intervals ago had contained ordinary 8VSB signal, the OR gate 537 response to a 00 bit pair supplied only one data segment interval ago would have been a ZERO. This ZERO would have caused the response of the AND gate 539 and then the response of the AND gate 539 each to be a ZERO only one data segment interval ago. The resulting ZERO response from the AND gate 53B conditions the tri-state 531 to exhibit high source impedance one data segment interval later, when the tri-state 532 now asserts on the node 533 the segment of randomized data that contains ordinary 8VSB signal.

If the data segment that the de-interleaver 45 supplied five data segment intervals ago used linear block coding in addition to using PCPM or using P-2VSB modulation, the AND gate 53B would then have received a ZERO bit only one data segment interval ago, indicating that the code rate was other than one-half the code rate of ordinary 8VSB. The resulting ZERO response from the AND gate 53B conditions the tri-state 531 to exhibit high source impedance now one data segment interval later.

Staggering the phase in which valid (207, 187) LRS FEC codewords are supplied as recovered from signals transmitted at halved code rate and as recovered from signals transmitted at halved code rate facilitates modifications of the FIG. 16 DTV receiver that replace the LRS-FEC-code decoders 48 and 49 with a single LRS-FEC-code decoder for both signal types. Similar modifications can also be made to the FIG. 16 DTV receiver modified per FIG. 25 or 26.

Figure 23A:
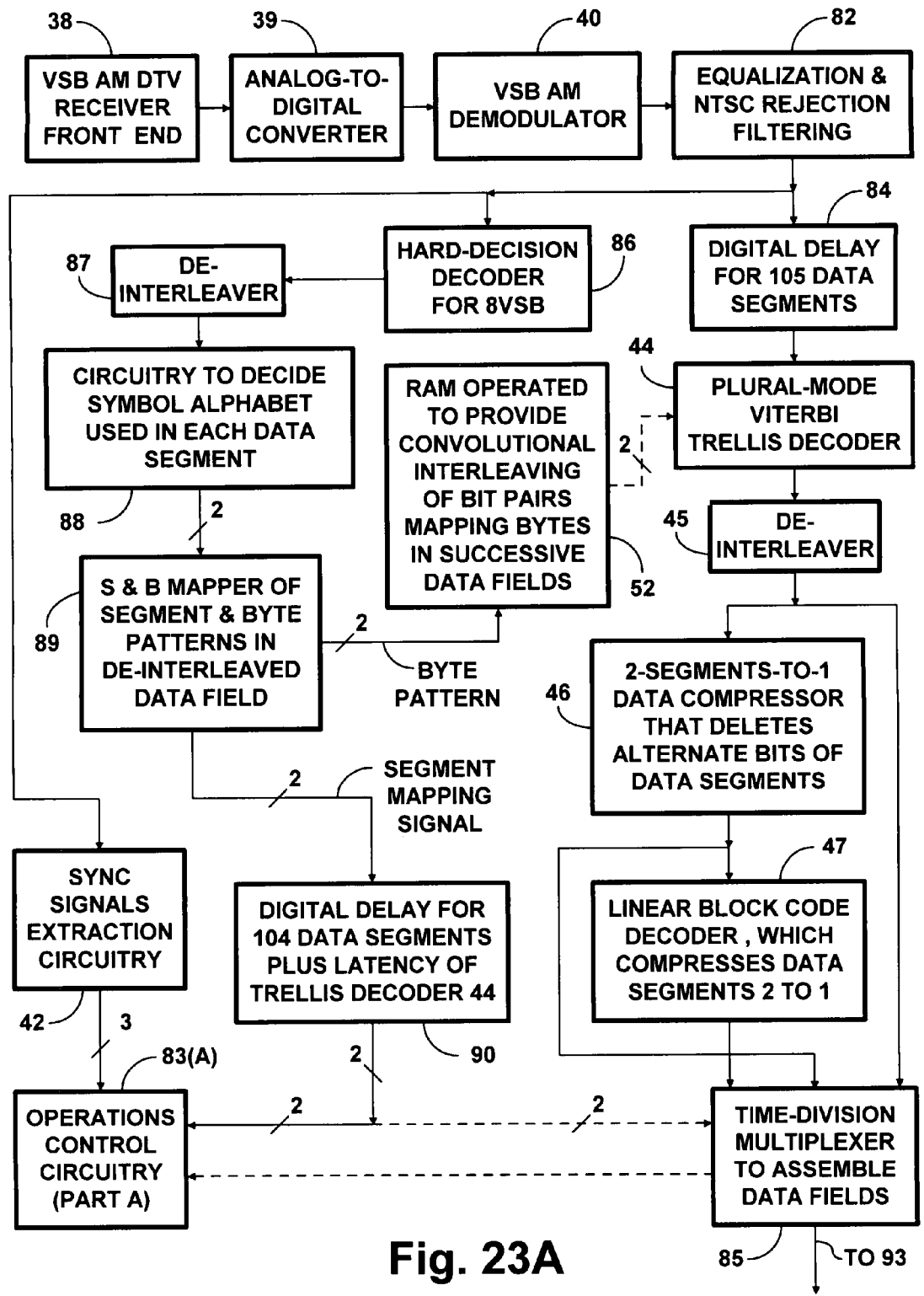
FIGS. 23A and 23B combine to form a FIG. 23 schematic diagram of DTV receiver apparatus embodying an aspect of the invention, which DTV receiver apparatus is operable without advance information concerning the nature of robust transmissions.
Figure 23B:
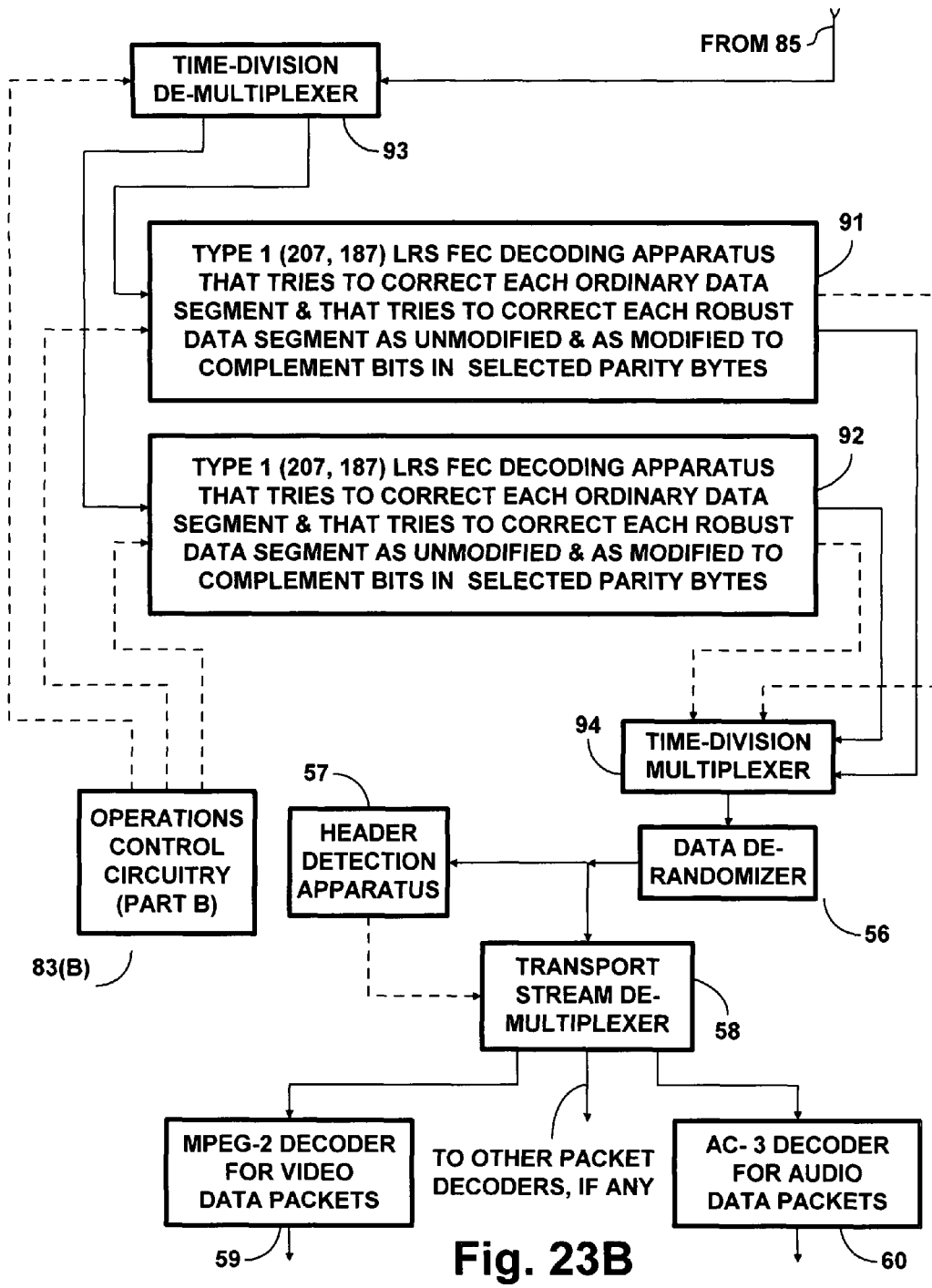

FIGS. 23A and 23B show initial and final portions of FIG. 23 DTV receiver apparatus that is operable without need for advance information concerning the nature of robust transmissions. FIG. 23A shows a modification of the FIG. 16A portion of the FIG. 16 DTV receiver apparatus, which modification permits the apparatus to receive robust transmissions usefully without advance information concerning the nature of those robust transmissions. The initial portion of DTV receiver apparatus shown in FIG. 23A like that shown in FIG. 16A includes the VSB AM DTV receiver front-end 38, the analog-to-digital converter 39 and the demodulator 40 in cascade connection. FIG. 23A shows the demodulator 40 is connected to supply digitized baseband DTV signal to digital filtering 82 for equalization of channel response and for rejection of co-channel interfering NTSC signal. The digital filtering 82 differs from the digital filtering 41 shown in FIG. 16A in that it does not include adaptable decision-feedback equalization filtering. The synchronization signals extraction circuitry 42 is connected for receiving the digital filtering 82 response and functions the same as in the FIG. 16 DTV receiver apparatus. FIGS. 23A and 23B show parts 83(A) and 83(B), respectively, of operations control circuitry 83 for controlling operations within the FIG. 23 DTV receiver apparatus. Showing the operations control circuitry 83 in two parts is an artifice used in the drawings to avoid running numerous connections from elements shown in one of FIGS. 16A and 16B to elements shown in the other of these figures. FIG. 23A shows that part 83(A) of the operations control circuitry 83 is connected for receiving DFS signal, DSS signal and clocking signal at an even multiple of symbol rate via respective connections from the sync-signals-extraction circuitry 42 in FIG. 23A. These signals are provided with respective delays by means not explicitly shown, which delays compensate for latent delays accumulated in the FIG. 23A.

The plural-mode 12-phase trellis decoder 44 of Viterbi type is connected for receiving the digital filtering 82 response via digital delay circuitry 84 that delays the digital filtering 82 response some 105 data segments. The trellis decoder 44 carries out its symbol coding procedures in the manner prescribed by bit pairs that the trellis decoder 44 receives as a mode selection signal from the RAM 52. The trellis decoder 44 is connected to supply data to the de-interleaver 45, which is connected to supply successive segments of de-interleaved data fields. The 2-segments-to-1 data compressor 46 is connected for receiving those data segments. The LBC decoder 47 is connected for receiving data segments from the data compressor 46. The time-division multiplexer 53 of FIG. 16A is replaced in FIG. 23A by a time-division multiplexer 85 of different internal construction. The first, second and third input ports of the multiplexer 85 receive inputs signals from the LBC decoder 47, the 2-segments-to-1 data compressor 46 and the de-interleaver 45.

FIG. 23A shows circuitry for analyzing the symbol alphabet used in various portions of the reproduced baseband DTV signal. This circuitry includes a hard-decision decoder 86 for 8VSB symbols, which is connected for receiving the response of the digital filtering 82. The decisions that the decoder 86 makes concerning the 3-bit symbols are supplied to a de-interleaver 87 that complements the convolutional interleaver 12 in the DTV transmitter. However, the de-interleaver 87 operates with 12-bit bytes, rather than standard 8-bit bytes, and supplies symbol code to circuitry 88 to decide the symbol alphabet used in each data segment. The circuitry 88 decides the symbol alphabet used in each data segment by evaluating the distribution of 8VSB symbols used in each data segment, which procedures are described in more detail further on in this specification. Each of the decisions that the circuitry 88 makes is expressed as a bit pair that is supplied to S&B mapper 89 that maps segment and byte patterns in a de-interleaved data field. The S&B mapper 89 includes a small random-access memory, used as a cache memory for the temporary storage of bit pairs indicating the decisions made by the circuitry 88 to decide the symbol alphabet used in each data segment. The storage locations in this half-byte cache memory are addressed by the number of the segment in the data frame(s) to which the temporarily stored half-byte corresponds. At a suitable time the S&B mapper 9 extends each bit pair that it stores by repeating it 206 times. This is done to map the 207 bytes of a segment of non-interleaved data field as a row of 207 bit pairs for writing to the random-access memory 52.

The circuitry 88 can determine in the following way whether or not a data segment is transmitted using first coset modulation exclusively. The 3-bit symbol codes that the de-interleaver 87 supplies are supplied to a set of eight decoders, each responding with a ONE when and only when a respective one of the eight 3-bit symbol codes occurs. (This set of eight decoders is also employed in determining if a data segment is transmitted using ordinary 8VSB modulation or is transmitted second coset modulation exclusively.) The responses of the decoders for 010, 011, 110 and 111 symbol codes are applied to respective input ports of a 4-input OR gate. The ONEs that the 4-input OR gate generates in the 828 symbol epochs of each data segment are counted. The count is compared to a prescribed threshold value, such as 777. If this threshold is exceeded, this is an indication that the data segment was transmitted using first coset modulation exclusively. This indication conditions a first pair of tri-states to assert the 01 bit pair from low source impedances on the output lines from the circuitry 86.

The circuitry 86 can determine in the following way whether or not a data segment is transmitted using second coset modulation exclusively. The responses of the decoders for 000, 001, 100 and 101 symbol codes are applied to respective input ports of a 4-input OR gate. The ONEs that the 4-input OR gate generates in the 828 symbol epochs of each data segment are counted. The count is compared to a prescribed threshold value, such as 777. If this threshold is exceeded, this is an indication that the data segment was transmitted using second coset modulation exclusively. This indication conditions a second pair of tri-states to assert the 10 bit pair from low source impedances on the output lines from the circuitry 86.

The circuitry 86 can determine in the following way whether or not a data segment is transmitted using pseudo-2VSB. The de-interleaver 85 supplies the circuitry 86 with a succession of 3-bit symbol codes. The $Z_2$ and $Z_1$ bits of these symbol codes are applied to respective input ports of a first two-input exclusive-NOR gate, which responds with a ONE to all symbols included in the pseudo-2VSB set and with a ZERO to all symbols excluded from the pseudo-2VSB set. The ONEs that the first exclusive-NOR gate generates in the 828 symbol epochs of each data segment are counted. The count is compared to a prescribed threshold value, such as 777. If this threshold is exceeded, this is an indication that the data segment was transmitted using pseudo-2VSB. This indication conditions a third pair of tri-states to assert the 11 bit pair from low source impedances on the output lines from the circuitry 86.

The circuitry 86 can weakly assert the 00 bit pair from relatively high source impedances on its output lines, permitting the inference that a data segment is transmitted using the full alphabet of 8VSB symbols when none of the bit pairs 01, 10 and 11 is strongly asserted on those output lines. Alternatively, the circuitry 86 can determine in the following way that a data segment is transmitted using the full alphabet of 8VSB symbols. Respective counters can be used to count the ONEs in each of the response of the set of eight decoders, each responding with a ONE when and only when a respective one of the eight 3-bit symbol codes occurs. The counts can be compared to a threshold value somewhat above 104, say 127, to determine if one of the symbol codes appears more frequently than would be expected in an 8VSB signal. A plural-input NOR gate is connected for receiving these eight decisions and the decisions concerning whether or not the data segment was transmitted using pseudo-2VSB, first coset modulation or second coset modulation. The response of this plural-input NOR gate being a ONE at the conclusion of a data segment is a reasonably reliable indication that the data segment was transmitted using the full alphabet of 8VSB symbols. This indication conditions a fourth pair of tri-states to assert the 00 bit pair from low source impedances on the output lines from the circuitry 86.

If an alternative form of PCPM is used that intermixes first coset modulation and second coset modulation within the same data segment, the circuitry 86 can determine in the following way whether or not a data segment is transmitted using symbols with a predetermined sequence of $Z_1$ bits. The $Z_1$ bits of the 3-bit symbol codes that the de-interleaver 85 supplies are applied to a first input port of a second two-input exclusive-NOR gate, which has the prescribed sequence of $Z_1$ bits applied to its second input port. The ONEs that the second exclusive-NOR gate generates in the 828 symbol epochs of each data segment are counted. The count is compared to a prescribed threshold value, such as 777. If this threshold is exceeded, this is an indication that the data segment was transmitted using symbols with a predetermined sequence of $Z_1$ bits.

As noted supra, the digital delay circuitry 82 delays the digital filtering 81 response by 105 or so data segments. This is so the input signal to the trellis decoder 44 is in temporal alignment with the bit pairs that the RAM 52 supplies the trellis decoder 44 as control signal descriptive of symbol usage in the interleaved data field. Digital delay circuitry 88 delays the segment mapping signal that the S&B mapper 87 supplies to compensate for the latency of the de-interleaver 45, which is presumed to be 104 data segment intervals, and the latency of the preceding trellis decoder 44. The digital delay circuitry 88 is connected to supply delayed segment mapping signal to the time-division multiplexer 83 as its control signal and to the 43(A) portion of the operations control circuitry 43.

FIG. 23B shows the final portion of the FIG. 23 DTV receiver apparatus which differs from the final portion of the FIG. 16 DTV receiver apparatus shown in FIG. 16B in that two (207, 187) lateral Reed-Solomon forward-error-correction decoding apparatuses 91 and 92 are used, rather than just one. This allows the (207, 187) LRS FEC decoding procedures to be done at half as fast rate. The operation of a time-division de-multiplexer 93 is controlled by control signal received from the part 83(B) of the operations control circuitry 83. The de-multiplexer 93 selects certain data segments originating from the 2-segments-to-1 data compressor 46 and certain data segments containing 8 VSB signal to the (207, 187) LRS FEC decoding apparatus 91 for decoding. The de-multiplexer 93 selects the other data segments containing 8 VSB signal and certain data segments originating from the LBC decoder 47 to the (207, 187) LRS FEC decoding apparatus 92 for decoding. A time-division multiplexer 94 is connected for receiving data packets resulting from trial-and-error decoding procedures and error correction procedures by the (207, 187) LRS FEC decoding apparatuses 91 and 92. The time-division multiplexer 94 is connected to receive control signals the (207, 187) LRS FEC decoding apparatuses 91 and 92 generate for indicating which of those data packets they supply are extracted from correct(ed) (207, 187) LRS FEC codewords. The time-division multiplexer 94 responds to these control signals to reproduce in its response those data packets that have been extracted from correct(ed) (207, 187) LRS FEC codewords. The data de-randomizer 56 is connected for de-randomizing the bits in its response to data packets reproduced by the time-division multiplexer 94. Connections and operation of the header detection apparatus 57, the transport stream de-multiplexer 58 the MPEG-2 decoder 59 and the AC-3 decoder 60 are the same in the FIG. 23B DTV receiver apparatus as in the FIG. 16B DTV receiver apparatus.

Figure 24:
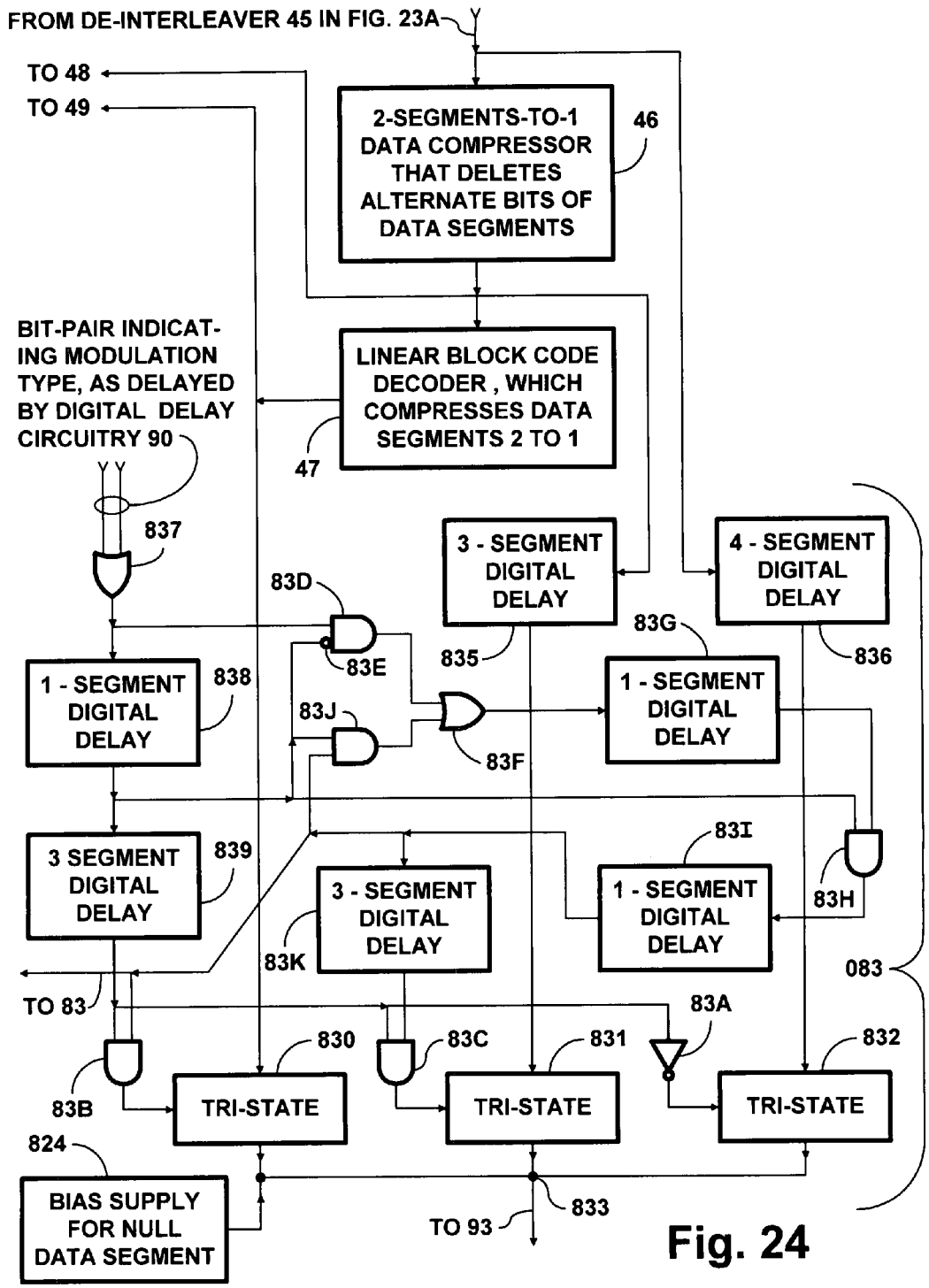
FIG. 24 is a schematic diagram showing in detail the construction of a time-division multiplexer shown in FIG. 23A.

FIG. 24 shows in considerable detail one embodiment 085 of the time-division multiplexer 85 shown in FIG. 23A, suited for use in a DTV receiver designed to receive DTV signals transmitted by the DTV transmitter apparatuses of FIGS. 1 and 21. Tri-states 850, 851 and 852 are connected to supply their responses to a shared node 853. A bias supply 854 supplies a continually repeating null data segment to the node 853. The source impedance of the bias supply 854 is low compared to the source impedance sometimes exhibited by the tri-states 850, 851 and 852, but high compared to the source impedance exhibited by one of the tri-states 850, 851 and 852 at other times. FIG. 23A implicitly shows that shared node 853 being connected for supplying input signals to the time-division de-multiplexer 93 shown in FIG. 23B. The LBC decoder 47 is connected for supplying segments of randomized data to the tri-state 850 as input signal. Presumably, the de-interleaver 45 has to supply four segments of randomized data to the LBC decoder 47 before the LBC decoder 47 can in the next data segment interval deliver a complete single segment of randomized data to the tri-state 850 as input signal. Presumably, the de-interleaver 45 has to supply two segments of randomized data to the 2-segments-to-1 data compressor 46 before the data compressor 46 can in the next data segment interval deliver a complete single segment of randomized data. After an additional delay of three data segment intervals, digital delay circuitry 855 reproduces segments of randomized data from data compressor 46 for application to the tri-state 851 as input signal. After a delay of four data segment intervals, digital delay circuitry 856 reproduces the de-interleaved segments of randomized data from the de-interleaver 45 for application to the tri-state 852 as input signal.

In FIG. 23A the bit-pair that the S&B mapper 89 supplies for indicating the form of modulation used in a data segment is delayed by the digital delay circuitry 90 to provide input signals to the OR gate 857 in FIG. 24. The delayed bit pair from the digital delay circuitry 90 indicates the form of modulation used in the data segment currently supplied from the de-interleaver 45. Digital delay circuitry 858 is connected for reproducing in its own response the response that the OR gate 857 generated one data segment earlier. Digital delay circuitry 859 is connected for reproducing in its own response the response that the digital delay circuitry 858 generated three data segments earlier. The digital delay circuitry 859 is connected for applying its response, which reproduces the response that the OR gate 857 generated four data segment earlier, as input signals to a NOT gate 85A and to two-input AND gates 85B and 85C. The output responses of the AND gates 85B and 85C are applied as control signals to the tri-states 850 and 851, respectively. The output response of the NOT gate 85A is applied as control signal to the tri-state 852.

When the time-division multiplexer 85 receives a 00 bit-pair, indicating that the segment of randomized data supplied from the de-interleaver 45 employs ordinary 8VSB modulation, the responses of the OR gate 857 is ZERO. This ZERO response is reproduced by the digital delay circuitry 859 four data segment intervals later and applied as input signals to a NOT gate 85A and to AND gates 85B and 85C. The NOT gate 85A response to its ZERO input signal is a ONE, which applied as control signal to the tri-state 852 conditions the tri-state 852 to reproduce the response of the digital delay circuitry 856 from low source impedance. The response of the digital delay circuitry 856 reproduces the data segment supplied from the de-interleaver 45 four data segment intervals earlier. The AND gates 85B and 85C respond with respective ZEROes to their ZERO input signals from the digital delay circuitry 859. The tri-states 850 and 851 are conditioned to exhibit high source impedances to the node 853 by the ZERO responses of the AND gates 85B and 85C applied to them as their respective control signals. The tri-state 852 is accordingly able to assert on the node 853 the reproduction of the data segment supplied from the de-interleaver 45 four data segment intervals earlier.

When the time-division multiplexer 85 receives a 11 bit-pair indicating that the data segment supplied from the de-interleaver 45 uses P-2VSB modulation, or receives a 01 or 10 bit-pair indicating that the data segment supplied from the de-interleaver 45 uses PCPM, the responses of the OR gate 857 is ONE. This ONE response is reproduced by the digital delay circuitry 859 four data segment intervals later and applied as input signals to a NOT gate 85A and to AND gates 85B and 85C. The NOT gate 85A response to its ONE input signal is a ZERO. This ZERO applied as control signal to the tri-state 852 conditions the tri-state 852 to reproduce the response of the digital delay circuitry 856 from high source impedance, so the tri-state 852 will not be able to assert its response on the node 853. The ONE response reproduced by the digital delay circuitry 859 applied as input signal to each of the AND gates 85B and 85C will condition each gate to reproduce the other of its input signals in its response. At all times that the digital delay circuitry 859 is ONE, no more than one of these other input signals to the AND gates 85B and 85C is a ONE. So, no more than one of these AND gates 85B and 85C will have a ONE response, and no more than one of the tri-states 850 and 851 will receive a control signal conditioning it to assert its response from a low source impedance upon the node 853. During any data segment interval then, no more than one of the tri-states 850, 851 and 852 will be conditioned to exhibit low source impedance compared to the bias supply 854 supplying a null data segment to the node 853.

The S&B mapper 89 does not supply via digital delay circuitry 90 a bit indicating whether or not a data segment currently supplied from the de-interleaver 45 contains the beginning of a data packet. The OR gate 857 is connected to supply its response to a two-input AND gate 85D as one of its input signals, the other of its signals being the response of a NOT gate 85E. The OR gate 857 response from one data segment interval earlier as reproduced by the digital delay circuitry 858 is applied to the NOT gate 85E as input signal thereto. The AND gate 85D, the delay circuitry 858 and the NOT gate 85E cooperate to detect which segment of the de-interleaver 45 response begins to contain PCPM or P-2VSB modulation after 8VSB modulation has been used. The AND gate 85D generates a ONE response during a data segment interval in which the delay circuitry 90 supplies a 01, 10 or 11 bit pair, providing a 00 bit pair was supplied the immediately previous data segment. The AND gate 85D generates this ONE responsive to the OR gate 857 response becoming ONE after having been ZERO the immediately previous data segment. Which one of the tri-states 850 and 851 will susequently receive a control signal conditioning it to assert its response from a low source impedance upon the node 853 is determined by counting forward from this event. Counting continues during the consecutive data segment intervals in which the OR gate 857 response remains ONE and for one additional data segment interval.

The start-and-stop counter for doing this comprises a two-input OR gate 85F, digital delay circuitry 85H, a two-input AND gate 851, digital delay circuitry 85J and a two-input AND gate 85K connected in loop. The AND gates 851 and 85K are connected to receive the delayed OR gate 857 response from the delay circuitry 858 at respective ones of their input connections other than those used in the loop connection. The loop connection is established and counting proceeds so long as the delayed OR gate 857 response from the delay circuitry 858 is ONE. The loop is broken to stop the counting when the delayed OR gate 857 response from the delay circuitry 858 is ZERO.

More particularly, the AND gate 85D is connected for supplying its response to the OR gate 85F as one of its input signals. The OR gate 85F is further connected for receiving, as the other of its input signals, the response of the AND gate 85J. The OR gate 85F is also connected for supplying its response to the digital delay circuitry 85G as input signal thereto. The delay circuitry 85G reproduces the OR gate 85F response after a delay of one data segment interval, and the delay circuitry 85G is connected for applying its response to the AND gate 85H as one of the two input signals thereof. The AND gate 85H is connected for supplying its response to the digital delay circuitry 851 as input signal thereto. The digital delay circuitry 851 is connected for feeding its response back to the AND gate 85J as one of its two input signals. The digital delay circuitry 851 is further connected for applying its response as an input signal to the AND gate 85B. The response of the digital delay circuitry 851 will be a ONE every other data segment interval so long as counting proceeds in the start-and-stop counter loop. The AND gate 85B will reproduce response of the digital delay circuitry 851 received as one of its input signals so long as its other input signal is a ONE indicating that the tri-state 852 is not conditioned to exhibit low source impedance to the node 853. For as long as counting proceeds in the start-and-stop counter loop and for an additional data segment interval, then, the tri-state 850 will receive a ONE control signal from the AND gate 85B every other data segment interval, conditioning the tri-state 850 to exhibit low source impedance to the node 853.

A digital delay circuit 85K is connected to receive, as input signal thereto, the response of the digital delay circuit 851. After a delay of three data segment intervals, the digital delay circuitry 85K reproduces the response of the digital delay circuitry 851 for application to the AND gate 85C. The AND gate 85B will reproduce the response of the digital delay circuitry 85K received as one of its input signals so long as its other input signal is a ONE indicating that the tri-state 852 is not conditioned to exhibit low source impedance to the node 853. For as long as counting proceeds in the start-and-stop counter loop, then, the tri-state 851 will later receive a delayed ONE control signal from the AND gate 85B every other data segment interval, conditioning the tri-state 851 to exhibit low source impedance to the node 853. That is, responsive to a long sequence of data segments using PCPM or P-2VSB modulation, the tri-states 850 and 851 will alternate exhibiting low source impedance from one data segment to another.

The digital delay circuitry 851 is further connected for supplying its response to the operations control circuitry 83, respective parts 83(A) and 83(B) of which are shown in FIG. 23A and in FIG. 23B. The operations control circuitry 83 utilizes the alternating sequence of ONEs and ZEROes supplied thereto in the response from the digital delay circuitry 851 for controlling the operation of the time-division de-multiplexer 93 shown in FIG. 23B.

FIG. 25 shows a modification made to the FIG. 16A portion of the FIG. 16 DTV receiver apparatus. This modification provides for restoring to original form segments of randomized robust data that had to be modified at the DTV transmitter in order to be disregarded by legacy DTV receivers. In FIG. 25 the byte de-interleaver 45 has no direct connection to the 2-segments-to-1 data compressor 46 nor to the time-division multiplexer 53. Instead, the de-interleaver 45 is connected for supplying de-interleaved segments containing randomized data to circuitry 95 to restore the final twenty data bytes of modified data segments. After restoring the modified data segments, the circuitry 95 reproduces the original segments of randomized data. The circuitry 95 is connected for supplying those original segments of randomized data to the input port of the data compressor 46 and to the first input port of the time-division multiplexer 53. The S&B mapper 51 is connected to supply segment-mapping signal to the circuitry 95 for controlling its operation. This segment-mapping signal includes a bit indicating whether or not the final twenty bytes of the data segment were modified at the DTV transmitter and therefore need to be restored to original form by the circuitry 95. This segment-mapping signal further includes the bit pair specifying the type of modulation used in each data segment that the de-interleaver 45 currently supplies to the circuitry 95. If the bit pair is 01 or 10, the circuitry 95 is conditioned to complement only the odd bits of the final twenty bytes of the data segment supplied from the de-interleaver 45 when restoring to original form a data segment modified at the DTV transmitter. If the bit pair is 11, the circuitry 95 is conditioned to complement all bits of the final twenty bytes of the data segment supplied from the de-interleaver 45 when restoring to original form a data segment modified at the DTV transmitter.

Ordinarily, the circuitry 95 is not called upon'to restore segments of ordinary 8VSB data to original form. The even bits of the final twenty bytes of each data segment supplied from the circuitry 95 are discarded in the response of the 2-segments-to-1 data compressor 46. Accordingly, the circuitry 95 can be replaced by simpler circuitry that selectively complements all bits of the final twenty bytes of data segments supplied from the de-interleaver 45. These bits are complemented whenever S&B mapper generates the bit indicating that the final twenty bytes of the current data segment were modified at the DTV transmitter. Such circuitry can be bypassed for segments of ordinary 8VSB data. This can be arranged simply by connecting the third input port of the time-division multiplexer to receive data segments from the de-interleaver 45 by direct connection without any substantial intervening element.

FIG. 26 shows this last-described alternative to using the circuitry 96 to restore the final twenty data bytes of modified data segments. Circuitry 96 selectively complements all bits of the final twenty bytes of data segments supplied from the de-interleaver 45 to the 2-segments-to-1 data compressor 46. The circuitry 96 performs this selective complementing responsive to a bit that the S&B mapper 51 supplies. This bit indicates whether or not the data segment had its final twenty bytes modified at the DTV transmitter so that legacy DTV receivers would not mistake it for a complete (207, 187) LRS FEC codeword. This bit is read from the cache memory in the S&B mapper 51 that temporarily stores the bit-pairs from the FIG. 12 or 15 future-data-field signal which have the FIG. 13 format.

The FIG. 16 DTV receiver modified per FIG. 25 or 26 is preferred over the unmodified FIG. 16 DTV receiver because there is little, if any, need for trial-and-error (207, 187) LRS FEC decoding. The FIG. 16 DTV receiver, even in its unmodified form, is preferred over the FIG. 23 DTV receiver. The FIG. 23 DTV receiver is primarily of interest for its teaching that enables those skilled in the art of DTV receiver design to develop a more sophisticated DTV receiver design by modifying or further modifying the FIG. 16 DTV receiver. This more sophisticated DTV receiver uses the signal analysis features of the FIG. 23 DTV receiver to provide back-up protection against corruption or absence of the future-data-field signal.

FIG. 27 shows modifications that can be made to the FIG. 16B portion of the FIG. 16 DTV receiver when the FIG. 16A portion of that receiver is modified per FIG. 25 to include the circuitry 95 to restore the final twenty data bytes of modified data segments (or alternatively is modified per FIG. 26 to include the circuitry 96). FIG. 27 shows a de-multiplexer 97 connected for receiving data segments from the multiplexer 53 in the FIG. 25 or 26 DTV receiver apparatus. The de-multiplexer 97 responds to control signal supplied from modified S&B mapper 51 to separate data segments using a different type of lateral forward-error-correction coding than Reed-Solomon coding from the data segments with LRS FEC coding. The de-multiplexer 97 is connected for supplying this different type of lateral forward-error-correction coding to decoder apparatus 98 for this different type of lateral forward-error-correction coding. This is feasible because modified data segments were restored to their original forms previous to the multiplexer 53 in the FIG. 27 or 26 DTV receiver apparatus. The de-multiplexer 91 responds to the control signal supplied from modified S&B mapper 51 to sort data segments using LRS FEC coding to a (207, 187) lateral Reed-Solomon forward-error-correction decoder 99. The (207, 187) LRS-FEC-code decoder 99 differs from the (207, 187) LRS FEC decoding apparatus 55 in that it does not pursue a trial-and-error procedure that modifies the parity bytes in a data segment after each failed trial for correction. The (207, 187) LRS-FEC-code decoder 99 is connected to supply data packets to the data de-randomizer 56. The Connections and operation of the header detection apparatus 57, the transport stream de-multiplexer 58 the MPEG-2 decoder 59 and the AC-3 decoder 60 in the FIG. 27 DTV receiver apparatus are the same as in the FIG. 16B DTV receiver apparatus.

In the FIG. 25 DTV receiver apparatus the circuitry 95 restores the final twenty data bytes of modified data segments to their original forms. Therefore the (207, 187) LRS-FEC-code decoder 99 is able to decode data segments without having to resort to trial-and-error procedures. In the FIG. 26 DTV receiver apparatus the circuitry 96 achieves a similar result. In practice, however, some trial-and-error procedure may be retained in case the control data segment is corrupted by noise. Reducing the number of trial-and-error procedures or eliminating them altogether speeds up the (207, 187) LRS-FEC-code decoding.

Figure 28:
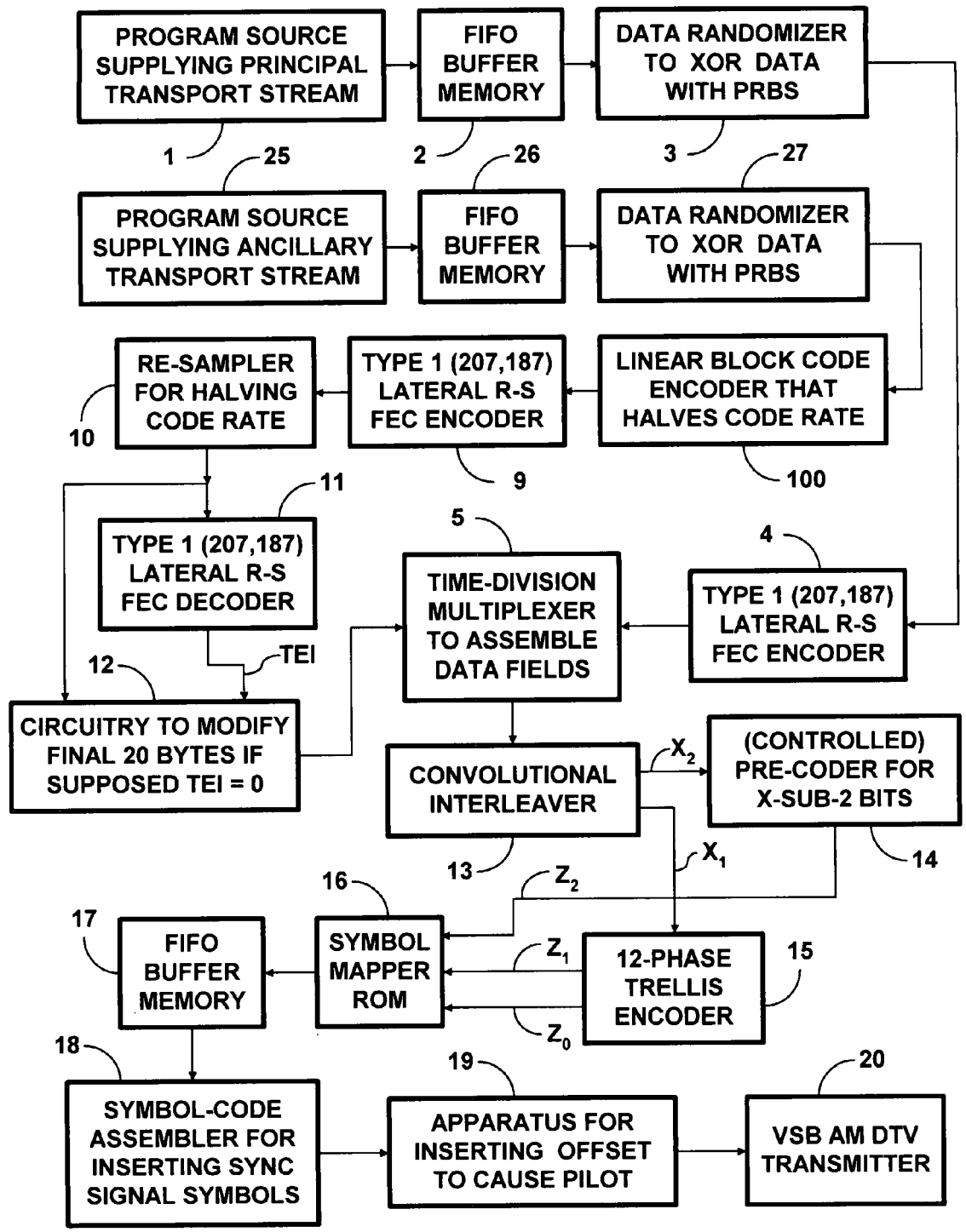
FIG. 28 is a schematic diagram of a modification of the FIG. 8 DTV transmitter apparatus, which modification is made in accordance with a further aspect of the invention.
Figure 29A:
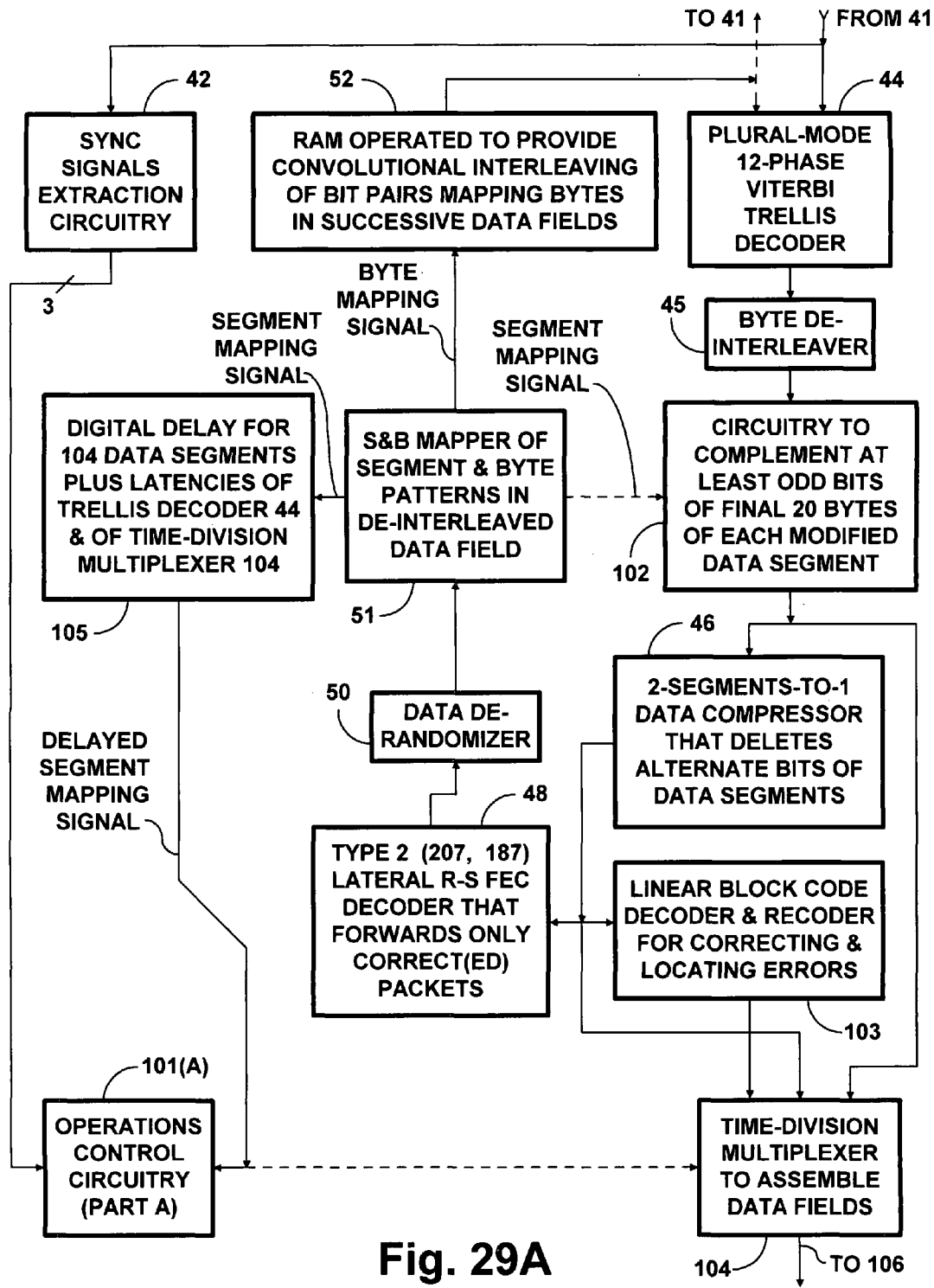
FIGS. 29A and 29B combine to form a FIG. 29 schematic diagram of DTV receiver apparatus embodying an aspect of the invention, which DTV receiver apparatus can of receive DTV signals as transmitted by the DTV transmitter apparatuses of FIGS. 1 and 28.
Figure 29B:
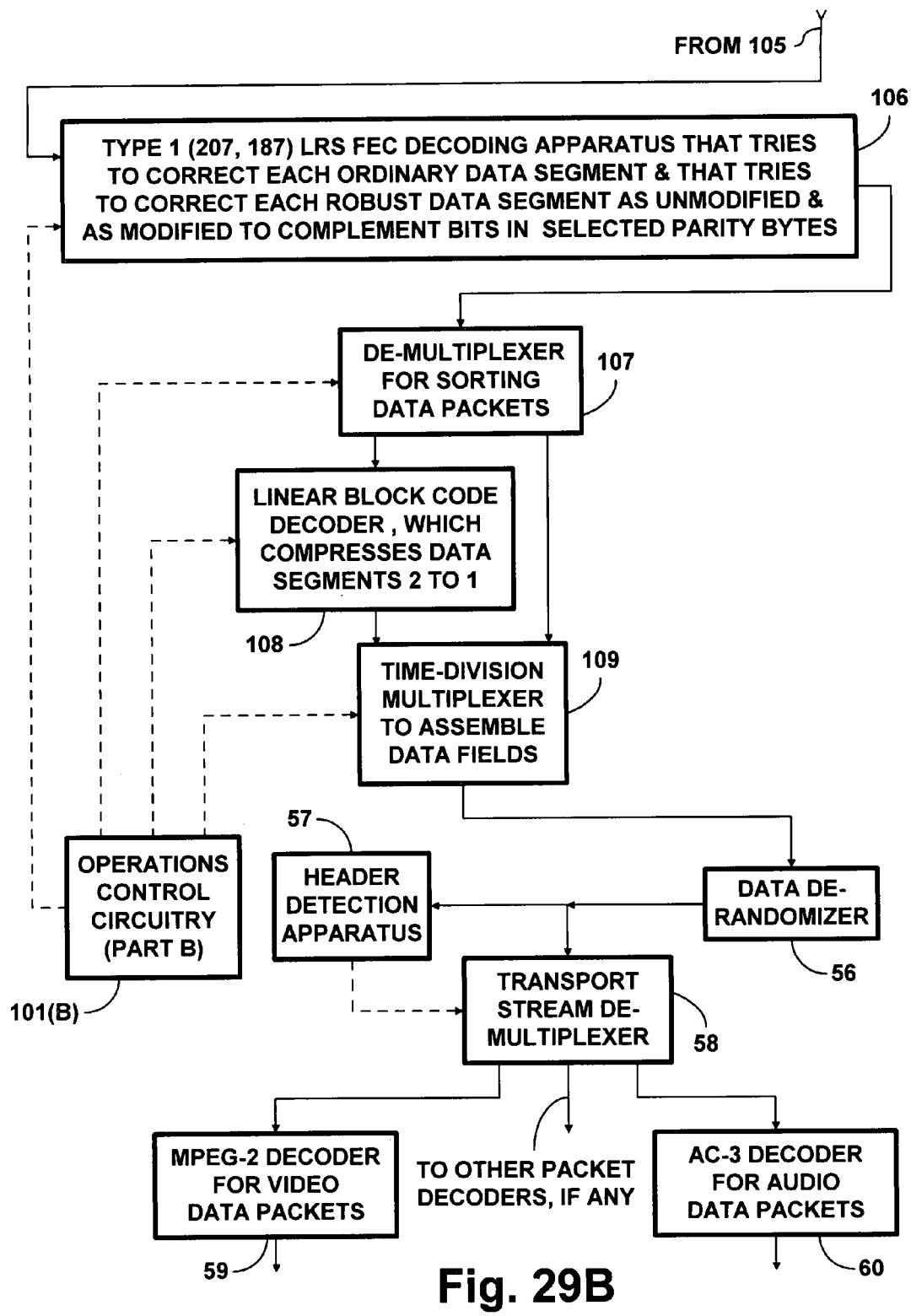

FIGS. 28, 29A and 29B illustrate another way to reduce the number of trial-and-error procedures for decoding (207, 187) R-S FEC codewords transmitted at one-quarter the 2/3 code rate of ordinary 8VSB signals, which is to perform the (207, 187) R-S FEC encoding on half packets of data, rather than on quarter packets. FIG. 28 shows a modification of the FIG. 8 DTV transmitter for doing this. Testing performed by persons other than the inventor appears to indicate that (207, 187) R-S FEC encoding at reduced code rates does not reduce transmission errors by a large factor. In the FIG. 28 modification the linear-block-code (LBC) encoder 100 is connected for receiving de-randomized data from the data randomizer 27 directly, before (207, 187) R-S FEC encoding. The LBC encoder 100 is connected for supplying its output signal to the type one (207, 187) R-S FEC encoder 9, which is connected for supplying (207, 187) R-S FEC codewords to the re-sampler 10 for halving code rate again. This arrangement avoids problems with (23, 12) binary Golay code and (24, 12) binary extended Golay code encountered in transmissions from the FIG. 8 DTV transmitter.

FIGS. 29A and 29B show initial and final portions, respectively, of FIG. 29 DTV receiver apparatus capable of receiving DTV signals from the FIG. 1 and FIG. 28 DTV transmitters. FIGS. 29A and 29B show parts 101(A) and 101(B), respectively, of operations control circuitry 101 for controlling operations within the FIG. 31 DTV receiver apparatus. The FIG. 29 DTV receiver apparatus differs from the FIG. 16 DTV receiver apparatus in that the operations control circuitry 101 replaces the operations control circuitry 43. Besides the 101 (A) portion of the circuitry 101 replacing the 101 (A) portion of the circuitry 101, the DTV receiver apparatus shown in FIG. 29A differs from that shown in FIG. 16A in the following respects. The FIG. 29A apparatus does not include the LBC decoder 47 nor the (207, 187) LRS-FEC-code decoder 49 nor the time-division multiplexer 53. The byte de-interleaver 45 is connected to supply de-interleaved data segments to circuitry 102 to complement at least the odd bits of the final twenty bytes of each modified data segment. That is, of each data segment modified at the DTV transmitter so that legacy DTV receivers would not mistake it for a complete (207, 187) LRS FEC codeword. E.g., the circuitry 102 can be the circuitry 95 to restore the final twenty data bytes of modified data segments as shown in FIG. 25. Decoder/recoder circuitry 103 decodes the linear block coding of certain ones of the data segments supplied by the 2-segments-to-1 data compressor 46, corrects errors where possible, notes the blocks with uncorrected error, and recodes the corrected blocks using the same linear block code they were decoded from.

A time-division multiplexer 104 has three input ports, the first connected to receive segments of robust data supplied from the decoder/recoder circuitry 103. The second input port of the multiplexer 104 is connected to receive segments of robust data supplied from the 2-segments-to-1 data compressor 46. The third input port of the multiplexer 104 is connected to receive segments of ordinary 8VSB data from the circuitry 102 to complement at least the odd bits of the final twenty bytes of each modified data segment. Digital delay circuitry 105 reproduces the segment mapping signal from the S&B mapper circuitry 51 after a delay of 104 data segments plus the combined latencies of the trellis decoder 44 and the multiplexer 104. Responsive to the digital delay circuitry 105 response received as control signal, the multiplexer 104 time-division multiplexes segments of robust data and segments of ordinary 8VSB data together in its output signal. FIGS. 29A and 29B show the multiplexer 104 output signal supplied to (207, 187) lateral Reed-Solomon forward-error-correction decoding apparatus 106 of the first type. The time-division multiplexer 104 includes digital delay circuitry for the segments of robust data from the 2-segments-to-1 data compressor 46, so as to compensate for the latency of the LBC decoder/recoder circuitry 103 and to further delay those data segments one additional data segment interval. The multiplexer 104 also includes digital delay circuitry for the segments of ordinary 8VSB data, so as to compensate for the latency of the LBC decoder/recoder circuitry 103. Except for the digital delay circuitry needed to compensate for the latency of the LBC decoder/recoder circuitry 103 being somewhat longer than that needed for to compensate for the latency of the decoder, the multiplexer 104 can be embodied along lines similar to the FIG. 22 embodiment 0053 of the time-division multiplexer 53.

The (207, 187) LRS FEC decoding apparatus 106, shown in FIG. 29B, is similar to the (207, 187) LRS FEC decoding apparatus 55, but is not called upon to consider any more than four possible (207, 187) LRS FEC codewords for each data segment received, rather than as many as sixteen possible codewords. The (207, 187) LRS FEC decoding apparatus 106 is connected for supplying 187-byte data packets to a de-multiplexer 107 for sorting data packets under the control of the operations control circuitry 101. The de-multiplexer 107 sorts those packets that contain linear block coded data to a decoder 108 for linear-block-code to recover MPEG-2-compliant data packets. A time-division multiplexer 109 is used for assembling MPEG-2-compliant data packets into data fields for application to the data de-randomizer 56. A first of two input ports of the multiplexer 109 is connected to receive the data packets recovered by the decoder 99 for linear block code. The de-multiplexer 107 sorts those packets that do not contain linear block coded data to the second input port of the multiplexer 109. The data de-randomizer 56, header detection apparatus 57, transport stream de-multiplexer 58, the MPEG-2 decoder 59 and the AC-3 decoder 60 of FIG. 31B are connected and operated similarly to the way the corresponding elements of FIG. 16B are.

Other DTV receivers embodying certain aspects of the invention are variants of the DTV receiver of FIGS. 16A and 16B or that receiver modified per FIG. 26. In these variants the time-division multiplexer 53 is dispensed with. Another DTV receiver embodying certain aspects of the invention is a variant of the DTV receiver of FIGS. 23A and 23B, which variant dispenses with the time-division multiplexer 85. In each of these variant DTV receivers the data segments from the data interleaver 45, from the 2-segments-to-1 data compressor 46 and from the LBC decoder 47 are supplied to respective (207, 187) LRS-FEC-code decoders of the first type, each of which asserts correct(ed) data packets on the input connection to the data de-randomizer 56.

A variant of the DTV receiver of FIGS. 16A and 16B modified per FIG. 25 also dispenses with the time-division multiplexer 53. The data segments from the circuitry 95 to restore the final twenty bytes of modified data segments, from the 2-segments-to-1 data compressor 46 and from the LBC decoder 47 are supplied to respective (207, 187) LRS-FEC-code decoders of the first type, each of which asserts correct(ed) data packets on the input connection to the data de-randomizer 56.

A variant of the DTV receiver of FIGS. 29A and 29B dispenses with the time-division multiplexer 104. The data segments from the circuitry 102 to complement at least the odd bits of the final twenty bytes of each modified data segment, from the 2-segments-to-1 data compressor 46 and from the decoder/recoder circuitry 103 are supplied to respective (207, 187) LRS-FEC-code decoders of the first type, each of which asserts correct(ed) data packets on the input connection to the data de-randomizer 56.

The described DTV system can be modified so as to transmit the future-field-description signals using (207, 187) LRS FEC coding of the first type used for transmitting ordinary DTV signals, rather than using (207, 187) LRS FEC coding of a special second type. The portion of the DTV transmitter shown in FIG. 14 would then be modified to replace the type two (207, 187) LRS FEC encoder 34 with a type one (207, 187) LRS FEC encoder. The DTV receivers would be modified replacing the type two (207, 187) LRS-FEC-code decoder 48 shown in FIGS. 16A, 25, 26 and 29A with a type one (207, 187) LRS-FEC-code decoder. Furthermore, the type two (207, 187) LRS-FEC-code decoder 49 shown in FIGS. 16A, 25 and 26 would be replaced with a type one (207, 187) LRS-FEC-code decoder. These replacement (207, 187) LRS-FEC-code decoders of the first type would forward to the data de-randomizer 50 only those correct(ed) data packets having PIDs identifying them as containing a future-field-description signal. Transmitting the future-field-description signals using (207, 187) LRS FEC coding of the first type permits the same (207, 187) LRS-FEC-code decoders used in a DTV receiver for decoding future-field-description signals to be used for decoding other signals of reduced code rate. This is conveniently done in a DTV receiver that uses separate (207, 187) LRS-FEC-code decoders for decoding ordinary 8VSB signals, for decoding signals with code rate one-half of that of ordinary 8VSB signals, and for decoding signals with code rate one-quarter or so of that of ordinary 8VSB signals.

Some of the foregoing precepts are readily applied to other digital television broadcast systems that may be developed, and this should be considered when contemplating the scope of the claims which follow. The coding apparatus for generating robust DTV signal transmissions may be of types different from those shown, reducing code rate such that the (207, 187) R-S FEC codeword encoding an MPEG-2-compliant packet is expanded to form a plurality of 207-bye segments. Those of that plurality of 207-bye segments that will not be usefully received by legacy DTV receivers can be modified as taught in the preceding specification so that the (207, 187) R-S FEC decoders in those receivers will find uncorrectable byte errors in those segments. The coding apparatus for generating robust DTV signal transmissions may include encoders for generating convolutional codes of reduced code rate, for example. The convolutional codes may be constituents of turbo codes, by way of further example. The decoding apparatus for recovering (207, 187) R-S FEC codewords encoding MPEG-2-compliant packets from these different types of robust DTV signal transmissions will suit the particular type of robust DTV signal transmissions being used. However, the techniques for restoring modified 207-byte segments to their original forms before recovering (207, 187) R-S FEC codewords encoding MPEG-2-compliant packets from the particular type of robust DTV signal transmissions being received will be similar to those taught in this specification. Accordingly, the benefits of the invention can be secured for many types of robust DTV signal transmissions as may be devised by those skilled in DTV system design.

What is claimed is:

1. A method of transmitting a digital television signal that includes, in at least selected ones of successive data fields, trellis-coded, convolutionally interleaved, time-division multiplexed segments of data descriptive of information content being transmitted, said digital television signal transmitted for reception by digital television receivers that comprise legacy digital television receivers capable of usefully recovering data only as included in (207, 187) lateral Reed-Solomon forward-error-correction codewords of a sort prescribed by a 1995 Digital Television Standard of an Advanced Television Systems Committee (ATSC) or in 207-byte segments each of which departs from a codeword of said sort in no more than ten of its 8-bit bytes, said method comprising a step of:

generating 207-byte segments of data conveying information content intended to be recovered only by digital television receivers other than said legacy digital television receivers, each of said 207-byte segments of data generated in this step departing from all (207, 187) lateral Reed-Solomon forward-error-correction codewords of said sort prescribed by the 1995 Digital Television Standard in at least eleven of its two hundred seven 8-bit bytes;

generating (207, 187) lateral Reed-Solomon forward-error-correction codewords of said sort, intended to be recovered by said legacy digital television receivers; and time-division multiplexing said 207-byte segments of data, conveying information content intended to be recovered only by the digital television receivers other than said legacy digital television receivers, and said (207, 187) lateral Reed-Solomon forward-error-correction codewords of said sort intended to be recovered by said legacy digital television receivers.

2. A combination comprising:

an apparatus for performing the claim 1 method of transmitting the digital television signal, thus to generate 207-byte segments of data conveying information content that is recoverable intended to be recovered only by the digital television receivers other than said legacy digital television receivers; and a time-division multiplexer connected for assembling said successive data fields including (207, 187) lateral Reed-Solomon forward-error-correction codewords as prescribed by the 1995 ATSC Digital Television Standard, at least selected ones of said successive data fields further including said 207-byte segments of data conveying information content intended to be recovered only by the digital television receivers other than said legacy digital television receivers.

3. The claim 1 method of transmitting said digital television signal, wherein each step thereof the step of generating 207-byte segments of data comprises respective substeps of:

generating a preliminary 207-byte segment of data for conveying information content intended to be recovered only by the digital television receivers other than said legacy digital television receivers;

evaluating said preliminary 207-byte segment of data, for generating a respective decision as to whether (207, 187) lateral Reed-Solomon forward-error-correction circuitry in any legacy digital television receiver will find no more than ten byte errors therein, such evaluation being performed before subsequent steps of assembling data fields by time-division multiplexing, of convolutional byte interleaving and of trellis coding;

in response to each decision that (207, 187) lateral Reed-Solomon forward-error-correction circuitry in any legacy digital television receiver will find no more than ten byte errors in a respective one of said preliminary 207-byte segments of data that has been evaluated, that said preliminary 207-byte segment of data being employed without modification thereof as a respective finalized 207-byte segment of data in said subsequent steps of assembling data fields by time-division multiplexing, of convolutional byte interleaving and of trellis coding; and in response to each respective decision that (207, 187) lateral Reed-Solomon forward-error-correction circuitry in any legacy digital television receiver will find no more than ten byte errors in one of said 207-byte segments of data that has been evaluated, modifying prescribed bytes in that one of said preliminary 207-byte segments of data that has been evaluated so as to preclude (207, 187) lateral Reed-Solomon forward-error-correction circuitry in any legacy digital television receiver finding no more than ten byte errors in a resulting respective modified 207-byte segment of data, each said preliminary 207-byte segment of data as so modified being employed as a respective finalized 207-byte segment of data in said subsequent steps of assembling data fields by time-division multiplexing, of convolutional byte interleaving and of trellis coding.

4. A combination comprising:

an apparatus for performing the claim 3 method of transmitting the digital television signal, thus to generate said 207-byte segments of data for conveying information content intended to be recovered only by the digital television receivers other than said legacy digital television receivers; and a time-division multiplexer connected for assembling said successive data fields including (207, 187) lateral Reed-Solomon forward-error-correction codewords as prescribed by the 1995 ATSC Digital Television Standard, at least selected ones of said successive data fields further including at least one of said 207-byte segments of data conveying information content recoverable intended to be recovered only by the digital television receivers other than said legacy digital television receivers.

5. The claim 3 method of transmitting said digital television signal, wherein the prescribed bytes that are modified in any said modified 207-byte segment of data each have every one of their respective bits complemented.

6. The claim 5 method of transmitting said digital television signal, wherein the prescribed bytes that are modified in any said modified 207-byte segment of data are its final twenty bytes.

7. The claim 3 method of transmitting said digital television signal, wherein the prescribed bytes that are modified in any said modified 207-byte segment of data each have initial ones of consecutive pairs of their respective bits complemented, with final ones of said consecutive pairs of their respective bits remaining unaltered.

8. The claim 7 method of transmitting said digital television signal, wherein the prescribed bytes that are modified in any said modified 207-byte segment of data are its final twenty bytes.

9. The claim 3 method of transmitting said digital television signal, wherein said method includes a further step of:
including respective information within each data field, said respective information concerning said decisions as to whether (207, 187) lateral Reed-Solomon forward-error-correction circuitry in any legacy digital television receiver will find more than ten byte errors in said 207-byte segments of data within said each data field for conveying information intended to be recovered only by the digital television receivers other than said legacy digital television receivers.

10. A combination comprising:
an apparatus for performing the claim 9 method of transmitting the digital television signal, thus to generate 207-byte segments of data conveying information content intended to be recovered only by the digital television receivers other than said legacy digital television receivers; and
a time-division multiplexer connected for assembling said successive data fields including (207, 187) lateral Reed-Solomon forward-error-correction codewords as prescribed by the 1995 ATSC Digital Television Standard, at least selected ones of said successive data fields further including at least one of said 207-byte segments of data for conveying information content intended to be recovered only by the digital television receivers other than said legacy digital television receivers.

11. The claim 3 method of transmitting said digital television signal, wherein said method includes a further step of:
periodically including segments of control data among said trellis-coded, convolutionally interleaved, time-division multiplexed segments of data in successive data fields, each segment of control data pertaining to a respective future group of said segments of data, each segment of control data including information concerning said decisions as to whether (207, 187) lateral Reed-Solomon forward-error-correction circuitry in any legacy digital television receiver will find more than ten byte errors in each said 207-byte segment of data within said respective future group of said segments of data for conveying information content intended to be recovered only by the digital television receivers other than said legacy digital television receivers.

12. The claim 11 method of transmitting said digital television signal, wherein each segment of control data includes information concerning a type of modulation used in each one of said segments of data within said respective future group of said segments of data.

13. A combination comprising:
an apparatus for performing the claim 11 method of transmitting the digital television signal, thus to generate 207-byte segments of data conveying information content recoverable intended to be recovered only by the digital television receivers other than said legacy digital television receivers; and
a time-division multiplexer connected for assembling said successive data fields including (207, 187) lateral Reed-Solomon forward-error-correction codewords as prescribed by the 1995 ATSC Digital Television Standard, at least selected ones of which said successive data fields further including at least one of said 207-byte segments of data conveying information content intended to be recovered only by the digital television receivers other than said legacy digital television receivers.

14. A method of transmitting a digital television signal that includes trellis-coded, convolutionally interleaved, time-division multiplexed segments of data, some of said segments of data being (207, 187) lateral Reed-Solomon forward-error-correction codewords for transmitting randomized MPEG-2-compliant data packets as prescribed by the 1995 ATSC Digital Television Standard, so as to be usefully received by legacy digital television receivers and other segments of said segments of data each being of such nature as not to be usefully received by said legacy digital television receivers, said method comprising steps of:
evaluating each of said other segments of data being of such nature as not to be usefully received by said legacy digital television receivers, for generating a respective decision as to whether (207, 187) lateral Reed-Solomon forward-error-correction circuitry in any legacy digital television receiver will find no more than ten byte errors therein;
in response to each decision that (207, 187) lateral Reed-Solomon forward-error-correction circuitry in any legacy digital television receiver will find no more than ten byte errors in a respective one of said other segments of data being of such nature as not to be usefully received by said legacy digital television receivers, modifying that said respective other segment of data to result in a respective modified other segment of data in which (207, 187) lateral Reed-Solomon forward-error-correction circuitry in any legacy digital television receiver will find more than ten byte errors;
convolutionally interleaving bytes of said respective modified other segments of data with said segments of data that are (207, 187) lateral Reed-Solomon forward-error-correction codewords as prescribed by the 1995 ATSC Digital Television Standard, for transmitting randomized MPEG-2-compliant data packets at a 2/3 code rate to be usefully received by the legacy digital television receivers, thereby to generate a stream of interleaved data; and
trellis coding said stream of interleaved data.

15. The method of claim 14 including a further step of:
periodically including segments of control data among said time-division multiplexed segments of data, each segment of control data pertaining to a respective future group of said time-division multiplexed segments of data, each segment of control data including information concerning said decisions as to whether (207, 187) lateral Reed-Solomon forward-error-correction circuitry in any legacy digital television receiver will find more than ten byte errors in each of said other segments of data included within said respective future group of said time-division multiplexed segments of data.

16. The method of claim 15, wherein each segment of control data includes information concerning a type of modulation used in each one of said segments of data within said respective future group of said time-division multiplexed segments of data.

17. The method of claim 15, wherein each segment of control data includes information concerning a code rate of each one of said segments of data within said respective future group of said time-division multiplexed segments of data.

18. A receiver for digital television signal that includes, in successive data fields, trellis-coded, convolutionally interleaved, time-division multiplexed 207-byte segments of data conveying information content being transmitted, some of said 207-byte segments of data being codewords of (207, 187) lateral Reed-Solomon forward-error-correction coding for transmitting randomized MPEG-2-compliant data packets per the 1995 ATSC Digital Television Standard, so as to be usefully received by legacy digital television receivers, and others of said 207-byte segments of data each being of such nature as not to be usefully received by said legacy digital television receivers, said others of said 207-byte segments originating from redundant coding of codewords of (207, 187) lateral Reed-Solomon forward-error-correction coding, only some of said other 207-byte segments of data having had to be modified from their original forms, so that each of said other 207-byte segments of data departs from all valid codewords of (207, 187) lateral Reed-Solomon forward-error-correction coding of said previously standard first type per the 1995 ATSC Digital Television Standard in at least eleven of its two hundred seven 8-bit bytes, said receiver comprising:

front-end circuitry, analog-to-digital conversion circuitry, vestigial-sideband amplitude-modulation circuitry and channel-equalization filtering circuitry connected for converting to an equalized baseband digital television signal a radio-frequency digital television signal selected for reception by said front-end circuitry;

trellis decoder circuitry connected to receive said equalized baseband digital television signal for decoding the trellis coding of said convolutionally interleaved, time-division multiplexed segments of data in successive data fields of said equalized baseband digital television signal, thereby to generate convolutionally interleaved trellis decoding results;

a byte deinterleaver connected to receive said convolutionally interleaved trellis decoding results and in response thereto reproduce said time-division multiplexed segments of data in successive data fields at baseband; and further decoder circuitry connected for decoding of redundant coding within said other 207-byte segments of data of such nature as not to be usefully received by said legacy digital television receivers, said further decoder circuitry of a type arranging for a restoration of said other 207-byte segments of data that had to be modified from their original forms, said restoration being accomplished before completion of said decoding of redundant coding of said other 207-byte segments of data that had to be modified from their original forms.

19. The receiver as set forth in claim 18, said further decoder circuitry being of a type that functions according to a method comprising steps of:

arranging for a modification of all said other 207-byte segments of data in similar way, so that those that had to be modified from their original forms are restored to their respective original forms;

decoding said other 207-byte segments of data both as so modified and as received in each possible permutation, thereby to generate tentative further decoding results;

performing decoding procedures for (207, 187) lateral Reed-Solomon forward-error-correction coding per the 1995 ATSC Digital Television Standard, on each of said tentative further decoding results for ascertaining which, if any, of said tentative further decoding results is a valid codeword of said (207, 187) lateral Reed-Solomon forward-error-correction coding per the 1995 ATSC Digital Television Standard, or can be corrected to be so by ordinary algorithms for a location and correction of byte errors in such coding; and selecting as final further decoding results from said further decoder circuitry 187 bytes of said tentative further decoding results, if any, ascertained to be valid codeword of said (207, 187) lateral Reed-Solomon forward-error-correction coding per the 1995 ATSC Digital Television Standard, or corrected to be so by ordinary algorithms for the location and correction of byte errors in such coding.

20. The receiver as set forth in claim 18 for digital television signal that includes, within the data in successive data fields, information as to which of said other 207-byte segments of data had to be modified from their original forms, so that each of said other 207-byte segments of data departs from all valid codewords of (207, 187) lateral Reed-Solomon forward-error-correction coding per the 1995 ATSC Digital Television Standard in at least eleven of its two hundred seven 8-bit bytes, said further decoder circuitry being of a type that functions according to a method comprising of:

detecting said information as to which of said other 207-byte segments of data had to be modified from their original forms;

in response to said information as so detected, modifying said other 207-byte segments of data that had to be modified from their original forms so as to restore them to their respective original forms;

decoding said other 207-byte segments of data in their respective original forms as received or as restored by a preceding step of modifying, thereby to generate tentative further decoding results;

performing decoding procedures for said (207, 187) lateral Reed-Solomon forward-error-correction coding per the 1995 ATSC Digital Television Standard on said tentative further decoding results: and selecting as final further decoding results from said further decoder circuitry 187 bytes of said tentative further decoding results, if any, ascertained to be a valid codeword of said (207, 187) lateral Reed-Solomon forward-error-correction coding per the 1995 ATSC Digital Television Standard, or corrected to be so by ordinary algorithms for a location and correction of byte errors in such coding.

* * * * *